United States Patent [19]

Koboshi et al.

[11] Patent Number: 4,908,300

[45] Date of Patent: Mar. 13, 1990

[54] METHOD OF PROCESSING SILVER HALIDE COLOR PHOTOGRAPHIC MATERIAL

[75] Inventors: Shigeharu Koboshi, Sagamihara; Moeko Higuchi, Houya; Shinji Kadota, Hachioji, all of Japan

[73] Assignee: Konishiroku Photo Industry Co., Ltd., Tokyo, Japan

[21] Appl. No.: 258,044

[22] Filed: Oct. 14, 1988

Related U.S. Application Data

[63] Continuation of Ser. No. 188,147, Apr. 25, 1988, abandoned, which is a continuation of Ser. No. 886,243, Jul. 16, 1986, abandoned.

[30] Foreign Application Priority Data

| | | | |
|---|---|---|---|
| Jul. 18, 1985 | [JP] | Japan | 60-160943 |
| Sep. 25, 1985 | [JP] | Japan | 60-213905 |
| Oct. 9, 1985 | [JP] | Japan | 60-226612 |

[51] Int. Cl.$^4$ .......... C03C 5/36; C03C 5/38; C03C 5/44; C03C 7/00

[52] U.S. Cl. .......... 430/393; 430/213; 430/215; 430/238; 430/430; 430/451; 430/460; 430/503; 430/552

[58] Field of Search .......... 430/393, 213, 215, 238, 430/430, 451, 460, 503, 552

[56] References Cited

U.S. PATENT DOCUMENTS

| | | | |
|---|---|---|---|
| 4,256,826 | 3/1981 | Popp et al. | 430/393 |
| 4,444,871 | 4/1984 | Miyaoka et al. | 430/486 |
| 4,446,225 | 5/1984 | Kishimoto et al. | 430/430 |
| 4,518,680 | 5/1985 | Koboshi et al. | 430/393 |
| 4,524,129 | 6/1985 | Kishimoto et al. | 430/393 |
| 4,546,070 | 10/1985 | Kishimoto et al. | 430/393 |
| 4,554,246 | 11/1985 | Yamamuro et al. | 430/611 |
| 4,578,345 | 3/1986 | Ohno et al. | 430/393 |
| 4,596,764 | 6/1986 | Ishimaru | 430/393 |
| 4,621,047 | 11/1986 | Kishimoto et al. | 430/393 |

FOREIGN PATENT DOCUMENTS

| | | |
|---|---|---|
| 0173540 | 3/1986 | . |
| 3337334A1 | 4/1984 | Fed. Rep. of Germany . |
| 3410639A1 | 10/1984 | Fed. Rep. of Germany . |
| 3433869A1 | 3/1985 | Fed. Rep. of Germany . |
| 3518257A1 | 11/1985 | Fed. Rep. of Germany . |
| 1393032 | 2/1965 | France . |
| 2138962 A | 10/1984 | United Kingdom . |

OTHER PUBLICATIONS

Patent Abstracts of Japan, vol. 4, No. 55 (P-8)(537), Apr. 24, 1980.

*Primary Examiner*—Paul R. Michl
*Assistant Examiner*—Hoa Van Le
*Attorney, Agent, or Firm*—Finnegan, Henderson, Farabow, Garrett & Dunner

[57] ABSTRACT

A method of a processing of a silver halide color photographic material is disclosed. The process comprises a step of developing the exposed color photographic material and a step of treating the developed color photographic material with a bleach-fixing solution. The bleach-fixing solution contains an organic acid ferric complex. At least one layer of the emulsion layers of the photographic material contains silver halide grains containing from 0.5 to 25 mol % of silver iodide. The total dry-thickness of the photographic component layers contained in the photographic material is from 8 to 25 μm and the swelling rate $T\frac{1}{2}$ of the photographic component layers is not more than 25 sec. The method is suitable for rapid processing of the fine grain-type high-speed silver iodide-containing color photographic material. The method uses a bleach-fixing bath enabling the rapid processing of the high-speed color photographic material.

12 Claims, No Drawings

METHOD OF PROCESSING SILVER HALIDE COLOR PHOTOGRAPHIC MATERIAL

This application is a continuation of application Ser. No. 188,147, filed Apr. 25, 1988, now abandoned, which is a continuation of Ser. No. 886,243, filed July 16, 1986, now abandoned.

BACKGROUND OF THE INVENTION

The present invention relates to a method for processing a silver halide color photographic material, and more particularly to a processing method capable of rapidly bleaching/fixing a silver halide color photographic material.

Generally, to obtain a color image by processing an imagewise exposed silver halide color photographic material, the color developing process is followed by a process for bleaching the photographic material in a processing bath capable of bleaching the produced metallic silver.

As the processing bath capable of bleaching metallic silver, bleaching bath and bleach-fix bath are known. Where a bleaching bath is used, generally the bleaching process is followed by an additional fixing process using a fixing agent. There are also cases where a bleach-fix process takes place which effects the bleaching and fixing at the same time.

In the bleachability-having processing bath for use in processing a silver halide color photographic material, inorganic oxidation agents such as red prussiates, dichromates, etc., are extensively used as the oxidation agent for bleaching image silver.

However, it is pointed out that the bleachability-having bath containing such an inorganic oxidation inhibitor has some serious disadvantages. For example, red prussiates and dichromates are relatively excellent in the power of bleaching silver image, but are possibly decomposed by light to produce cyanide ions and hexavalent chromium ions, which are harmful to the human body, thus having a nature unfavorable for the prevention of environmental pollution. And any of these oxidation agents has a very strong oxidation power, so that it is difficult to make the agent present together with a silver halide solvent (fixing agent) in a same bath, and therefore it is almost impossible to use such the oxidation agent in a bleach-fix bath, thus making it difficult to accomplish the object of speeding up and simplifying the processing of a photographic material. Further, the processing bath containing such the inorganic oxidation agent has the disadvantage that its waste liquid after processing can hardly be recycled.

In contrast to this, a processing bath containing a metallic complex salt of an organic acid such as an aminopolycarboxylic acid has become used as the one which causes little or no environmental pollution and which can meet the need for speeding up and simplifying the processing and whose waste fluid can be recycled. However, the processing bath which uses such the metallic complex salt of an organic acid, since its oxidation power is weak, has the disadvantage that the rate (oxidation rapidity) of bleaching the image silver (metallic silver) formed in the developing process is low. For example, iron(III) complex salt of ethylenediaminetetraacetic acid which is consiered strong in the bleaching power among those aminopolycarboxylic acid metallic complex salts is practically used in part for a bleaching or bleach-fix bath, but lacks its bleaching power when used in the processing of high-speed silver halide color photographic materials comprised mainly of a silver bromide or silver iodobromide emulsion, particularly color negative film and color reversal film for photographing use containing silver iodide as the silver halide, and very slight marks of image silver remains even when the bleaching takes place for a long period of time, i.e., no perfect desilverization can be carried out. This tendency appears significantly particularly in a bleach-fix bath wherein an oxidation agent is present together with a thiosulfate and a sulfite because its oxidation-reduction potential is lowered. Especially, the desilverizability is conspicuously worsened in the case of those high-speed silver iodide-containing silver halide color photographic materials for photographing use which contains black colloidal silver used for the antihalation purpose.

Further, there is a core/shell emulsion, which is the aforementioned silver iodide-containing high-speed emulsion and fine-grained and which has lately been developed as the silver halide emulsion whose silver is efficiently utilized so as to meet the need for the protection of resources. This core/shell emulsion is a monodisperse core/shell emulsion prepared in the manner that a preceding silver halide is utilized as a crystalline nucleus, and on this are sequentially superposed the subsequent precipitates with the respective precipitate compositions or process environment deliberately controlled. The above-mentioned core/shell-type high-speed emulsion, which contains silver iodide in the core and/or the shell thereof, has very favorable photographic characteristics, but it has now been found that, where the emulsion is applied to a silver halide color photographic material, when processed in a conventional bleach-fix bath, its bleach-fixability of the developed silver and silver halide is very unsatisfactory.

That is, the developed silver of a photographic silver halide emulsion containing not less than 0.5 mole% silver iodide, particularly the developed silver of silver halide grains containing not less than 0.5 mole% silver iodide in both the core and shell thereof, even if excellent in the sensitivity, graininess, covering power, etc., in the case of a color photographic material whose developed silver must be bleached, is very unsatisfactorily bleached because the developed silver is different in the form from conventional ones. Particularly, among emulsions there are those which use plate-form silver halide grains as described in, e.g., Japanese Patent Publication Open to Public Inspection (hereinafter referred to as Japanese Patent O.P.I. Publication) Nos. 113930/1983, 113934/1983, 127921/1983 and 108532/1983. Such the emulsion is said to require no increase in the using amount of silver even if the number of photons caught by the silver halide grains increases and also said to cause no deterioration of the resulting image quality due to the plate-form silver halide grains. However, even these plate-form silver halide grains have the disadvantage that the developed silver formed therefrom in the development by a p-phenylenediamine-type color developing agent is inferior in the silver bleach. Accordingly, a strong demand has been made for the advent of a processing bath capable of rapidly bleaching/fixing silver halide color photographic materials comprising a silver iodide-containing core/shell emulsion and/or a plate-form silver halide emulsion, which are excellent as described above, and an antihalation layer consisting of black colloidal silver.

SUMMARY OF THE INVENTION

It is therefore a first object of the present invention to provide an excellent method for bleaching/fixing a fine-grained-type high-speed silver iodide-containing silver halide color photographic material which is capable of reconciling the protection of resources with ultra-high sensitivity.

It is a second object of the present invention to provide a processing method which uses a bleach-fix bath enabling the rapid processing of a high-speed color photographic material.

It has been found that the above objects of the present invention are accomplished by a method of processing a silver halide color photographic material comprising a step of developing an imagewise exposed silver halide color photographic material which comprises a support and photographic component layers including a blue-sensitive, a green-sensitive and a red-sensitive silver halide photographic emulsion layers provided on one side of the support, at least one of the emulsion layers comprising a silver halide containing from 0.5 to 25 mol% of silver iodide, the total dry-thickness of the photographic component layers being from 8 to 25 μm, and the swelling rate T ½ of the photographic component layers being not more than 25 sec; and a step of bleach-fixing the developed photographic material with a bleach-fixing solution containing an organic acid ferric complex.

The above-mentioned 'photographic component layers' means all the hydrophilic colloid layers which are coated on the same side of a support as the at least three layers; the blue-sensitive, green-sensitive and red-sensitive layers of this invention. Besides these silver halide emulsion layers, the hydrophilic colloid layers also includes additional layers such as, e.g., a black colloid silver antihalation layer, a subbing layer, interlayers (simple interlayers, filter layers, ultraviolet absorbing layers, etc.), protective layer, and the like.

DETAILED DESCRIPTION OF THE INVENTION

As a result of our continued investigation made paying attention to the phenomenon that a high-speed fine-grained silver halide color photographic material having a black colloid silver antihalation layer and at least three silver halide emulsion layers containing at least 0.5 mole% silver iodide is significantly poor in its bleach-fix nature, we have now found that, if the total amount of coating silver and the dry-thickness of the emulsion layers of the silver halide color photographic material are not more than specified values and if the swelling rate T ½ of the photographic component layer is not more than 25 seconds, even if a bleach-fix bath containing an organic acid ferric complex salt is used, the photographic material can be adequately desilvered. In addition, we have also found that, when processed in a bleach-fix bath which uses in combination one of the specific compounds of the present invention, the bleach-fix completion time of the silver iodide-containing silver halide color photographic material can be further shortened. Particularly, we have found that, if the thickness of the photographic component layers comprised of silver halide emulsion of such the photographic material is less than a specified value, then the bleach-fix nature is remarkably bettered, thus leading to the improvement on the desilverization. Further, we have found the surprising fact that the larger the molecular weight of the organic acid of the organic acid ferric salt the smaller the swelling rate T ½ of the photographic component layers (gelatin layers) becomes, thereby increasing the bleaching acceleration effect, thus remarkably shortening the bleaching time.

On the other hand, we have also found the fact that the smaller the molecular weight of the organic acid of the organic acid ferric complex salt the larger the increase in the bleaching acceleration effect becomes due to the decrease in the thickness of the photographic component layers (gelatin layers), and thus the bleach-fix time is remarkably shortened likewise.

That is, generally speaking, as the molecular weight of the organic acid of the organic acid ferric complex salt becomes larger, the oxidation power of silver increases and so does the photographic component layers' hardening effect, resulting in the remarkable deterioration of the diffusion permeation of the bleach-fix component to thus obstruct the bleach-fix. This phenomenon increases in proportion to the thickness of the photographic component layers, but in the case where the swelling rate of gelatin is very high, this obstruction does not occur. On the contrary, in the case of a small molecular weight-having organic acid ferric complex salt, its power of oxidizing silver is somewhat weak, but because its obstruction to the bleach-fix is also small, a substantially adequate bleaching power can be obtained if the thickness of the photographic component layers is less than the value specified by the present invention or if the swelling rate of gelatin is so large as previously mentioned.

Further, it has now been found that, if the thickness of the photographic component layers of the silver iodide-containing color photographic material is large, a significantly unsatisfactory desilvering occurs between the black colloid silver antihalation layer and the silver iodide-containing silver halide emulsion layer, thus stressing the obstruction to the bleach-fix, but this obstruction to the bleach-fix also can be reduced by making the photographic component layers thinner than the value specified in this invention and by making the swelling rate of the gelatin layers faster than the specified value in this invention.

Accordingly, the present invention provides an epochal rapid bleach-fix method by which a bleach-fix can be carried out without having its characteristic impaired even when any molecular weight-having organic acid ferric complex salt is used.

The preferred embodiments of the invention include, for example, that in which the bleach-fix bath is added with a bleach-fix accelerator which will be described later.

Further, as the most effective embodiment, we have found that the foregoing objects of the present invention can be accomplished most effectively by a processing method in which after the developing process a fixing process is placed as the processing prior to the bleach-fix process. This fixing process will be hereinafter called 'prefixing process' or 'prefixing', and the processing bath to be used in the prefixing process will be hereinafter called 'prefixing solution or prefixing bath'.

Such prefixing solution may also be added with the above-mentioned bleach-fix accelarator.

The present invention will be further illustrated in detail below:

The hydrophilic binder to be used for coating the silver halide of the silver halide color photographic material is usually gelatin, but there are also cases where a high-molecular polymer is used, and the swelling rate T ½ thereof shall be not more than 25 seconds. The layer swelling rate T ½ can be measured in accordance with any of those arbitrary methods known to those skilled in the art; for example, the measurement can be made by use of a swellometer of the type as described in A. Green et al, the 'Photographic Science and Engineering' vol. 19, No. 2, p. 124–129. The T ½ is defined as the time required for the photographic material to reach the saturated layer thickness which is 90% of the maximum swelled layer thickness obtained when the photographic material is processed in a color developer solution at 30° C. for 3 minutes and 15 seconds.

The swelling rate T ½ can be controlled by adding a hardener to gelatin as the binder.

Usable examples of the hardener include those aldehyde-type and aziridine-type compounds as described in PB Report 19,921, U.S. Pat. Nos. 2,950,197, 2,964,404, 2,983,611 and 3,271,175, Japanese Patent Examined Publication No. 40898/1971, Japanese Patent O.P.I. Publication No. 91315/1977; those isooxazolium-type compounds as described in U.S. Pat. No. 3,231,323; those epoxy-type compounds as described in U.S. Pat. No. 3,047,394, West German Patent No. 1,085,663, British Patent No. 1,033,518, and Japanese Patent Examined Publication No. 35495/1973; those vinylsulfone-type compounds as described in PB Report No. 19,920, West German Patent Nos. 1,100,942, 2,337,412, 2,545,722, 2,635,518, 2,742,308 and 2,749,260, British Patent No. 1,251,091, U.S. Pat. Nos. 3,539,644 and 3,490,911; those acryloyl-type compounds as described in U.S. Pat. No. 3,640,720; those carbodimide-type compounds as described in U.S. Pat. Nos. 2,938,892, 4,043,818 and 4,061,499, and Japanese Patent Examined Publication No. 38715/1971; those triazine-type compounds as described in West German Patent Nos. 2,410,973 and 2,553,915, U.S. Pat. No. 3,325,287, and Japanese Patent O.P.I. Publication No. 12722/1977; those high-molecular compounds as described in British Patent No. 822,061, U.S. Pat. Nos. 3,623,878; 3,396,029 ans 3,226,234, and Japanese Examined Publication Nos. 18578/1972, 18579/1972 and 48896/1972; and others such as maleimide-type, acetylene-type, methanesulfonic acid ester-type and N-methylol-type hardeners. These hardeners may be used alone or in combination. Useful combinations of these hardeners are found in, e.g., West German Patent Nos. 2,447,587, 2,505,746 and 2,514,245, U.S. Pat. Nos. 4,047,957, 3,832,181 and 3,840,370, Japanese Patent O.P.I. Publication Nos. 43319/1973, 63062/1975 and 127329/1977, and Japanese Patent Examined Publication No. 32364/1973.

The layer thicknesses of the photographic component layers in dry state are to be not more than 22 μm and preferably not more than 20 μm, and the layer swelling rate T ½ of the photographic component layers used in the color photographic material of this invention is not more than 25 seconds, and the smaller the swelling rate the better, but if the swelling rate is extremely small, it tends to cause a trouble such as scratches, etc., so that the lower limit is desirable to be 1 minute or more, and the range of the swelling rate is preferably from 2 seconds to 20 seconds, and more preferably not more than 15 seconds, and most preferably not more than 10 seconds. If the swelling rate is more than 25 seconds, the desilverizability, i.e., the bleach-fix characteristic is deteriorated; the deterioration becomes conspicuous particularly when a low molecular organic acid ferric complex salt is used, or even in the case of a high-molecular weight organic acid ferric complex salt, when the using concentration thereof is high.

It is preferred that the bleach-fix bath and/or the prefixing solution which are to be used in the invention may be added with the compounds represented by the following Formulas [I] through [VII] so as to serve as a bleach accelerator.

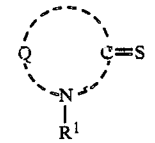
Formula [I]

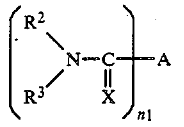
Formula [II]

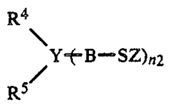
Formula [III]

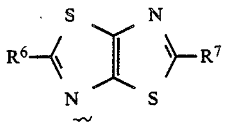
Formula [IV]

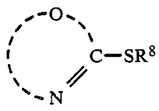
Formula [V]

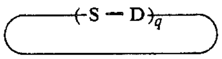
Formula [VI]

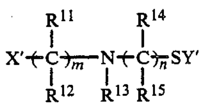
Formula [VII]

In the above formulas Q is a group of atoms necessary to form a heterocyclic ring containing one or more N atoms (including ones with which is condensed at least one unsaturated 5 or 6-member ring); A is

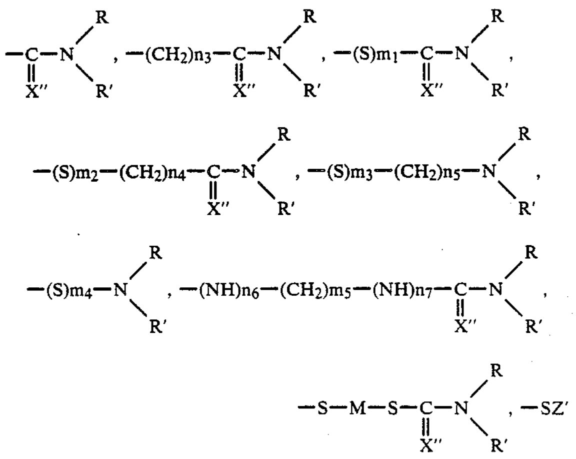

or $n_1$-valent heterocyclic residue (including ones with which is condensed at least one unsaturated 5 or 6-member ring); B is an alkylene group having from 1 to 6 carbon atoms; M is a divalent metallic atom; X and X'' each is =S, =O or =NR'', wherein R'' is a hydrogen atom, an alkyl, cycloalkyl or aryl group or heterocyclic residue (including ones with which is condensed at least one unsaturated 5 or 6-member ring), which groups each has from 1 to 6 carbon atoms, or an amino group; Y is >N— or >CH—; Z is a hydrogen atom, an alkali metallic atom, an ammonium group, a nitrogen-containing heterocyclic residue or

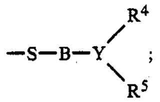

Z' is Z or an alkyl group; $R^1$ is a hydrogen atom, an alkyl, cycloalkyl, aryl, heterocyclic residue (including ones with which is condensed at least one unsaturated 5 or 6-member ring), which groups each has from 1 to 6 carbon atoms, or an amino group; $R^2$, $R^3$, $R^4$, $R^5$, R and R' each is a hydrogen atom, an alkyl, hydroxy or carboxy group, which groups each has from 1 to 6 carbon atoms, or an amino group, or an acyl, aryl or alkenyl group, which groups each has from 1 to 3 carbon atoms, provided that the $R^4$ and $R^5$ each is allowed to represent —B—SZ, and each of the pairs R and R', $R^2$ and $R^3$, and $R^4$ and $R^5$ may be linked to form a heterocyclic residue (including ones with which is condensed at least one unsaturated 5 or 6-member ring); $R^6$ and $R^7$ each represents

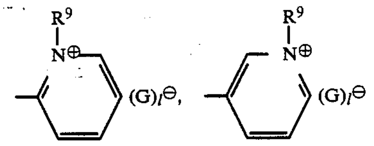

or

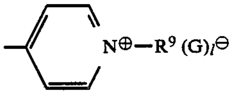

$R^9$ is an alkyl group or $—(CH_2)_{n8}SO_3^{\ominus}$ (provided that when the $R^8$ is $—(CH_2)_{n8}SO_3^{\ominus}$, l is 0 or 1); $G^{\ominus}$ is an anion, $m_1$ through $m_4$ and $n_1$ through $n_8$ each is an integer of from 1 to 6, and $m_5$ is an integer of from 0 to 6; $R^8$ is a hydrogen atom, an alkali metallic atom,

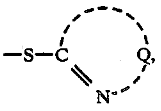

or an alkyl group, provided that the Q' is as defined in the foregoing Q; D is a simple bond representing an alkylene or vinylene group having from 1 to 8 carbon atoms, and q is an integer of from 1 to 10, provided that a plurality of Ds may be the same as or different from one another, and the ring formed by the D with a sulfur atom may be futher condensed with a 5 or 6-membered unsaturated ring; X' is —COOM', —OH, $—SO_3M'$, $—CONH_2$, $—SO_2NH_2$, $—NH_2$, —SH, —CN, $—CO_2R^{16}$, $—SO_2R^{16}$, $—OR^{16}$, $NR^{16}R^{17}$, $—SR^{16}$, $—SO_3R^{16}$, $—NHCOR^{16}$, $—NHSO_2R^{16}$. $—OCOR^{16}$ or $—SO_2R^{16}$; Y' is

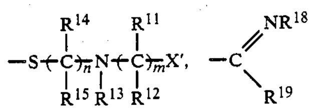

or a hydrogen atom, wherein m and n each is an integer of from 1 to 10, and $R^{11}$, $R^{12}$, $R^{14}$, $R^{15}$, $R^{17}$ and $R^{18}$ each is a hydrogen atom, a lower alkyl or acyl group or

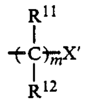

$R^{16}$ is a lower alkyl group, $R^{19}$ is $—NR^{20}R^{21}$, $—OR^{22}$ or $—SR^{22}$, provided that the $R^{20}$ and $R^{21}$ each is a hydrogen atom or a lower alkyl group, and the $R^{22}$ is a group of atoms necessary to form a ring, and the $R^{20}$ or $R^{21}$ may be linked with the $R^{18}$ to form a ring; and M' is a hydrogen atom or a cation. In addition, those compounds having the foregoing Formulas [I] to [V] include those enolated and the salts thereof.

Those bleaching accelerators represented by the foregoing general formulas [I] through [VII] include the following compounds, but are not limited thereto.

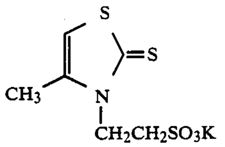

(I-1)

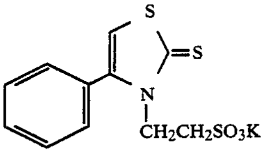

(I-2)

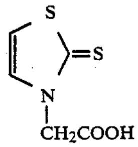

(I-3)

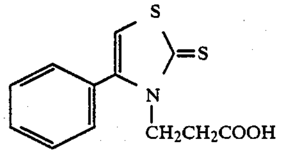

(I-4)

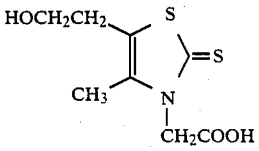

(I-5)

-continued
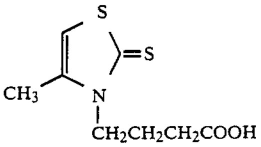
(I-6)
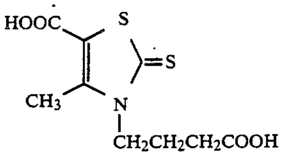
(I-7)
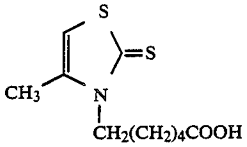
(I-8)
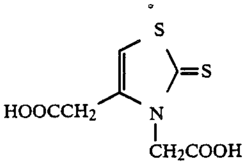
(I-9)
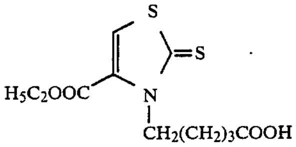
(I-10)
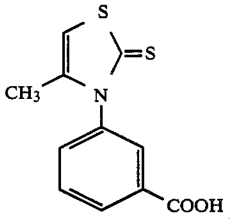
(I-11)
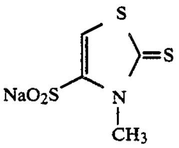
(I-12)
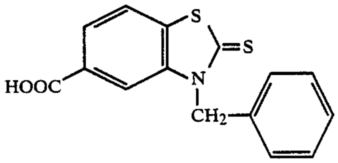
(I-13)
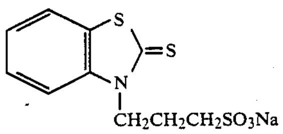
(I-14)
-continued
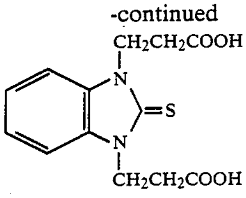
(I-15)
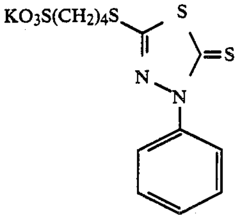
(I-16)
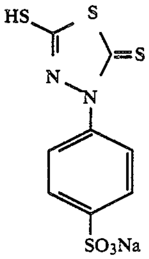
(I-17)
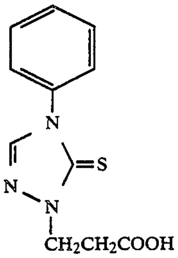
(I-18)
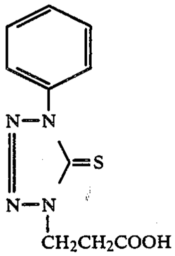
(I-19)
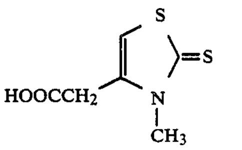
(I-20)
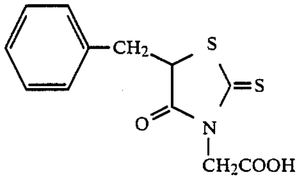
(I-21)

-continued
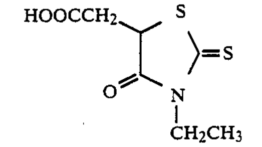
(I-22)
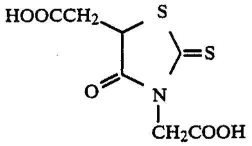
(I-23)
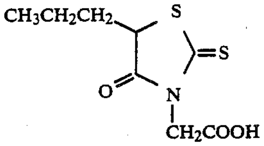
(I-24)
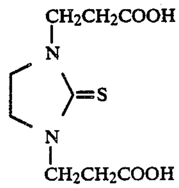
(I-25)
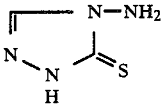
(I-26)
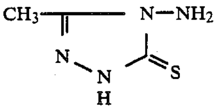
(I-27)
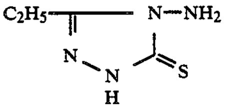
(I-28)
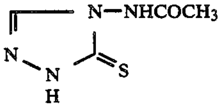
(I-29)
-continued
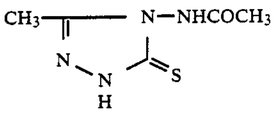
(I-30)
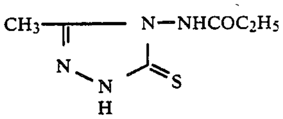
(I-31)
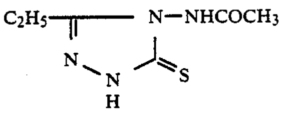
(I-32)
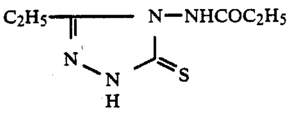
(I-33)
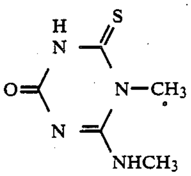
(I-34)
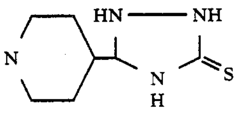
(I-35)
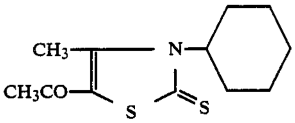
(I-36)
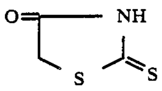
(I-37)
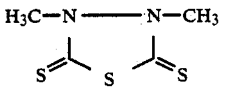
(I-38)
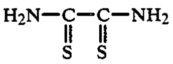
(II-1)
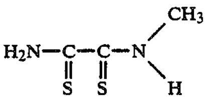
(II-2)
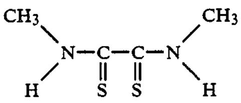
(II-3)
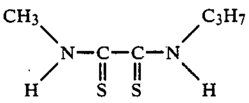
(II-4)

-continued
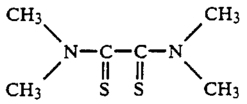
(II-5)
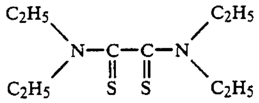
(II-6)
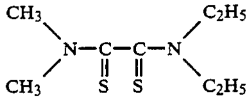
(II-7)
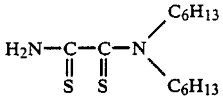
(II-8)
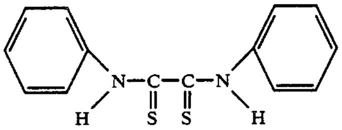
(II-9)
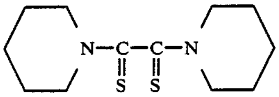
(II-10)
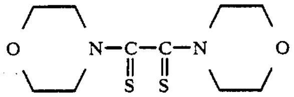
(II-11)
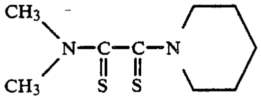
(II-12)
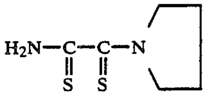
(II-13)
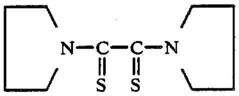
(II-14)
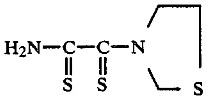
(II-15)
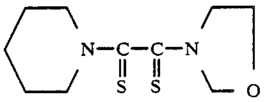
(II-16)
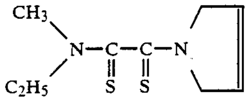
(II-17)

-continued
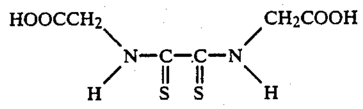
(II-18)
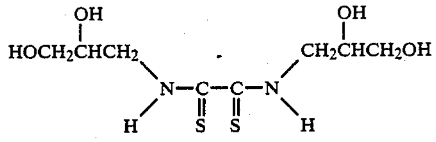
(II-19)
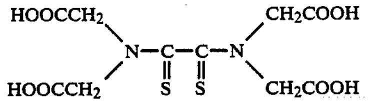
(II-20)
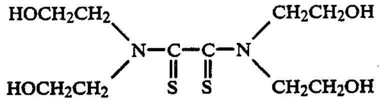
(II-21)
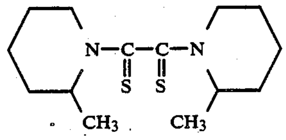
(II-22)
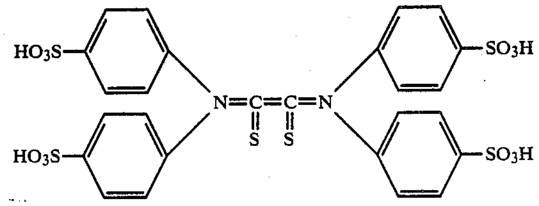
(II-23)
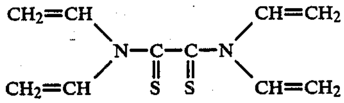
(II-24)
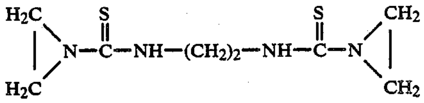
(II-25)
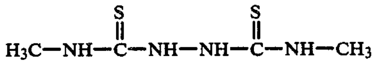
(II-26)
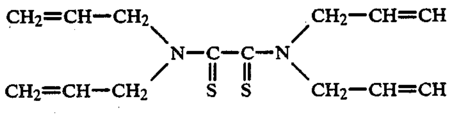
(II-27)
$H_2N—CSNHNHCS—NH_2$ (II-28)
(II-29)
(II-30)
(II-31)

-continued
(II-32)
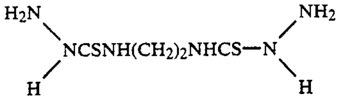
(II-33)
$H_2N-CSNH(CH_2)_2NHCS-NH_2$ (II-34)
$H_2N-CSNH(CH_2)_4NHCS-NH_2$ (II-35)
$H_2N-CSNH(CH_2)_5NHCS-NH_2$ (II-36)
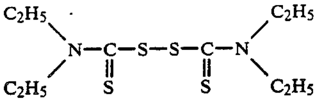
(II-37)
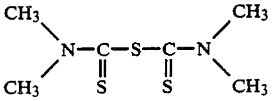
(II-38)
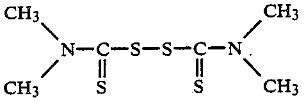
(II-39)
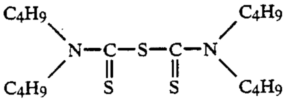
(II-40)
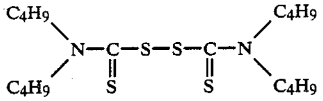
(II-41)
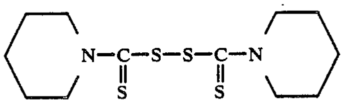
(II-42)
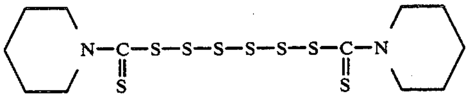
(II-43)
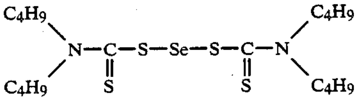
(II-44)
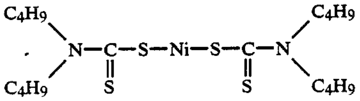
(II-45)
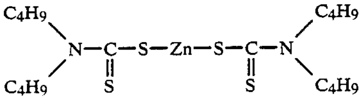
(II-46)
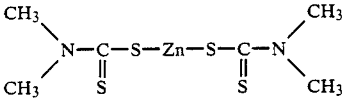
(II-47)

-continued
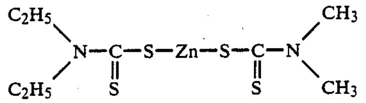
(II-48)
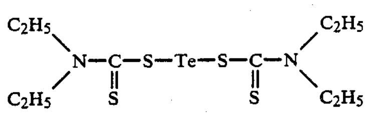
(II-49)
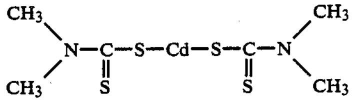
(II-50)
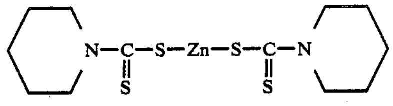
(II-51)
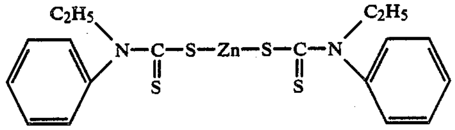
(II-52)
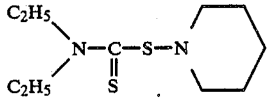
(II-53)
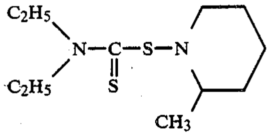
(II-54)
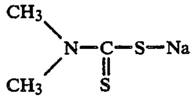
(II-55)
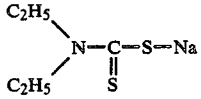
(II-56)
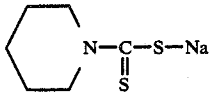
(II-57)
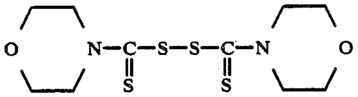
(II-58)
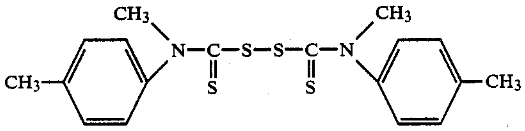
(II-59)
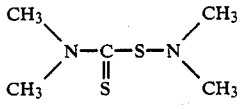
(II-60)

-continued
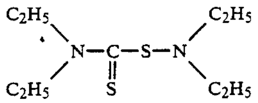
(II-61)
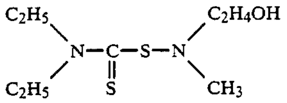
(II-62)
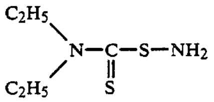
(II-63)
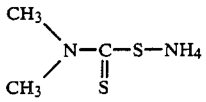
(II-64)
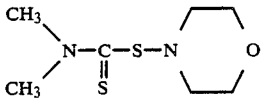
(II-65)
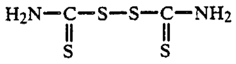
(II-66)
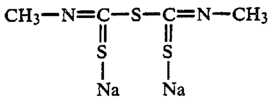
(II-67)
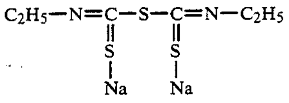
(II-68)
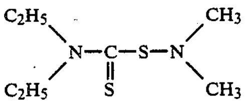
(II-69)
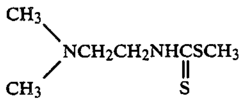
(II-70)
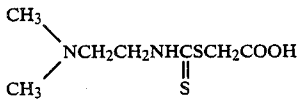
(II-71)
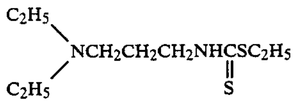
(II-72)
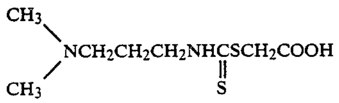
(II-73)
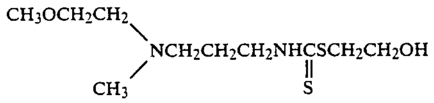
(II-74)
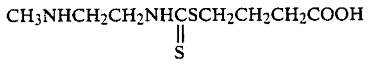
(II-75)

-continued
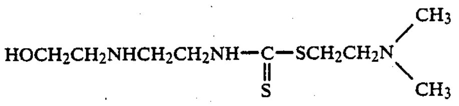
(II-76)
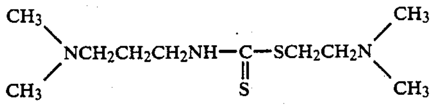
(II-77)
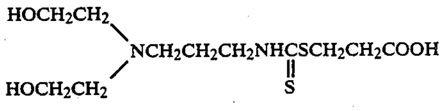
(II-78)
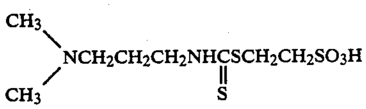
(II-79)
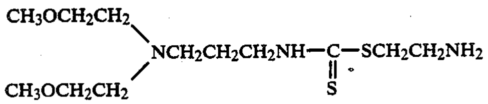
(II-80)
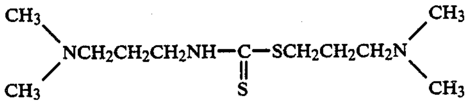
(II-81)
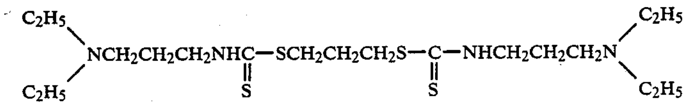
(II-82)
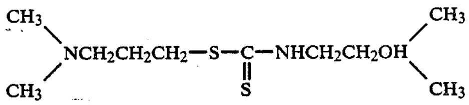
(II-83)
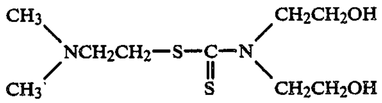
(II-84)
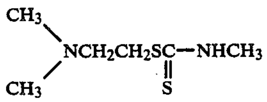
(II-85)
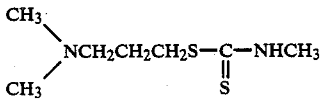
(II-86)
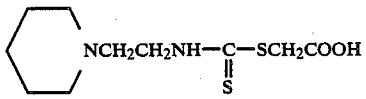
(II-87)
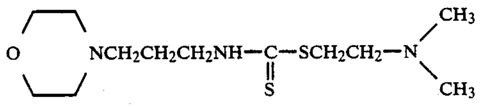
(II-88)
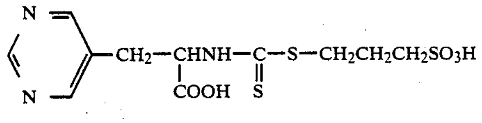
(II-89)

-continued
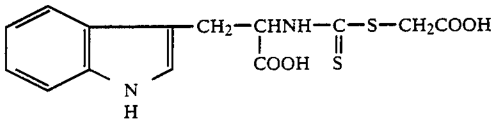
(II-90)
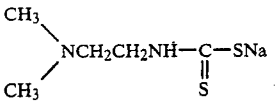
(II-91)
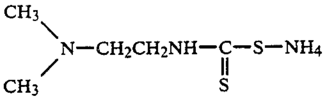
(II-92)
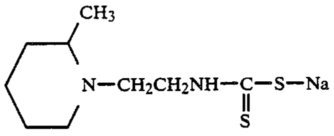
(II-93)
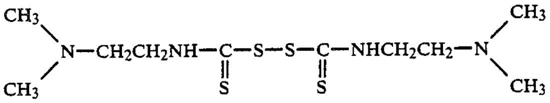
(II-94)
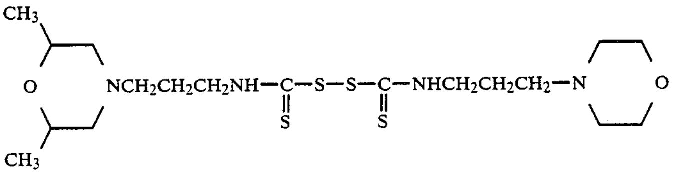
(II-95)
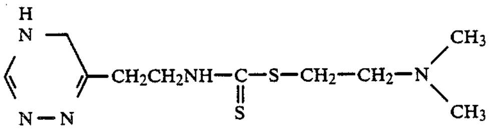
(II-96)
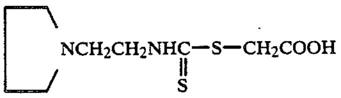
(II-97)
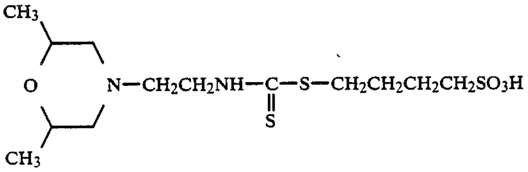
(II-98)
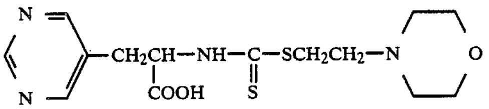
(II-99)
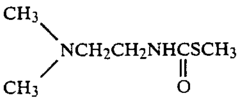
(II-100)
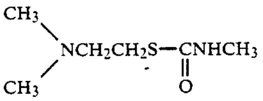
(II-101)

-continued
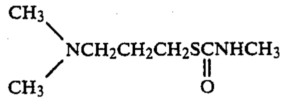
(II-102)
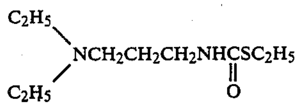
(II-103)
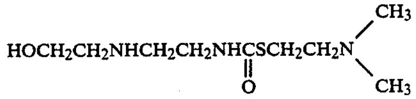
(II-104)
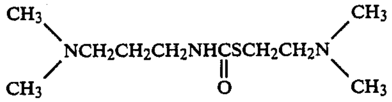
(II-105)
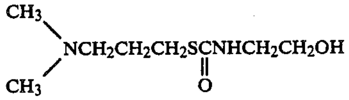
(II-106)
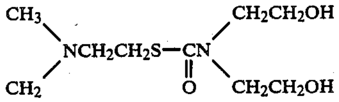
(II-107)
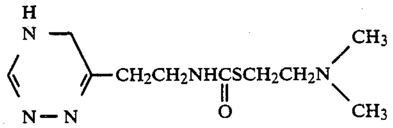
(II-108)
(II-109)
(II-110)
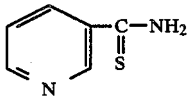
(II-111)
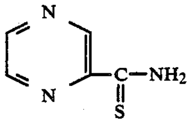
(II-112)
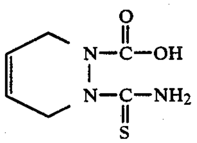
(II-113)
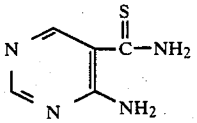
(II-114)

-continued
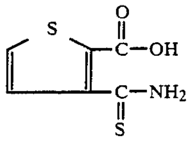
(II-115)
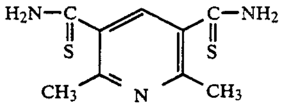
(II-116)
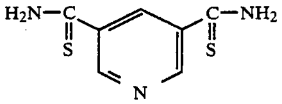
(II-117)
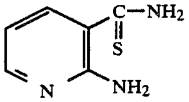
(II-118)
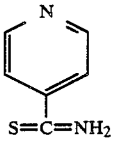
(II-119)
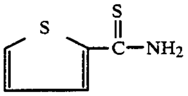
(II-120)
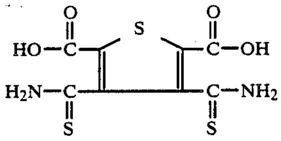
(II-121)
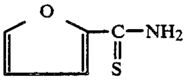
(II-122)
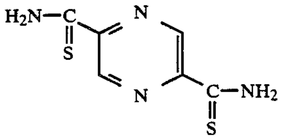
(II-123)
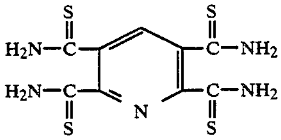
(II-124)
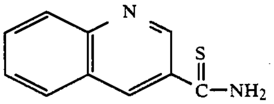
(II-125)
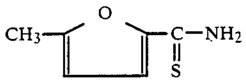
(II-126)

-continued
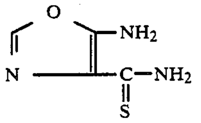
(II-127)
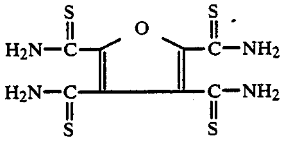
(II-128)
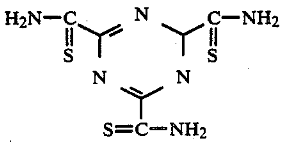
(II-129)
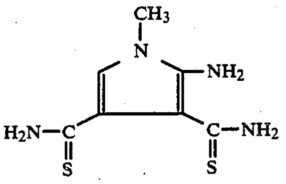
(II-130)
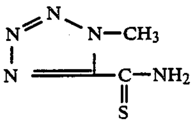
(II-131)
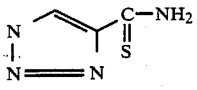
(II-132)
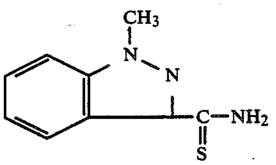
(II-133)
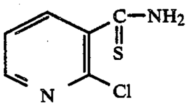
(II-134)
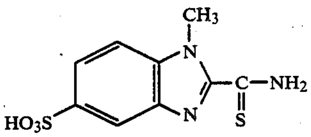
(II-135)
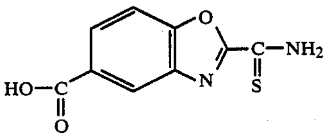
(II-136)
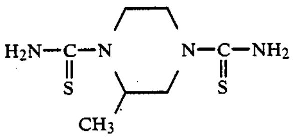
(II-137)

-continued
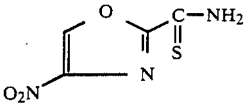
(II-138)
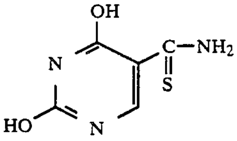
(II-139)
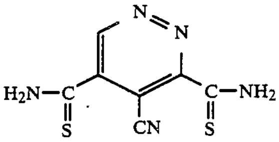
(II-140)
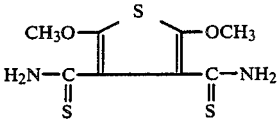
(II-141)
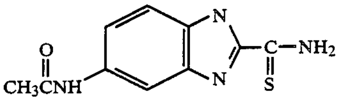
(II-142)
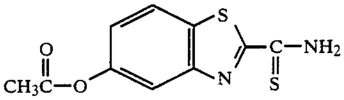
(II-143)
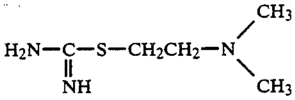
(II-144)
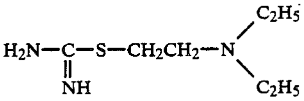
(II-145)
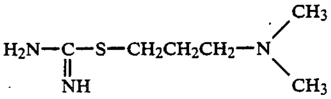
(II-146)
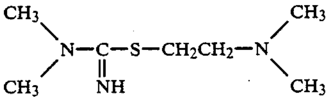
(II-147)
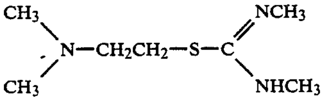
(II-148)
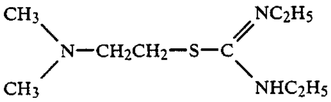
(II-149)
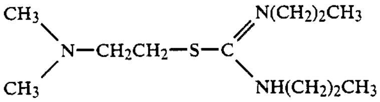
(II-150)

-continued
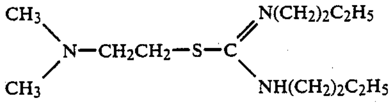
(II-151)
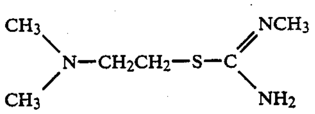
(II-152)
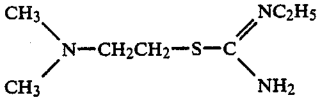
(II-153)
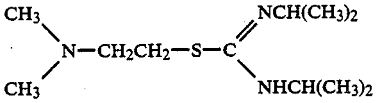
(II-154)
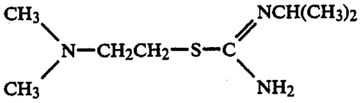
(II-155)
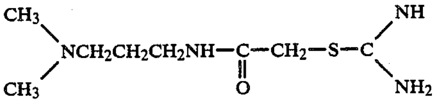
(II-156)
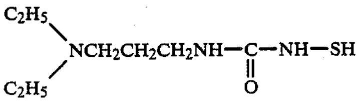
(II-157)
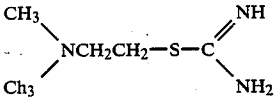
(II-158)
$H_2N—CH_2CH_2—SH$ (III-1)
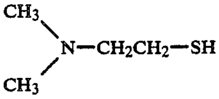
(III-2)
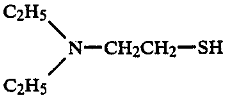
(III-3)
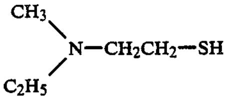
(III-4)
$HOOC.CH_2CH_2.SH$ (III-5)
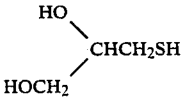
(III-6)
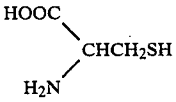
(III-7)
-continued
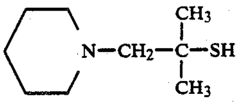
(III-8)
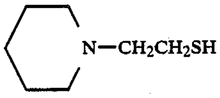
(III-9)
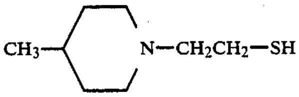
(III-10)
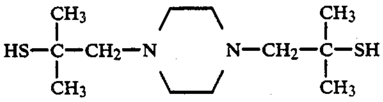
(III-11)
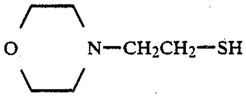
(III-12)
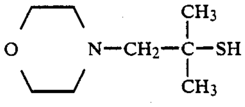
(III-13)

-continued
(III-14)
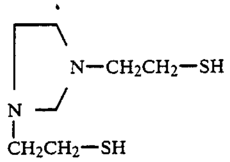
(III-15)
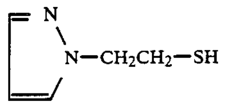
(III-16)
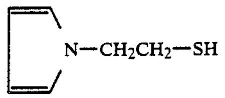
(III-17)
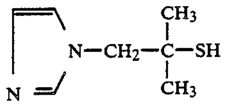
(III-18)
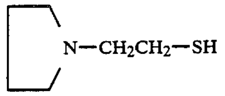
(III-19)
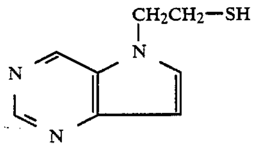
(III-20)
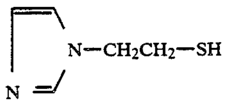
(III-21)
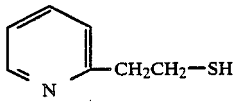
(III-22)
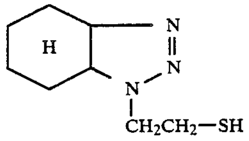
(III-23)
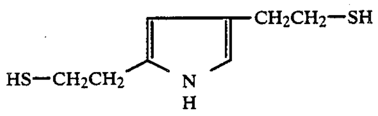
(III-24)
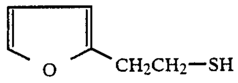
(III-25)
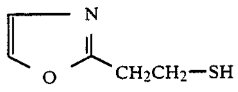
-continued
(III-26)
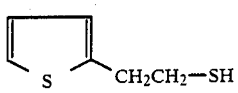
(III-27)
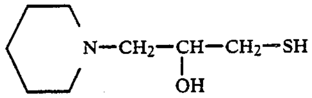
(III-28)
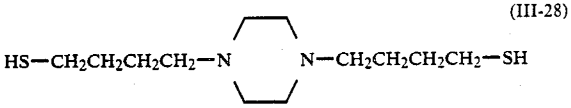
(III-29)
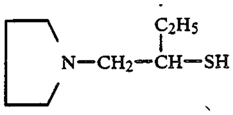
(III-30)
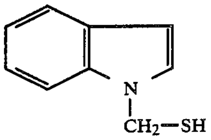
(III-31)
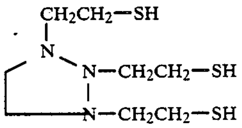
(III-32)
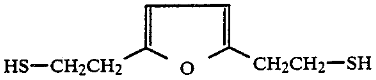
(III-33)
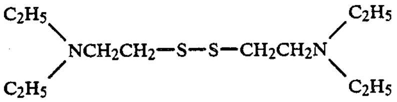
(III-34)
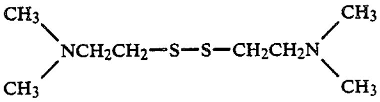
(III-35)
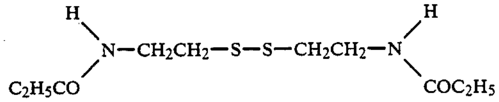
(III-36)
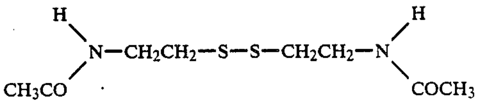
(III-37)
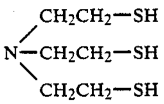

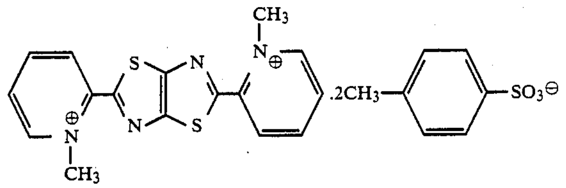
(IV-1)
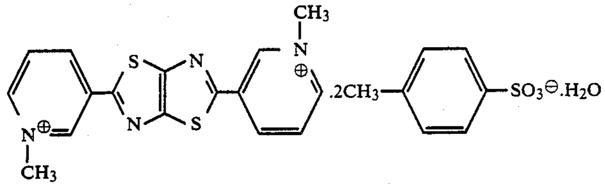
(IV-2)
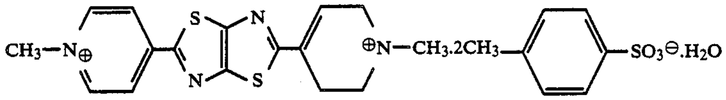
(IV-3)
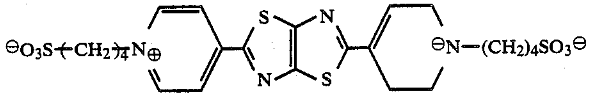
(IV-4)
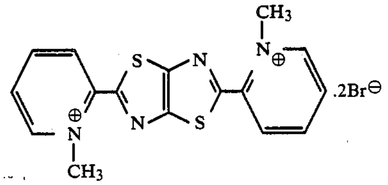
(IV-5)
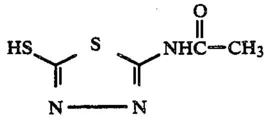
(V-1)
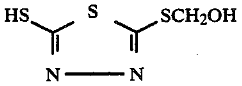
(V-2)
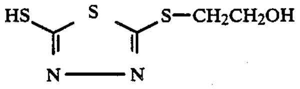
(V-3)
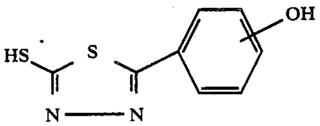
(V-4)
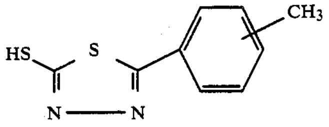
(V-5)
-continued
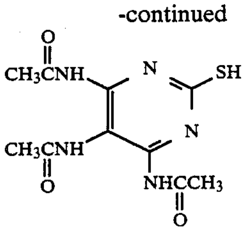
(V-6)
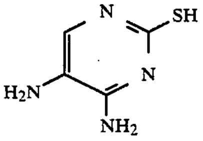
(V-7)
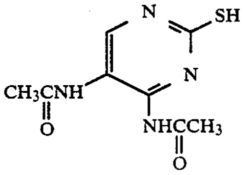
(V-8)
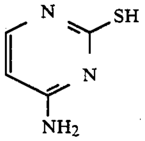
(V-9)

-continued
(V-10)
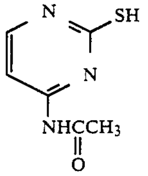
(V-11)
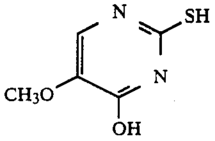
(V-12)
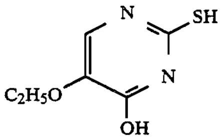
(V-13)
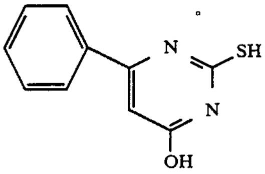
(V-14)
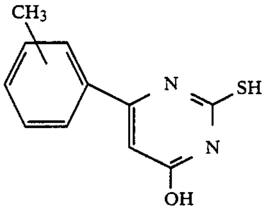
(V-15)
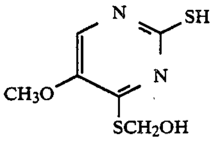
(V-16)
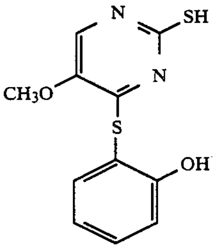
(V-17)
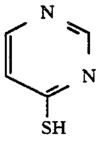
(V-18)
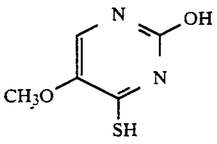
-continued
(V-19)
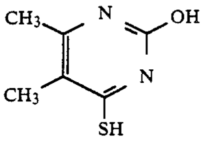
(V-20)
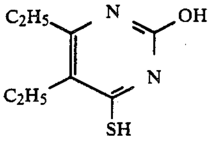
(V-21)
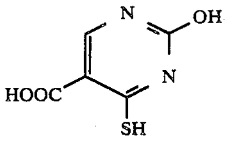
(V-22)
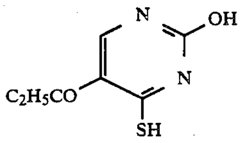
(V-23)
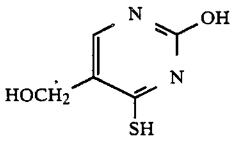
(V-24)
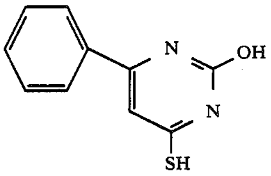
(V-25)
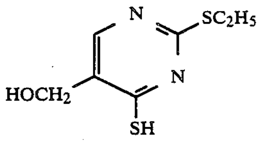
(V-26)
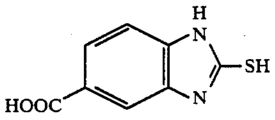
(V-27)
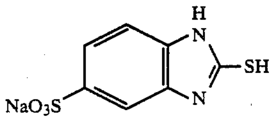
(V-28)
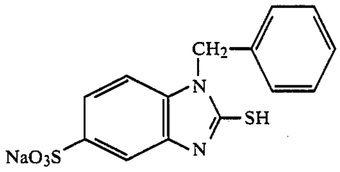

-continued
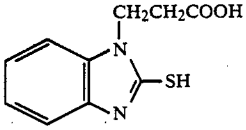
(V-29)
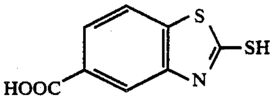
(V-30)
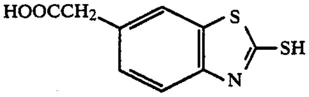
(V-31)
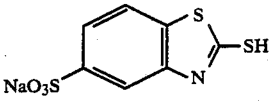
(V-32)
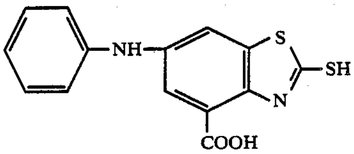
(V-33)
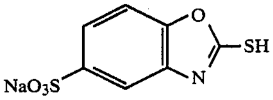
(V-34)
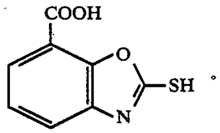
(V-35)
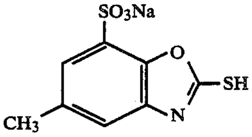
(V-36)
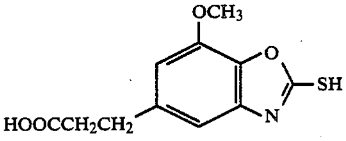
(V-37)
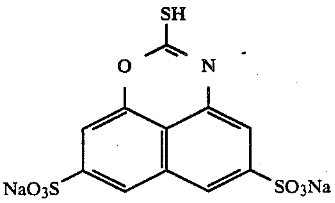
(V-38)
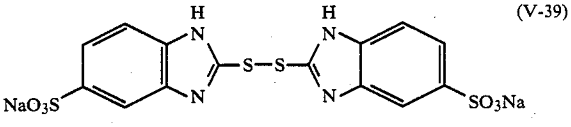
(V-39)
-continued
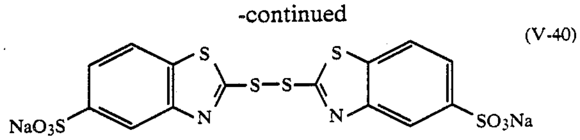
(V-40)
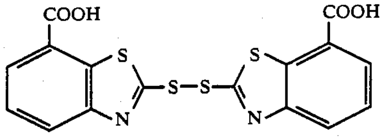
(V-41)
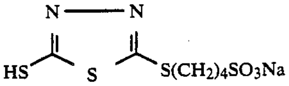
(V-42)
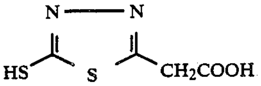
(V-43)
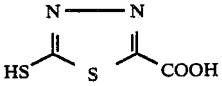
(V-44)
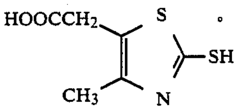
(V-45)
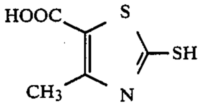
(V-46)
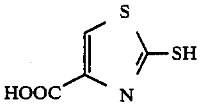
(V-47)
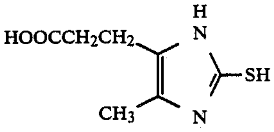
(V-48)
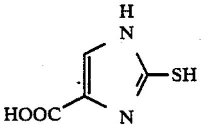
(V-49)
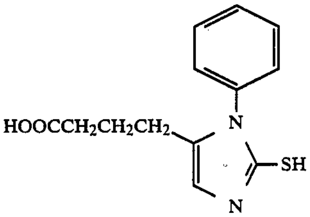
(V-50)
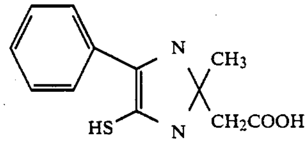
(V-51)

-continued
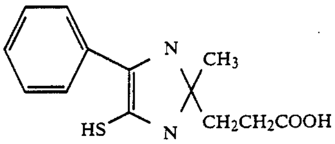
(V-52)
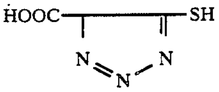
(V-53)
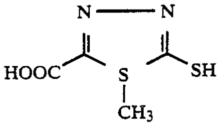
(V-54)
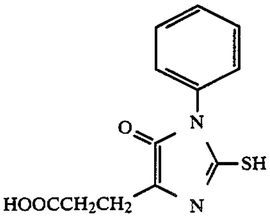
(V-55)
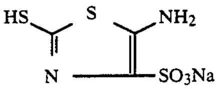
(V-56)
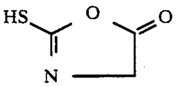
(V-57)
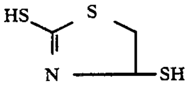
(V-58)
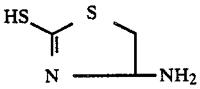
(V-59)
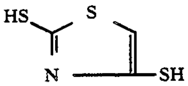
(V-60)
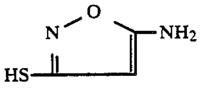
(V-61)
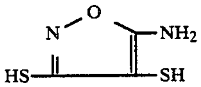
(V-62)
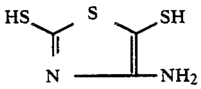
(V-63)
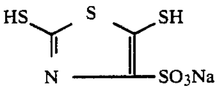
(V-64)
-continued
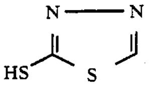
(V-65)
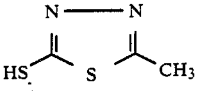
(V-66)
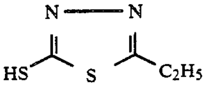
(V-67)
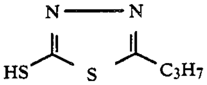
(V-68)
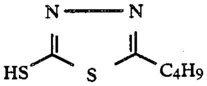
(V-69)
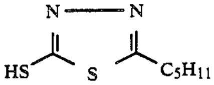
(V-70)
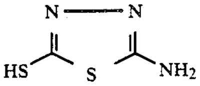
(V-71)
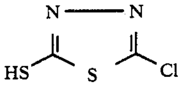
(V-72)
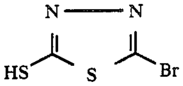
(V-73)
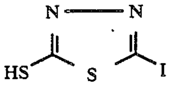
(V-74)
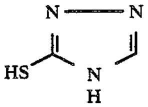
(V-75)
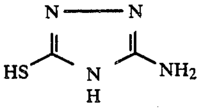
(V-76)
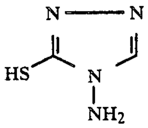
(V-77)
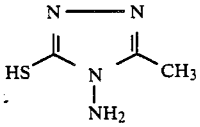
(V-78)

-continued
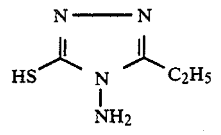
(V-79)
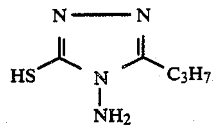
(V-80)
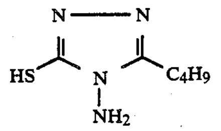
(V-81)
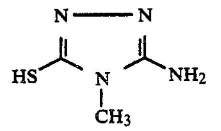
(V-82)
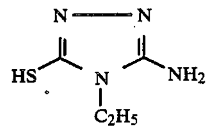
(V-83)
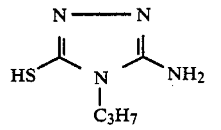
(V-84)
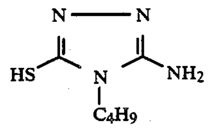
(V-85)
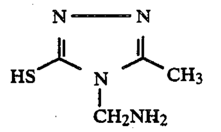
(V-86)
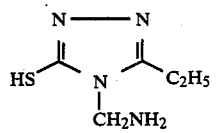
(V-87)
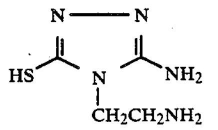
(V-88)
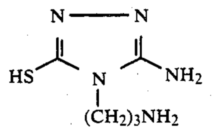
(V-89)
-continued
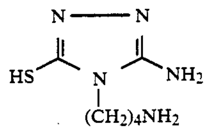
(V-90)
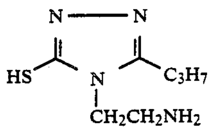
(V-91)
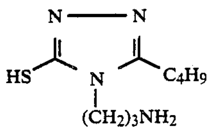
(V-92)
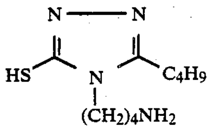
(V-93)
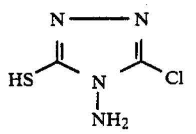
(V-94)
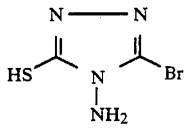
(V-95)
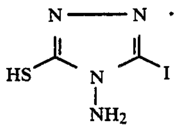
(V-96)
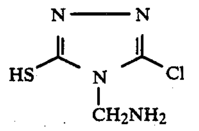
(V-97)
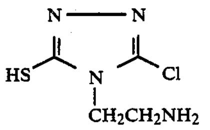
(V-98)
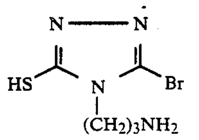
(V-99)
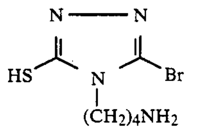
(V-100)

-continued
(V-101)
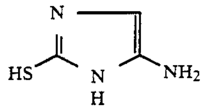
(V-102)
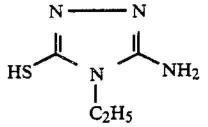
(V-103)
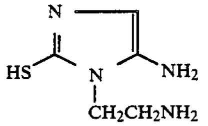
(V-104)
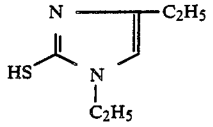
(V-105)
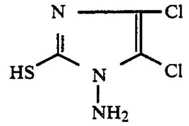
(V-106)
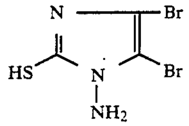
(V-107)
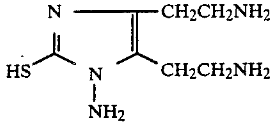
(V-108)
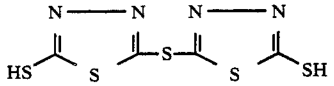
(V-109)
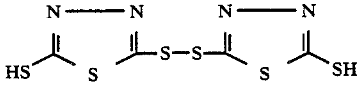
(V-110)
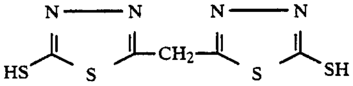
(V-111)
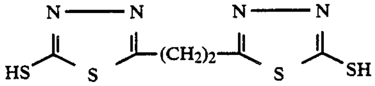
(V-112)
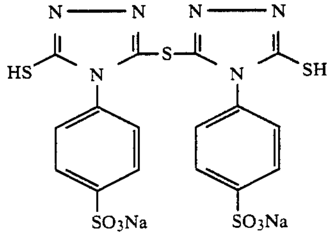
-continued
(V-113)
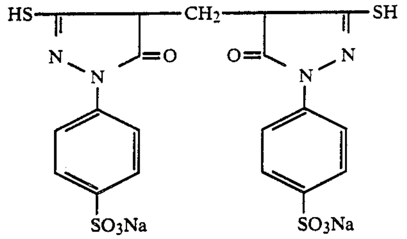
(V-114)
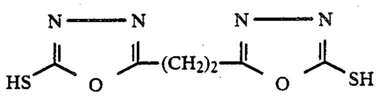
(V-115)
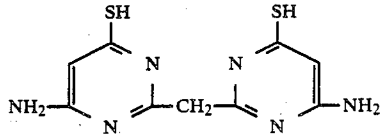
(V-116)
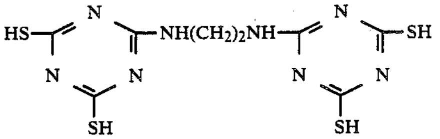
(V-117)
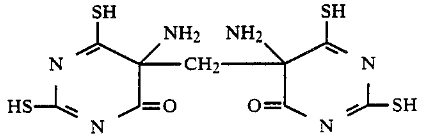
(V-118)
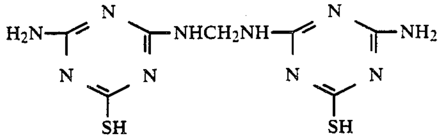
(V-119)
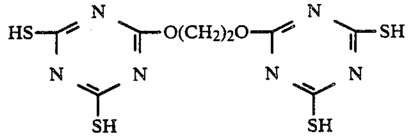
(V-120)
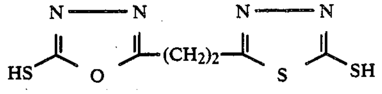
(V-121)
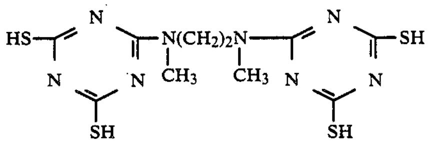
(V-122)
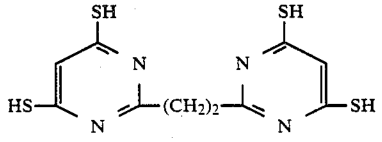
(V-123)
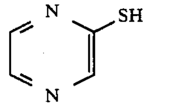

-continued
(V-124)
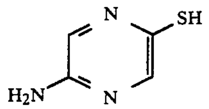
(V-125)
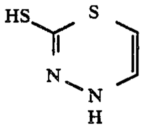
(V-126)
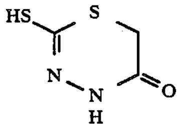
(V-127)
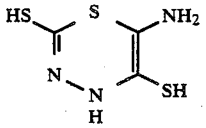
(V-128)
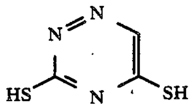
(V-129)
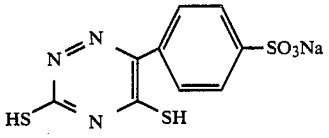
(V-130)
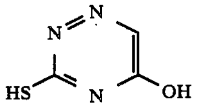
(V-131)
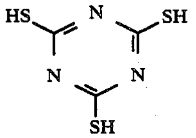
(V-132)
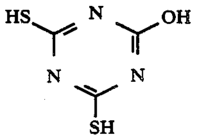
(V-133)
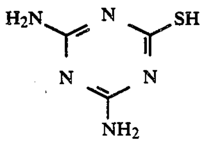
(V-134)
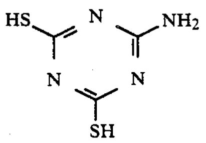
-continued
(V-135)
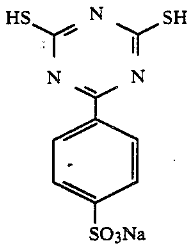
(V-136)
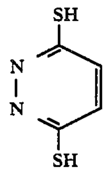
(V-137)
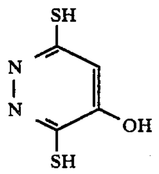
(V-138)
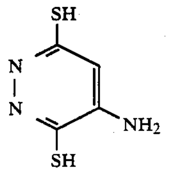
(V-139)
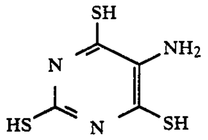
(V-140)
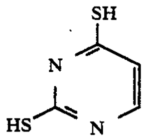
(V-141)
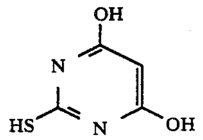
(V-142)
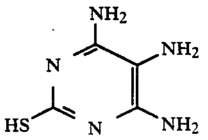
(V-143)
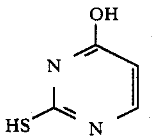

-continued
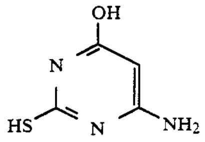
(V-144)
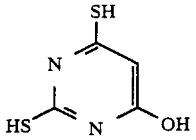
(V-145)
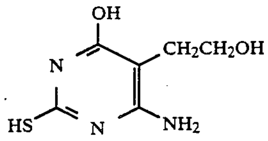
(V-146)
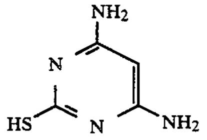
(V-147)
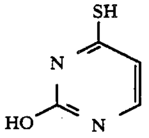
(V-148)
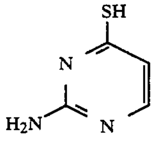
(V-149)
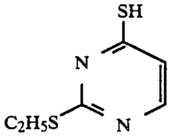
(V-150)
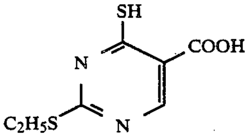
(V-151)
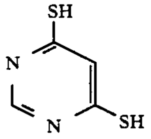
(V-152)
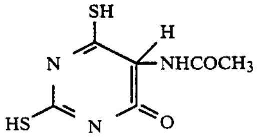
(V-153)
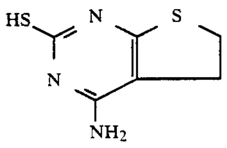
(V-154)
-continued
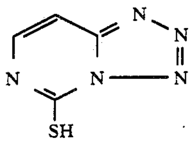
(V-155)
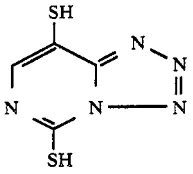
(V-156)
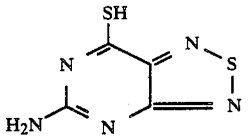
(V-157)
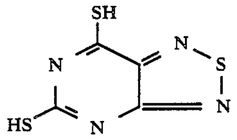
(V-158)
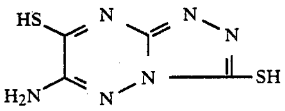
(V-159)
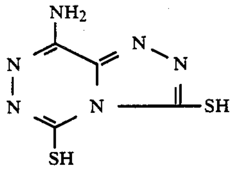
(V-160)
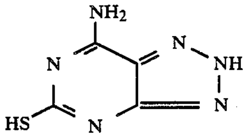
(V-161)
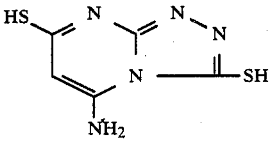
(V-162)
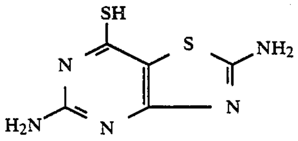
(V-163)
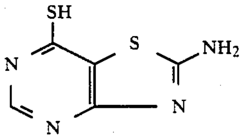
(V-164)

-continued
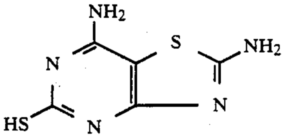
(V-165)
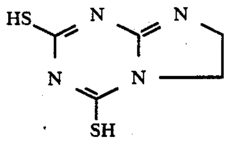
(V-166)
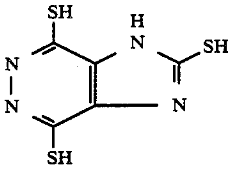
(V-167)
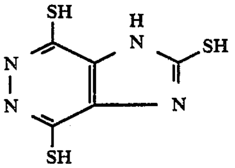
(V-168)
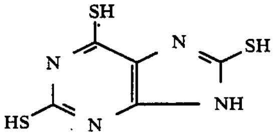
(V-169)
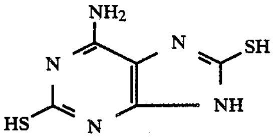
(V-170)
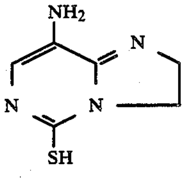
(V-171)
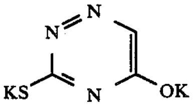
(V-172)
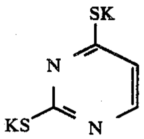
(V-173)
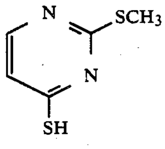
(V-174)
-continued
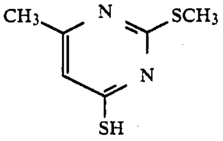
(V-175)
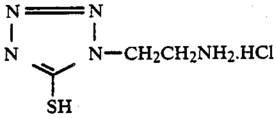
(V-176)
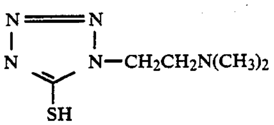
(V-177)
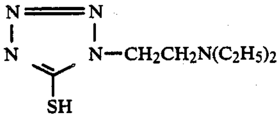
(V-178)
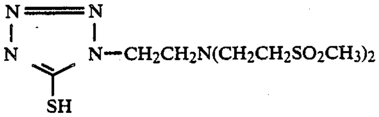
(V-179)
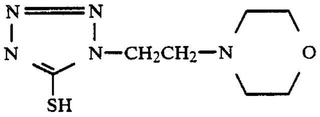
(V-180)
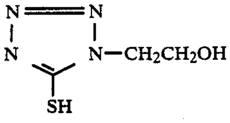
(V-181)
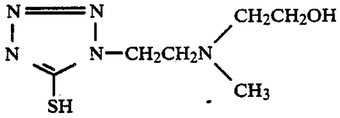
(V-182)
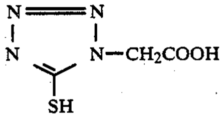
(V-183)
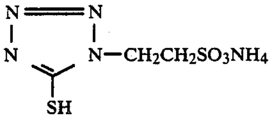
(V-184)
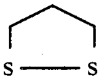
(VI-1)
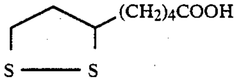
(VI-2)

-continued
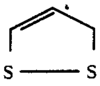
(VI-3)
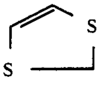
(VI-4)
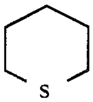
(VI-5)
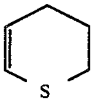
(VI-6)
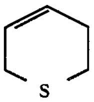
(VI-7)
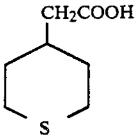
(VI-8)
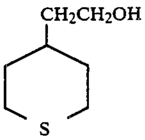
(VI-9)
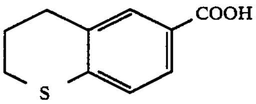
(VI-10)
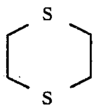
(VI-11)
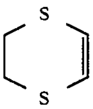
(VI-12)
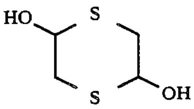
(VI-13)
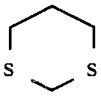
(VI-14)
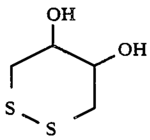
(VI-15)
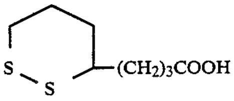
(VI-16)
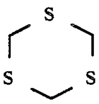
(VI-17)
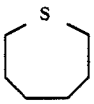
(VI-18)
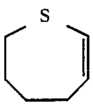
(VI-19)
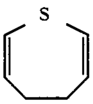
(VI-20)
-continued
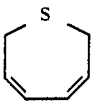
(VI-21)
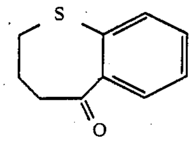
(VI-22)
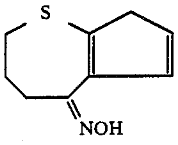
(VI-23)
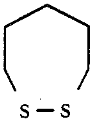
(VI-24)
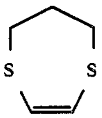
(VI-25)
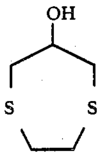
(VI-26)
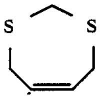
(VI-27)
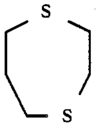
(VI-28)
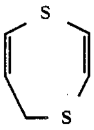
(VI-29)
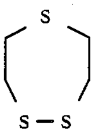
(VI-30)
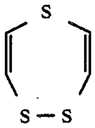
(VI-31)
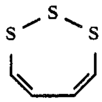
(VI-32)
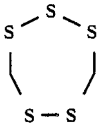
(VI-33)
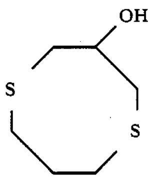
(VI-34)
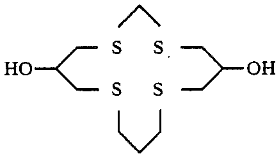
(VI-35)
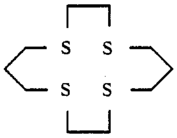
(VI-36)

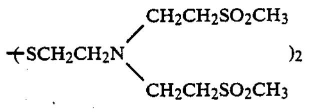
(VII-1)
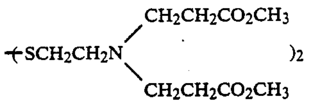
(VII-2)
$-(SCH_2CH_2NHCH_2CH_2CH_2SO_3H)_2$ (VII-3)
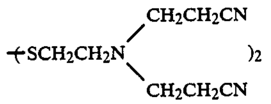
(VII-4)
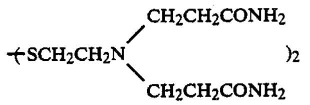
(VII-5)
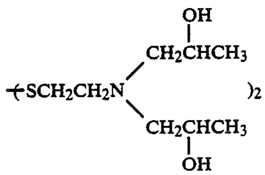
(VII-6)
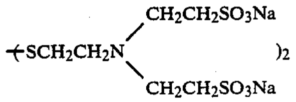
(VII-7)
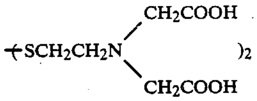
(VII-8)
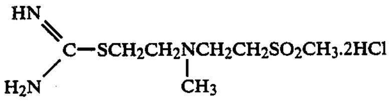
(VII-9)
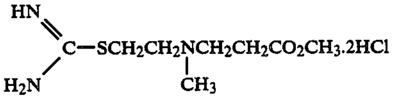
(VII-10)
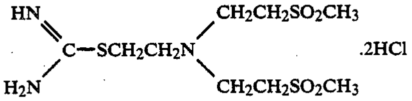
(VII-11)
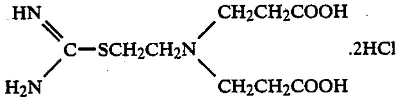
(VII-12)
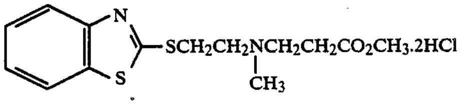
(VII-13)
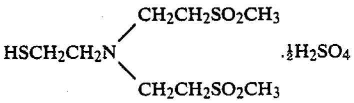
(VII-14)
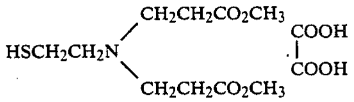
(VII-15)
-continued
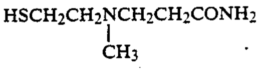
(VII-16)
$HSCH_2CH_2NHCH_2CH_2OH$ (VII-17)
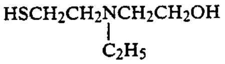
(VII-18)
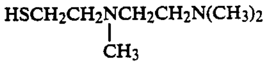
(VII-19)
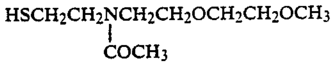
(VII-20)
Among the above-mentioned bleaching accelerators, the particularly preferable ones includes, for example, the following compounds:
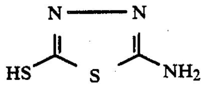
(1)
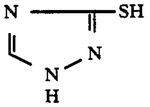
(2)
(3)
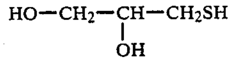
(4)
$HS—CH_2CH_2—COOH$ (5)
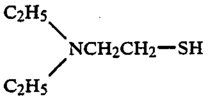
(6)
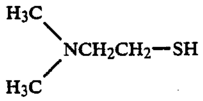
(7)
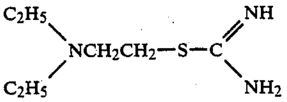
(8)
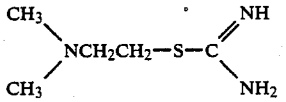
(9)
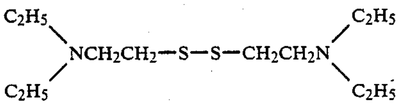
(10)
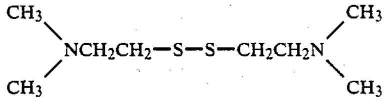
(11)

-continued

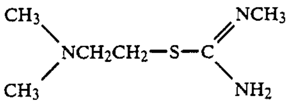
(12)

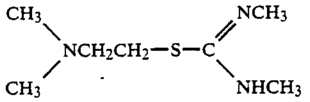
(13)

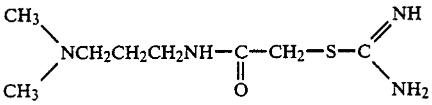
(14)

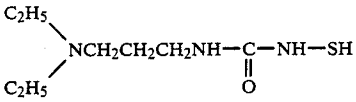
(15)

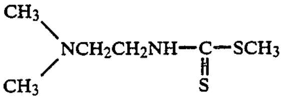
(16)

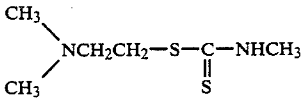
(17)

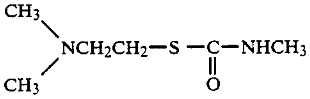
(18)

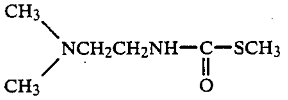
(19)

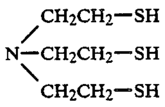
(20)

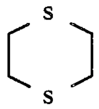
(21)

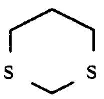
(22)

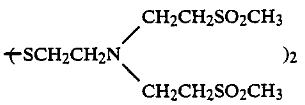
(23)

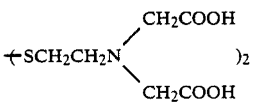
(24)

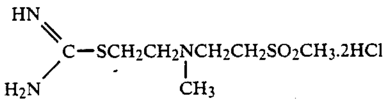
(25)

-continued

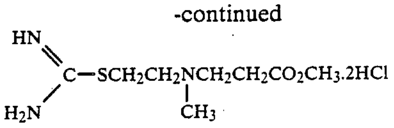
(26)

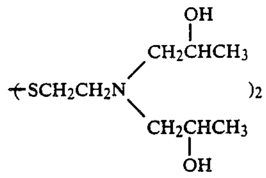
(27)

$HSCH_2CH_2NHCH_2CH_2OH$ (28)

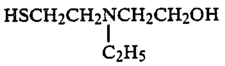
(29)

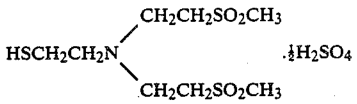
(30)

The above compounds may be easily synthesized in accordance with those prior-art techniques as described in, e.g., British Patent No. 1,138,842, Japanese Patent O.P.I. Publication Nos. 20832/1977, 28426/1978, 95630/1978, 104232/1978, 141632/1978, 17123/1980 and 95540/1985, and U.S. Pat. Nos. 3,232,936, 3,772,020, 3,779,757 and 3,893,858.

The bleaching accelerator preferably used in this invention should be present when bleaching the silver image that has been formed in the developing process; preferably should be added to the bleach-fix bath; also preferably should be incorporated into the bath (pretreatment solution, particularly prefixing bath) prior to the bleach-fix bath thereby to be carried out by a silver halide color photographic material into the bleach-fix bath; and most preferably should be present in both the pretreatment solution, particularly prefixing bath, and the bleach-fix bath. In this instance, the bleaching accelerator is allowed to be present in the pretreatment solution and then carried out by a photographic material to be processed into the bleach-fix bath. Alternatively, in the manufacture of a silver halide color photographic material, the bleaching accelerator may be in advance incorporated into the photographic material, thus making the accelerator present at the time of both pretreatment and bleach-fix of the photographic material.

These bleaching accelerators of this invention may be used alone or in combination of two or more. As for the adding amount of the bleaching accelerator to the bleach-fix solution or to the bath prior thereto (pretreatment bath, particularly prefixing bath), good results can be obtained when added in the range of normally from about 0.01 to 100 g per liter of each solution. However, generally speaking, when the adding amount is extremely small, the bleaching accelerating effect is small, while when the adding amount is excessively larger than is necessary, there are cases where a precipitate is produced to stain the silver halide color photographic material to be processed. Therefore, the adding amount is preferably from 0.05 to 50 g per liter of the processing solution, and more preferably from 0.05 to 15 g per liter.

In the case of adding the bleaching accelerator of this invention to the bleach-fix bath and/or the bath prior thereto (pretreatment bath, particularly prefixing bath), the bleaching accelerator may be added intact to be dissolved in the bath, but in general manner the accelerator is in advance dissolved into water, an alkali, an organic acid, etc., and the solution is added, or may, if necessary, be dissolved into an organic solvent such as methanol, ethanol, acetone, etc., and the solution is added. In either way, there is no difference in the bleach-fix effect.

It is desirable for the purpose of raising the bleach-fix effect to provide metallic ions in an arbitrary manner to the bleach-fix bath of this invention. The provision of metallic ions may be carried out in any forms of, e.g., halides, hydroxides, sulfates, phosphates, acetates, etc., but should preferably be provided in the form of a chelating agent complex salt of any of the following compounds given below (metallic compounds to provide metallic ions will be hereinafter called the metallic compound of this invention). However, the way of providing metallic ions is not limited by these providing methods. In addition, chelating agents used for this purpose may be arbitrary ones including organic polyphosphates, aminopolycarboxylic acids, and the like.

[EXEMPLIFIED COMPOUNDS]

(A-1) Nickel chloride,
(A-2) Nickel nitrate,
(A-3) Nickel sulfate,
(A-4) Nickel acetate,
(A-5) Nickel bromide,
(A-6) Nickel iodide,
(A-7) Nickel phosphate,
(A-8) Bismuth chloride,
(A-9) Bismuth nitrate,
(A-10) Bismuth sulfate,
(A-11) Bismuth acetate,
(A-12) Zinc chloride,
(A-13) Zinc bromide,
(A-14) Zinc sulfate,
(A-15) Zinc nitrate,
(A-16) Cobalt chloride,
(A-17) Cobalt nitrate,
(A-18) Cobalt sulfate,
(A-19) Cobalt acetate,
(A-20) Cerium sulfate,
(A-21) Magnesium chloride,
(A-22) Magnesium sulfate,
(A-23) Magensium acetate,
(A-24) Calcium chloride,
(A-25) Calcium nitrate,
(A-26) Barium chloride,
(A-27) Barium acetate,
(A-28) Barium nitrate,
(A-29) Strontium chloride,
(A-30) Strontium acetate,
(A-31) Strontium nitrate,
(A-32) Manganese chloride,
(A-33) Manganese sulfate,
(A-34) Manganese acetate,
(A-35) Lead acetate,
(A-36) Lead nitrate,
(A-37) Titanium chloride,
(A-38) Stannous chloride,
(A-39) Zirconium sulfate,
(A-40) Zirconium nitrate,
(A-41) Ammonium vanadate,
(A-42) Ammonium metavanadate,
(A-43) Sodium tungstate,
(A-44) Ammonium tungstate,
(A-45) Aluminum chloride,
(A-46) Aluminum sulfate,
(A-47) Aluminum nitrate,
(A-48) Yttrium sulfate,
(A-49) Yttrium nitrate,
(A-50) Yttrium chloride,
(A-51) Samarium chloride,
(A-52) Samarium bromide,
(A-53) Samarium sulfate,
(A-54) Samarium acetate,
(A-55) Ruthenium sulfate,
(A-56) Ruthenium chloride.

These metallic compounds of this invention may be used alone or in combination of two or more. The using quantity of any of these compounds in terms of metallic ions is preferably from 0.0001 mole to 2 moles, and most preferably from 0.001 mole to 1 mole.

The bleaching accelerator of this invention includes those having the foregoing Formulas [I] to [VII], wherein the heterocyclic residue, amino, aryl, alkenyl and alkylene groups represented by $R^1$, $R^2$, $R^3$, $R^4$, $R^5$, $R^8$, $R^9$, A, B, D, Z, Z', R and R' and formed by the R and $R^1$, $R^2$ and $R^3$, $R^4$ and $R^5$, and Q and Q' may each have a substituent. Examples of the substituent include alkyl groups, aryl groups, alkenyl groups, cycloalkyl groups, aralkyl groups, cycloalkenyl groups, halogen atoms, nitro group, cyano group, alkoxy groups, aryloxy groups, carboxy group, alkôxycarbonyl groups, aryloxycarbonyl groups, sulfo group, sulfamoyl group, carbamoyl group, acylamino groups, heterocyclic residues, arylsulfonyl groups, alkylsulfonyl groups, alkylamino groups, dialkylamino groups, anilino group, N-alkylanilino groups, N-arylanilino groups, N-acylanilino groups, hydroxy group, and the like. The alkyl groups represented by the foregoing $R^1$ through $R^5$, $R^8$, $R^9$, Z', R and R' may each have a substituent, and examples of the substituent include all the groups mentioned above except the alkyl groups.

The bleach-fix bath of the present invention contains an organic acid ferric salt (hereinafter called the ogranic acid ferric salt of the invention) as the bleaching agent.

The following are examples representative of the organic acid to form the organic acid ferric complex salt of this invention:

(1) Diethylenetriaminepentaacetic acid (MW=393.27),
(2) Diethylenetriaminepentamethylenesulfonic acid (MW=573.12),
(3) Cyclohexanediaminotetraacetic acid (MW=364.35),
(4) Cyclohexanediaminetetramethylenesulfonic acid (MW=58.23),
(5) Triethylenetetraminehexaacetic acid (MW=364.35),
(6) Triethylenetetraminehexamethylenesulfonic acid (MW=710.72),
(7) Glycol-ether-diaminetetraacetic acid (MW=380.35),
(8) Glycol-ether-diaminetetramethylenesulfonic acid (MW=524.23),
(9) 1,2-diaminopropanetetraacetic acid (MW=306.27),
(10) 1,2-diaminopropanetetramethylenesulfonic acid (MW=450.15),
(11) 1,3-diaminopropane-2-ol-tetraacetic acid (MW=322.27),
(12) 1,3-diaminopropane-2-ol-tetramethylenesulfonic acid, (MW=466.15),
(13) Ethylenediaminediorthohydroxyphenylacetic acid (MW=360.37),
(14) Ethylenediaminediorthohydroxyphenylmethylenesulfonic acid (MW=432.31),

(15) Ethylenediaminetetramethylenesulfonic acid (MW=436.13),
(16) Ethylenediaminetetraacetic acid (MW=292.25),
(17) Nitrilotriacetic acid (MW=191.14),
(18) Nitrilotrimethylenesulfonic acid (MW=299.05),
(19) Iminodiacetic acid (MW=133.10),
(20) Iminodimethylenesulfonic acid (MW=205.04),
(21) Methyliminodiacetic acid (MW=147.13),
(22) Methyliminodimethylenesulfonic acid (MW=219.07),
(23) Hydroxyethyliminodiacetic acid (MW=177.16),
(24) Hydroxyethyliminodimethylenesulfonic acid (MW=249.10),
(25) Ethylenediaminetetrapropionic acid (MW=348.35),
(26) Hydroxyethylglycidine (MW=163.17),
(27) Nitrilotripropionic acid (MW=233.22),
(28) Ethylenediaminediacetic acid (MW=176.17),
(29) Ethylenediaminedipropionic acid (MW=277.15), The organic acid ferric complex salts of this invention are not limited to these salts of the above enumerated acids. Any one of these may be arbitrarily selected to be used, and, if necessary, two or more of these may be used in combination.

The particularly preferred ones of the above organic acids for use in the formation of the organic acid ferric salt of the invention are:

(1) Diethylenetriaminepentaacetic acid (MW=393.27),
(3) Cyclohexanediaminotetraacetic acid (MW=364.35),
(5) Triethylenetetraminehexaacetic acid (MW=494.45),
(7) Glycol-ether-diaminetetraacetic acid (MW=380.35),
(9) 1,2-diaminopropanetetraacetic acid (MW—306.27),
(11) 1,3-diaminopropane-2-ol-tetraacetic acid (MW=322.27),
(13) Ethylenediaminediorthohydroxyphenylacetic acid (MW=360.37),
(16) Ethylenediaminetetraacetic acid (MW=292.25),
(17) Nitrilotriacetic acid (MW=191.14),
(19) Iminodiacetic acid (MW=133.10),
(21) Methyliminodiacetic acid (MW=147.13),
(23) Hydroxyethyliminodiacetic acid (MH=177.16),
(25) Ethylenediaminetetrapropionic acid (MW=348.35),
(26) Hydroxyethylglycidine (MW=163.17),
(27) Nitrilotripropionic acid (MW=233.22),
(28) Ethylenediaminediacetic acid (MW=176.17), and
(29) Ethylenediaminedipropionic acid (MW=277.15).

The organic acid ferric complex salt of this invention is used in the form of a free acid (hydroacid salt), an alkali metallic salt such as sodium salt, potassium salt, lithium salt, etc., or an ammonium salt or a water-soluble amine salt such as triethanolamine, and the like, and preferably used in the form of a potassium salt, sodium salt or ammonium salt. The use of at least one of these ferric complex salts is enough, but two or more of them may be used in combination. The using amount of these ferric complex salts may be arbitrarily selected, and should be settled according to the quantity of silver and the composition of the silver halide, e.g., of the photographic material to be processed.

That is, any of these ferric complex salts is desirable to be used in a quantity of not less than 0.01 mole per liter of using solution, and preferably in the quantity range of from 0.05 to 1.00 mole. If a replenisher of the ferric complex salt is to be used, a higly concentrated solution of the salt dissolved up to the limit of its solubility should be used as the reprenisher for the less replenishing amount with high concentration purpose.

The bleach-fix bath of this invention is used at the pH range of preferably from 2.0 to 10.0, more preferably from 3.0 to 9.5, and most preferably from 4.0 to 9.0. The bleach-fix bath is used at a temperature of preferably not more than 80° C., more preferably not more than 55° C., and most preferably not more than 45° C., and it should be used with its evaporation restrained. The processing time in the bleach-fix bath is preferably within 8 minutes, and more preferably within 6 minutes.

The bleach-fix bath of this invention may contain various additives in addition to the organic acid ferric complex salt as the bleaching agent. The bleach-fix bath is desirable to contain particularly an alkali halide or ammonium halide as the additive contributing to the bleach-fix characteritic, such as, for example, potassium bromide, sodium bromide, sodium chloride, ammonium bromide, ammonium iodide, sodium iodide, potassium iodide, or the like. And those known as ones usually used in an ordinary bleaching bath may also be arbitrarily added which include solvents such as triethanolamine, etc., acetylacetone, phosphonocarboxylic acid, polyphosphoric acid, organic phosphonic acid, oxycarboxylic acid, polycarboxylic acid, alkylamines, polyethylene oxides, or the like.

As the bleach-fix bath of this invention those may be used which include a bleach-fix bath of a composition containing a small amount of a halide such as potassium bromide; a bleach-fix bath of a composition comprising in contrast a large amount of a halide such as potassium bromide or ammonium bromide and/or ammonium iodide, potassium iodide, etc.; and also a specific bleach-fix bath of a composition comprising in combination the bleaching agent of this invention and a large amount of a halide such as potassium bromide.

Examples representative of the silver halide fixing agent to be contained in the bleach-fix bath of this invention include those compound as usually used in an ordinary fixing process, which reacts with a silver halide to form a water-soluble complex salt; for example, thiosulfates such as potassium thiosulfate, sodium thiosulfate, ammonium thiosulfate, etc., thiocyanates such as potassium thiocyanate, sodium thiocyanate, ammonium thiocyanate, etc., thiourea, thioether, highly concentrated bromides, iodides, and the like. Any of these fixing agents may be used in a quantity of not less than 5 g per liter, preferably not less than 50 g per liter, and more preferably not less than 70 g per liter up to the agent's dissolvable extent.

The bleach-fix bath of this invention is allowed to contain various pH buffers such as boric acid, borax, sodium hydroxide, pottasium hydroxide, sodium carbonate, potassium carbonate, sodium hydrogencarbonate, potassium hydrogencarbonate, acetic acid, sodium acetate, ammonium hydroxide, and the like, which may be used alone or in combination of two or more. Further, the bleach-fix bath may also contain various additives such as a brightening agent, defoaming agent and antimold agent, and may further contain a preservative such as hydroxylamine, hydrazine, a sulfite, a metabisulfite, a hydrogensulfite adduct of aldehyde or ketone compound, or the like, and other additives, and an organic solvent such as methanol, dimethylformamide, dimethylsulfoxide, or the like. Further, it is desirable to add to the bleach-fix bath any of those polymers or copolymers having a vinylpyrrolidone nucleus as disclosed in Japanese Patent Application No. 51803/1975.

Other useful compounds to be added to the bleach-fix bath of this invention to accelerate the bleach-fix rate thereof include tetramethylurea, trisdimethylamido phosphate, ϵ-caprolactam, N-methylpyrrolidone, N-methylmorpholine, tetraethylene-glycol-monophenyl ether, acetonitrile, glycolmonomethyl ether, and the like.

In the processing method of this invention, the bleach-fix of this invention is desirable to take place immediately after the color developing process, but may also be made after washing or rinsing or stopping following the color developing process. The most preferred way is to make the bleach-fix of this invention after the prefixing process following the color developing process as stated previously. In this instnace, the bleaching accelerator of this invention may be incorporated into the prefixing bath.

In the bleach-fix process of this invention, a stabilization process may take place without washing, or may take place after washing. In addition to the above processes, if necessary, various other additional auxiliary processes may be included which include hardening, neutralizing, black-and-white developing, reversal developing and light washing (with a small amount of water) processes.

Typical examples of the preferred processing methods include the following processes:

(1) Color developing→bleach-fix→washing,
(2) Color developing→bleach-fix→light washing→washing,
(3) Color developing→bleach-fix→washing→stabilizing,
(4) Color developing→bleach-fix→stabilizing,
(5) Color developing→bleach-fix→first stabilizing→second stabilizing,
(6) Color developing→washing (or stabilizing)→bleach-fix→washing (or stabilizing),
(7) Color developing→prefixing→bleach-fix→washing,
(8) Color developing→prefixing→bleach-fix→stabilizing,
(9) Color developing→prefixing→photoconductivity→first stabilizing→second stabilizing,
(10) Color developing→stopping→bleach-fix→washing→Color developing→stopping→bleach-fix→washing→stabilizing.

Of these processes the (3), (4), (5), (8) and (9) are more advantageously usable in this invention because they make the effect of this invention more conspicuous, and the most advantageous ones are (4), (5), (8) and (9).

The bleach-fix bath of this invention is desirable to contain various inorganic metallic salts. Such metallic salts may be added in the metallic complex salt form with a chelating agent.

To the bleach-fix bath of this invention may be added non-invention chelating agents and/or the ferric complex salts thereof. However, such non-invention ferric salts are desirable to be used in a quantity of not more than 0.45 mole% of the organic acid ferric complex salt of this invention.

As has been stated earlier, the prefixing bath is desirable to contain the bleaching accelerator of this invention. In this instance, it is also desirable to incorporate the bleaching accelerator into the bleach-fix bath. However, the bleaching accelerator is allowed to be added to either one of both baths. If the bleaching accelerator is added to the prefixing bath only, then there appears an effect that the bleaching accelerator is carried out by a silver halide color photographic material from the prefixing bath into the bleach-fix bath.

In the bleach-fix bath, an oxidation treatment is desirable to be effected in order to return the reductant of the ferric complex salt produced therein to an oxidant. For the oxidation treatment, for example, the air-oxidation treatment process is used. The air-oxidation treatment herein means a forced oxidation process that effects an oxidation treatment by conducting and mixing air bubbles forcibly into the processing solutions inside the bleacher tank or bleach-fix tank of an automatic processor. This treatment also includes bringing the solution's surface into contact with air to thereby have the solution naturally oxidized, but this means, usually called 'aeration,' in order to raise its oxidation efficiency, is desirable to be made in the manner that the air sent from a device such as an air compressor is conducted through and by a diffuser having fine holes, such as an air distributer, to make the air as much small-diameter bubbles as possible to increase the air's contact area with the solution, into the solution from the bottom of such the tank.

The aeration takes place mainly inside the tank, but may be made in a batch in another tank, or may also be made by an auxiliary tank for aeration use provided on the side of of the tank. Particularly in the case where the recycling of the bleaching solution or bleach-fix solution is to take place, the aeration is desirable to be made outside the tank. In the present invention, since there is no need to take care of over aeration, the aeration may be effected continuously throughout the whole processing time, or strong aeration may be effected intermittently; thus, any arbitrary method may be used to carry out the aeration, provided, however, that the air bubbles' diameter should be as much small as possible to raise the aeration efficiency, and by doing so, possible mixing of the solution into other solutions can be prevented, and thus this manner is considered an advantageous method. In this invention, the manner that the aeration is effected during the downtime of the automatic processor used and is stopped during the operation of the automatic processor may also be a preferred method. Otherwise, the aeration may also be made with the solution being conducted outside the processing tank. The above-mentioned aeration may be made in combination with those shower process, spray process and jet-spray process, and the like, as described in Japanese Patent O.P.I. Publication Nos. 55336/1974, 9831/1976 and 95234/1979, and may also be made by using those methods as described in West German OLS Patent No. 2,113,651.

The total coating amount of silver of the silver halide color photographic material of this invention is of a value including the quantities of the silver contained in the colloidal silver filter layer and in the colloidal silver antihalation layer, and is not more than 80 $mg/dm^2$, and in this instance the effect of the present invention can be displayed, and when the value is preferably not more than 60 $mg/dm^2$, particularly preferably not more than 50 $mg/dm^2$, the effect becomes more conspicuous. From the photographic characteristics point of view, the amount of silver is desirable to be over 20 $mg/dm^2$, and in that case, this invention can display its effect remarkably.

The thickness of the photographic component layers of the silver halide color photographic material of this invention means the total value, excluding the thickness of the support, of the dry thicknesses of the photographic component layers; i.e., all the hydrophilic colloid layers such as the subbing layer, antihalation layer, interlayers, at least three emulsion layers, filter layers, protective layer, and the like.

The measurement of the thickness is carried out by using a micrometer. In this invention, the total value of the thicknesses of the photographic component layers, when dried, is from 8 μm to not more than 25 μm, preferably not more than 22 μm, more preferably not more than 20 μm, and most preferably not more than 18 μm. From the photographic characteristics point of view, the value is to be not less than 8 μm, and in this instance the effect of this invention is displayed.

The silver halide of the silver halide emulsion layers of this invention contains at least 0.5 mole% silver iodide grains. In order to make the most of the bleach-fix characteristics of this invention, the silver iodide content is to be from 0.5 mole% to 25 mole% from the standpoint of both photographic characteristics and bleach-fix characteristics. If the silver iodide content exceeds 25 mole%, it is more favorable in respect of the photographic characteristics, but results in the deterioration of the bleach-fix characteristics. Accordingly, the silver iodide content should be more preferably from 2 mole% to 20 mole%.

The black colloidal silver-dispersed antihalation layer of a photographic material used in this invention has an adequately high optical density against the incident light in the visible ray region (particularly red rays) from the support side or from the emulsion surface side of the silver halide color photographic material, and also has a reflectance low enough for the incident light from the emulsion surface side of the photographic material.

The foregoing black colloidal silver-dispersed layer is desirable to be of adequately fine-grained colloidal silver in respect of the reflectance and the bleach-fix characteristics, but if the colloidal silver is extremely fine-grained, its absorption region is shifted toward the yellow or yellowish brown side to thereby allow no increase in the optical density to red light, so that the colloidal silver cannot but be coarse-grained to some extent. As a result, it tends to cause a physical development based on the silver grains as nuclei, which is considered to deteriorate the bleach-fix ability in the interface between the colloidal layer and the silver halide emulsion layer. Particularly in the case where silver halide emulsion layers contain at least 0.5 mole% silver iodide grains, especially where the nearest silver halide emulsion layer to the support contains at least 0.5 mole% silver iodide, the bleach-fix ability deteriorating phenomenon becomes conspicuous, and particularly more conspicuous in a multilayer silver halide color photographic material having three or more silver iodide-containing emulsion layers, so that in this instance, the effect of this invention is considered to become particularly remarkable.

In the present invention, the remarkable effect of this invention can be found particularly in the case where a photographic material containing a core/shell-type emulsion. The core/shell emulsion partially used is detailed in Japanese Patent O.P.I. Publication No. 154232/1982, but the preferred silver halide color photographic material is of a silver halide composition comprising a core whose silver iodide content is from 0.1 to 20 mole%, and preferably from 0.5 to 10 mole%, and a shell consisting of silver bromide, silver chloride, silver iodobromide or silver chlorobromide or a mixture of these silver halides.

The shell is preferably a silver halide emulsion consisting of silver iodobromide or silver bromide. And in this invention, a favorable effect can be displayed when the core consists of substantially monodisperse silver halide grains and the shell is of a thickness of from 0.01 to 0.8 μm.

The preferable embodiment of the silver halide color photographic material used in the process of this invention are such that the photographic material comprises silver halide grains containing at least 0.5 mole% silver iodide, and particularly uses silver iodide-containing silver halide grains for the core and/or shell, the silver halide grains being comprised of silver bromide, silver chloride, silver chlorobromide or a mixture of these silver halides, the shell being of a specific thickness and consealing the core, thereby making the most of the high sensitizability of the silver iodide-containing silver halide grains and covering up the disadvantageous nature of the grains.

The silver halide emulsion comprising silver halide grains having a shell of the above specific thickness may be prepared by covering the core consisting of silver halide grains contained in a monodisperse emulsion with a shell. In addition, where the shell is silver iodobromide, the proportion of the silver iodide to the silver bromide is desirable to be not more than 20 mole%. Having the core comprised of monodisperse silver halide grains can be carried out by preparing an emulsion with its pAg being maintained constant in accordance with the double jet method, whereby desired size-having grains can be obtained. The preparation of a highly monodisperse emulsion can be made by applying any of those methods as described in Japanese Patent O.P.I. Publication No. 48521/1979. Of these methods the preferred embodiment is a preparation by the addition of both an aqueous potassium iodobromide-gelatin solution and ammoniacal silver nitrate solution to a silver halide seed grains-containing aqueous gelatin solution with the adding rate being changed as the function of time. In this instance, by appropriately selecting the time function of the adding rate, pH, pAg, temperature, etc., a highly monodisperse silver halide emulsion can be obtained. Since the grain size distribution of the monodisperse emulsion forms an almost normal distribution curve, the standard deviation can be easily obtained. Upon this, if the width (%) of the distribution is defined by the equation:

$$\frac{\text{Standard deviation}}{\text{Average grain size}} \times 100 = \text{Width of distributions (\%)}$$

the width of the distribution which enables to significantly withstand the regulation of the absolute thickness of the shell is desirable to be not more than 20% monodispersivity, and more preferably not more than 10%.

The shell covering the core shall be of such a thickness as not covering up the desirable nature of the core, and at the same time shall be of a thickness enough to cover up the undesirable nature of the core. That is, the thickness is limited to a small range between such the upper and lower limits. Such the shell can be formed by the reaction of a soluble silver halide compound solution with a soluble silver nitrate solution in accordance with the double jet method to thereby deposit the resulting product over the monodisperse core.

For example, according to an experiment in which 2 mole% silver iodide-containing substantially monodisperse silver halide grains having an average grain size of 1 μm were used as the core, and 0.2 mole% silver iodobromide was used as the shell, and the thickness of the shell was varied variously, where the shell having a thickness of, e.g., 0.85 μm was prepared, the monodisperse silver halide grains prepared in this manner had a low covering power. When this was processed in a physically developable processing solution containing a silver halide solvent and then observed through a scanning electron microscope, no filaments of the developed silver were found. This suggests that such a thickness deteriorates the optical density and further lower the covering power. Hereupon, taking into account the filament form of the developed silver, the surface silver bromide shell was made thinner with the core's average grain size being varied. As a result, it was found that in an absolute thickness of not more than 0.8 μm (preferably not more than 0.5 μm) a number of satisfactory developed silver's filaments were produced, regardless of the core's average grain size, whereby an adequate optical density was obtained and at the same time the sensitizability of the core was not impaired.

On the other hand, if the thickness of the shell is extremely thin, then the surface of the core containing silver iodide is partially exposed, whereby the effect of covering the core, i.e., the chemical sensitization effect, and the rapid developing and rapid fixing characteristics are lost. The limit of the thickness is desirable to be down to 0.01 μm.

Further, to take into account a highly monodisperse core having a distribution width of not more than 10%, the preferred thickness of the shell is from 0.01 to 0.06 μm, and the most preferred thickness is not more than 0.03 μm.

That the developed silver filaments are adequately produced to increase the optical density, that the sensitizability of the core is used efficiently to produce its sensitization effect, and that the rapid developability and rapid fixability are brought about, which have been described above, are attributable to the shell whose thickness is regulated as described above by the monodisperse core and to the synergistic effect by the silver halide compositions of both core and shell. Accordingly, if the thickness of the shell is satisfactorily regulated, the silver halide which constitutes the shell can be silver iodobromide, silver bromide, silver chloride or silver chlorobromide or a mixture of these silver halides. Particularly, from the standpoint of the compatibility with the core, characteristics stability of perservability, the silver halide is preferably silver bromide, silver iodobromide or a mixture of these silver halides.

The light-sensitive silver halide emulsion used in this invention may be subjected to doping with various metallic salts or metallic complex salts during the production of the core/shell silver halide precipitates, during the growth of silver halide grains or after completion of the growth of silver halide grains, the metallic salts or metallic complex salts including those of, e.g, gold, platinum, palladium, iridium, rhodium, bismuth, cadmium, copper, etc., which metallic salts or complex salts may be used alone or in combination. Those excessive halide compounds or secondarily produced or disused salts such as nitrates, ammonium salts, etc., or other compounds, which are produced during the preparation of the emulsion to be used in this invention, may be removed. The removal may be made by using arbitrarily those usually used in ordinary emulsions such as the noodle washing method, dialysis method, coagulation precipitation method, or the like.

The emulsion used in this invention may be subjected to those various chemical sensitization methods as used for ordinary emulsions; that is, the emulsion may be chemically sensitized by either single use or combined use of those chemical sensitizers including active gelatin; noble metallic sensitizers such as water-soluble gold salts, water-soluble platinum salts, water-soluble palladium salts, water-soluble rhodium salts, water-soluble iridium salts, etc.; sulfur sensitizers; selenium sensitizers; reduction sensitizers such as polyamines, stannous chloride, etc.; or the like. Further, the silver halide of the emulsion may be optically sensitized to desired wavelength regions. No particular restrictions are put on the method for optically sensitizing the emulsion; for example, the emulsion may be optically sensitized by the single use or combined use of optical sensitizers including, e.g., cyanine dyes such as zeromethine dyes, monomethine dyes, trimethine dyes, etc., or merocyanine dyes. These sensitizing techniques are described in U.S. Pat. Nos. 2,688,545, 2,912,329, 3,397,060, 3,615,635, 3,628,964, British Patent Nos. 1,195,302, 1,242,588, 1,293,862, West German OLS Patent Nos. 2,030,326, 2,121,780, Japanese Patent Examined Publication Nos. 4936/1968, 14030/1969, and the like. These sensitizers may be arbitrarily selected to be used according to the wavelength region to which the emulsion is to be sensitized, the speed of the emulsion, and the purpose for which the emulsion is used.

In the formation of silver halide grains to be contained in the emulsion of this invention, a silver halide emulsion containing core grains being substantially monodisperse silver halide grains is used, and the core grain is covered with a shell, whereby a monodisperse silver halide emulsion having uniform thickness-having shells is obtained. Such the substantially monodisperse silver halide emulsion may be used with its grain size distribution being intact, or may be used after being prepared, so that a specified gradation can be obtained, by blending two or more monodisperse emulsions different in the average grain size in an arbitrary stage after the grain formation.

In this instance, the silver halide emulsion used in this invention is desirable that the emulsion obtained by covering with a shell the substantially monodisperse core whose grain size distribution width is not more than 20% is to be contained in a proportion of 50% or more. However, the emulsion is allowed to contain additional non-invention silver halide grains within a range not to impair the effect of this invention. The non-invention silver halide may be of either core/shell type or non-core/shell type, and may also be either monodisperse or polydisperse. In the silver halide emulsion used in this invention, at least 65% by weight of the silver halide grains contained therein is desirable to be the silver halide grains of this invention, and it is more desirable that almost all of them are the silver halide grains of this invention.

The present invention includes also the case where the silver halide emulsion is one comprising at least 0.5 mole% silver iodide-containing plate-form silver halide grains. Namely, the invention includes the case where the emulsion of this invention used in the silver halide emulsion layer used in this invention belongs to any one of the embodiments in which the silver halide grains are (1) the foregoing silver iodide-containing core/shell grains, (2) silver iodide-containing plate-form silver halide grains (the silver iodide-containing plate-form silver halide grains may be either core/shell-type or non-core/shell-type), and (3) a mixture of the above (1) and (2).

The silver iodide-containing plate-form silver halide grain will be further illustrated in detail below:

The plate-form silver halide grain is desirable to be one whose size is five times the thickness thereof. The plate-form silver halide grain may be prepared by any of those generally applicable methods as described in Japanese Patent O.P.I. Publication Nos. 113930/1983, 113934/1983, 127921/1983, 108532/1983, 99433/1984, 119350/1984, and the like. In the present invention, from the standpoint of the effect upon color stain or the image quality, it is desirable to use grains whose size is not less than five times the thickness thereof, preferably in the range of from 5 to 100 times, and particularly preferably from 7 to 30 times. Further, the grain size is desirable to be not less than 0.3 μm, and more preferably from 0.5 to 6 μm. The objects of this invention can be effectively accomplished when processing a photographic material having one layer containing at least 50% by weight plate-form silver halide grains in at least one silver halide emulsion layer, and the objects of this invention can be particularly effectively accomplished where almost all the silver halide grains are the foregoing plate-form silver halide grains.

The plate-form silver halide grains, when they are of the core/shell type, are very useful. In the case of the core/shell type, the silver halide grains are desirable to satisfy the requiredments therefor including the requirement described above about the core/shell.

Generally, the plate-form silver halide grain is in the plate form having two parallel planes. Therefore, the 'thickness' used herein is expressed by the distance between the two parallel planes constituting the plate-form silver halide grain.

And the 'grain size' used herein means the diameter of the projected area when observed from a point in the direction perpendicular to the flat plane of the plate-form silver halide grain, and if it is not circular, a circle is assumed with its diameter corresponding to the longest diagonal, and this diameter is regarded as the grain size.

The halide composition of the plate-form silver halide grain is desirable to be silver bromide and silver iodobromide, and particularly desirable to be silver iodobromide containing 0.5–10 mole% silver iodide.

Methods for preparing the plate-form silver halide grain will be subsequently described below:

The preparation of the plate-form silver halide grain may be carried out by arbitrarily combining those methods known to those skilled in the art.

For example, the preparation can be carried out in the manner that a crystal containing more than 40% by weight plate-form silver halide grain in an atmosphere of a relatively high pAg value with a pBr of not more than 1.3, and the crystal is grown with the pBr being maintained at the same value by adding simultaneously a silver salt solution and a halide solution.

During the course of growing the grain, the silver salt and halide solutions are desirable to be added with care not to produce an additional crystal nucleus.

The size of the plate-form silver halide grain can be controlled by appropriately regulating temperature, selecting the kind and quantity of the solvent used, and controlling the adding rate of the ferric complex salt and halide used in growing the grain.

The grain size, grain form (diameter/thickness ratio, etc.), grain size distribution, and grain's growth rate can be controlled by adding at need a silver halide solvent during the course of the preparation of the plate-form silver halide grain. The using quantity of the silver halide solvent is desirable to be $1\times10^{-3}$ to 1.0% by weight of the reaction liquid, and more desirable to be $1\times10^{-2}$ to $1\times10^{-1}$% by weight.

For example, the silver halide grain size distribution is made monodisperse with an increase in the using quantity of the silver halide solvent, where by the growth rate can be accelerated. On the other hand, there is also a tendency of the thickness of the silver halide grain to increase with the using quantity of the silver halide solvent.

Usable examples of the silver halide solvent includes ammonia, thioethers, thioureas, and the like. Regarding the thioether, reference can be made to U.S. Pat. Nos. 3,271,157, 3,790,387, 3,754,628, and the like.

In preparing the plate-form silver halide grain, methods for increasing the adding rate, adding quantities, adding concentrations of the silver salt solution (e.g., aqueous $AgNO_3$ solution) and halide solution (e..g., aqueous KBr solution) added in order to accelerate the growth of the grain are favorably used.

Regarding such methods, reference can be made to British Patent No. 1,335,925, U.S. Pat. Nos. 3,672,900, 3,650,757, 4,242,445, Japanese Patent O.P.I. Publication Nos. 142329/1980, 158124/1980, and the like.

The plate-form silver halide grains-containing emulsion may, if necessary, be chemically sensitized. As for the chemical sensitization, reference can be made to the sensitization methods previously described in the foregoing core/shell, but from the silver saving point of view, the single use or combined use of the gold sensitization or sulfur sensitization is desirable for the plate-form silver halide grain of this invention.

In the plate-form silver halide grains-containing layer, the plate-form silver halide grains are desirable to be contained in the layer in a proportion of not less than 40% by weight to the whole silver halide grains of the layer, and preferably not less than 60% by weight.

The thickness of the plate-form silver halide grains-containing layer is desirable to be from 0.5 μm to 5.0 μm, and more desirable to be from 1.0 μm to 3.0 μm.

The coating amount of the plate-form silver halide grains (on one side alone of the support) is desirable to be 0.5 $g/m^2$ to 6 $g/m^2$, and more desirable to be 1 $g/m^2$ to 5 $g/m^2$.

No particular restrictions are put on the construction of the plate-form silver halide grains-containing layers and other layers, such as, e.g., binder, hardener, antifoggant, silver halide stabilizer, surfactant, spectrally sensitizing dyes, other dyes, ultraviolet absorbing agent, and the like. As for this, for example, reference can be made to Research Disclosure vol. 176, p 22–28 (December 1978).

Subsequently, the construction of those silver halide emulsion layers present outside (surface side) the above plate-form silver halide grains-containing layer (hereinafter called upper emulsion layers) will be described below:

As the silver halide grains for the upper silver halide emulsion layer those high-speed silver halide grains for those ordinary radiographic films may be advantageously used.

The form of the silver halide grain is desirable to be a spherical or polyhedral form or of a mixture of two or more of these forms. Particularly, those spherical grains and/or polyhedral grains whose diameter/thickness ratio is not more than 5 are desirable to account for 60% by weight of the whole grains.

The average grain size is desirable to be 0.5 μm to 3 μm , and may be grown by using, if necessary, a solvent such as ammonia, thioether, thiourea, or the like.

The silver halide is desirable to be highly sensitized by the gold sensitization method or other noble metal sensitization method or reduction sensitization method or sulfur sensitization method or a sensitization method comprising in combination two or more of these sensitization methods.

No particular restrictions are placed on the upper emulsion layer or other construction as in the case of the plate-form silver halide grains-containing layer, and regarding this, reference can be made to the foregoing Research Disclosure vol. 176.

The emulsion used in this invention is also desirable to contain any of those epitaxial junction silver halide grains as described in Japanese Patent O.P.I. Publication Nos. 103725/1978, 133540/1984, 162540/1984, and the like.

The silver halide emulsion of this invention may contain those usually applicable various additives according to the purpose for which the emulsion is used. For example, stabilizers or antifoggants such as azaindenes, triazoles, tetrazoles, imidazoliums, tetrazolium salts, polyhydroxy compounds, etc.; hardeners such as aldehyde-type, aziridine-type, isooxazole-type, vinylsulfone-type, acryloyl-type, carbodiimide-type, maleimide-type, methanesulfonate-type and triazine-type compounds, etc.; development accelerators such as benzyl alcohol, polyoxyethylene-type compounds, etc.; image stabilizers such as chroman-type, chraman-type, bisphenol-type, and phosphite-type compounds; lubricants such as wax, higher fatty acid glycerides, higher alcohol esters of higher fatty acids; and the like, may be used. And as the surfactant to be used as coating aid, agent for improving the permeability to processing solutions, defoaming agent or agent for controlling the physical characteristics of the photographic material, those surfactants of the anion type, cation type, nonionic type or amphoteric type may be used. Particularly for a processing bath having bleachability the dissolving out of such surfactants into the bath is desirable. Those additive usable as the antistatic agent for the silver halide emulsion includes diacetyl cellulose, styrene perfluoroalkyl-sodium maleate copolymers, alkali salts of the reaction product of styrene-maleic anhydride copolymer and p-aminobenzenesulfonic acid, and the like. Those usable as the matting agent include methyl polymethacrylate, polystyrene and alkali-soluble polymers. Further, colloidal silicon oxide may also be used. Those latexes to be added for improving the layer physical characteristics include copolymers of acrylates, vinyl esters or the like with other monomers having an ethylene group. Those usable as the gelatin plasticizer include glycerol, glycol-type compounds, and the like, and those as the viscosity increasing agent include styrene-sodium maleate copolymer, alkylvinyl ether-maleic acid copolymers, and the like.

In the silver halide color photographic material of this invention, those hydrophilic colloids usable for the preparation of the emulsion and other hydrophilic colloid layer coating liquids include proteins such as gelatin, derivative gelatins, graft polymers of gelatin with other high molecular materials, albumin, casein, etc.; cellulose derivatives such as hydroxyethyl cellulose, carboxymethyl cellulose, etc.; and synthetic hydrophilic high molecular materials including homopolymers or copolymers of starch derivatives, polyvinyl alcohols, polyvinyl imidazoles, polyacrylamides and the like.

Those materials usable as the support of the silver halide color photographic material processed in the method of this invention includ, e.g., glass plates, polyester film such as of cellulose acetate, cellulose nitrate, polyethylene terephthalate, etc., polyamide film, polycarbonate film, polystyrene film, and the like; and further, ordinarily used reflective support materials such as varyta paper, polyethylene-coated paper, polypropylene synthetic paper, reflective layer or reflective material-combined transparent support, and the like. Those support materials may be arbitrarily selected to be used according to the purpose for which the photographic material is used.

For the coating of the silver halide emulsion layers and other photographic component layers used in this invention, various coating methods such as dipping coating, air doctor coating, curtain coating, hopper coating, or the like, may be used. And those simultaneous coating methods for coating two or more layers at the same time as described in U.S. Pat. Nos. 2,761,791 and 2,941,898 may also be used.

The silver halide emulsion of this invention, in order to be applied to a color photographic material, the emulsion is coated to form an appropriate number of emulsion layers which are sensitized to be red-sensitive, green-sensitive and blue-sensitive, into which are appropriately incorporated cyan, magenta and yellow couplers in combination in the manner and using necessary materials for use in color photographic materials.

The present invention's bleach-fix bath-applicable silver halide color photographic material may be either of the coupler-in-emulsion type which contains color formers thereinside (see U.S. Pat. Nos. 2,376,679 and 2,801,171) or of the type of being developed in a color former-containing developer (see U.S. Pat. Nos. 2,252,718, 2,592,243 and 2,590,970). As for the color former, those color formers generally known to those skilled in the art may be arbitrarily used. For example, cyan color formers are those compounds based on the naphthol or phenol structure and forming indoaniline dyes for their coupling reaction; magenta color formers are those compounds of structures based on the active methylene group-having 5-pyrazolone ring; and yellow color formers are those compounds of the acylacetanilide structure such as active methylene chain-having benzoylacetanilide, pivalylacetanilide, etc., with or without a substituent in their coupling position. Thus, any of the so-called two-equivalent-type and four-equivalent-type couplers may be used as the color formers.

However, from the viewpoints that the discoloration of a color image obtained through a color development is to be reduced, and or a color turbidity is to be prevented, it is particularly preferred to use the compounds represented by the Formula [C I], [C II] or [C VI] below so as to serve as a cyan coupler.

Formula [C I]

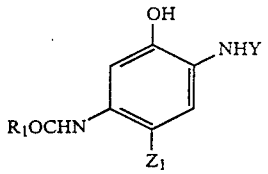

Formula [C II]

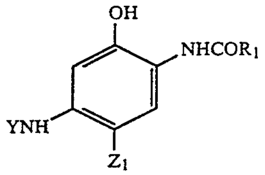

wherein Y represents —$COR_2$,

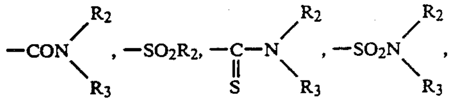

—$CONHCOR_2$ or —$CONHSO_2R_2$; $R_2$ represents an alkyl, alkenyl, cycloalkyl, aryl or heterocylic group; $R_3$ represents hydrogen, an alkyl, alkenyl, cycloalkyl, aryl or heterocyclic group; and $R_2$ and $R_3$ are also allowed to couple to each other so as to form a 5- or 6-membered ring.

Also, in the Formulas, $R_1$ represents a ballast group; and $Z_1$ represents hydrogen or a group capable of splitting off upon coupling it to the oxidation products of an aromatic primary amine color developing agent.

Formula [C VI]

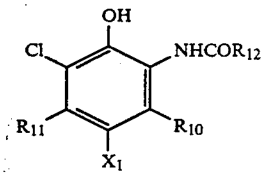

wherein one of $R_{10}$ aind $R_{11}$ is hydrogen and the other of them is a normal-chained or branch-chained alkyl group having at least 2 to 12 carbon atoms; $X_1$ represents hydrogen or a group capable of splitting off upon coupling reaction thereof with the oxidation products of an aromatic primary amine color developing agent; and $R_{12}$ represents a ballast group.

First, the cyan couplers each represented by the Formula [C I] or [C II] to be used in the invention will be described below.

In the above-given Formulas [C I] and [C II], $Y_1$ represents a group represented by the —$COR_2$,

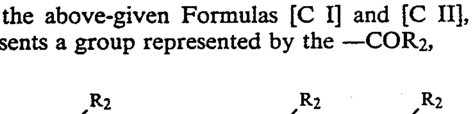

wherein $R_2$ represents an alkyl group and more preferably an alkyl group having 1 to 20 carbon atoms such as a methyl, ethyl, t-butyl or dodecyl group; an alkenyl group and more preferably an alkenyl group having 2 to 20 carbon atoms such as an allyl or heptadecenyl group; a cycloalkyl group and more preferably a cycloalkyl group having a 5- to 7-membered ring such as a cyclohexyl group; an aryl group such as a phenyl, tolyl or naphthyl group; and a heterocyclic group and more preferably a heterocyclic group having a 5- or 6-membered ring containing 1 to 4 nitrogen, oxygen or sulfur atoms such as a furyl, thienyl or benzothiazolyl group; and $R_3$ represents a hydrogen atom or a group represented by $R_2$. $R_2$ and $R_3$ are allowed to couple to each other so as to form a 5- or 6-membered heterocyclic ring containing nitrogen, and $R_2$ and $R_3$ are also allowed to introduce thereinto an arbitrary substituent including, for example, an alkyl group having 1 to 10 carbon atoms such as an ethyl, i-propyl, i-butyl, t-butyl or t-octyl group; an aryl group such as a phenyl or naphthyl group; a halogen atom such as fluorine, chlorine or bromine atom; a cyano group; a nitro group; a sulfonamido group such as a methanesulfonamido, butanesulfonamido or p-toluene-sulfonamido group; a sulfamoyl group such as a methylsulfamoyl or phenylsulfamoyl group; a sulfonyl group such as a methanesulfonyl or p-toluenesulfonyl group; a fluorosulfonyl group; a carbamoyl group such as adimethylcarbamoyl or phenylcarbamoyl group; an oxycarbonyl group such as an ethoxycarbonyl or phenoxycarbonyl group; an acyl group such as an acetyl or benzoyl group; a heterocyclic group such as a pyridyl or pyrazolyl group; an alkoxy group; an aryloxy group; an acyloxy group; and the like.

In the Formulas [C I] and [C II], $R_1$ represents a ballast group necessary for endowing the cyan couplers represented by the Formulas [C I] and [C II] and the cyan dyes formed from the cyan couplers with anti-diffusion property and, more preferably, an alkyl, aryl or heterocyclic group each having 4 to 30 carbon atoms, including, for example, a normal chained or branch chained alkyl group such as a t-butyl, n-octyl, t-octyl or n-dodecyl group; an alkenyl group; a cycloalkyl group; or a 5- to 6-membered heterocyclic group.

In the Formulas [C I] and [C II], $Z_1$ represents hydrogen or a group capable of splitting off in the coupling reaction thereof with the oxidation products of a color developing agent, including, for example, a halogen atom such as chlorine, bromine or fluorine atom; a substituted or unsubstituted alkoxy group; an aryloxy group; a heterocyclic oxy group; an acyoxy group; a carbamoyloxy group; a sulfonyloxy group; an alkylthio group; an arylthio group; a heterocyclic thio group; and a sulfonamido group; and the more typical examples thereof include those described in, for example, U.S. Pat. No. 3,741,563; Japanese Patent Examined Publication No. 36894/1973; and Japanese Patent O.P.I. Publication Nos. 37425/1972, 10135/1975, 117422/1975, 130441/1975, 108841/1976, 120343/1975, 18315/1977, 105226/1978, 14736/1979, 48237/1979, 32071/1980, 65957/1980, 1938/1981, 12643/1981, 27147/1981, 146050/1984, 166956/1984, 24547/1985, 35731/1985 and 37557/1985.

Among the cyan couplers represented by the aforegiven Formula [C I] or [C II], those more preferably useful in the invention are represented by the following Formula [C III], [C IV] or [C V]:

Formula [C III]

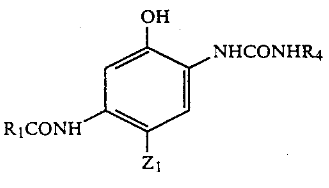

-continued

Formula [C IV]

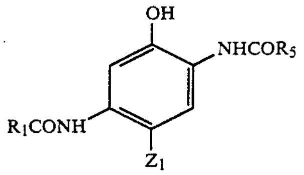

Formula [C V]

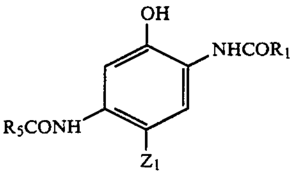

In the Formula [C III], $R_4$ represents a substituted or unsubstituted aryl group and more preferably a phenyl group. In the case hat the above-mentioned aryl group has one or more substituents, such substituents include at least one substituent selected from the group consisting of $—SO_2R_6—$, such a halogen atom as a fluorine, bromine or chlorine atom, $—CF_3$, $—NO_2$, —CN, $—COR_6$, $—COOR_6$, $—SO_2OR_6$,

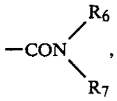 , 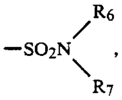 , $—OR_6$, $—OCOR_6$, 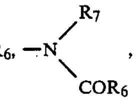 ,

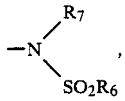 , or 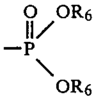

wherein $R_6$ represents an alkyl group and more preferably an alkyl group having 1 to 20 carbon atoms, such as a methyl, ethyl, tert-butyl or dodecyl group, an alkenyl group and more preferably an alkenyl group having 2 to 20 carbon atoms, such as an aryl or heptadencenyl group, a cycloalkyl group and more preferably a 5- to 7-membered ring group, such as a cyclohexyl group, and an aryl group such as a phenyl, tolyl or naphthyl group; and $R_7$ represents a hydrogen atom or a group represented by the above-given $R_6$.

The compounds suitably serving as the phenol type cyan couplers represented by the Formula [C III] are those in which $R_4$ is a substituted or unsubstituted phenyl group and the substituent to the phenyl group is a cyano, nitro, $—SO_2R_8$ (in which $R_8$ is an alkyl group), a halogen, or trifluoromethyl group.

In the Formulas [C IV] and [C V], $R_5$ represents an alkyl group and more preferably an alkyl group having 1 to 20 carbon atoms, such as a methyl, ethyl, tert-butyl or dodecyl group, an alkenyl group and more preferably an alkenyl group having 2 to 20 carbon atoms, such as an allyl or oleyl group, a cycloalkyl group and more preferably a 5- to 7-membered ring group, such as a cyclohexyl group, an aryl group such as a phenyl, tolyl or naphthyl group, and a heterocyclic group and more preferably a 5- or 6-membered heterocyclic group containing 1 to 4 nitrogen, oxygen or sulfur atoms, such as a furyl, thienyl or benzothiazolyl group.

The above-given $R_6$, $R_7$ and $R_5$ which is denoted in the Formulas [C IV] and [C V] are allowed to introduce thereinto arbitrary substituents including, typically, those capable of being introduced into $R_2$ or $R_3$ in the Formulas [C I] and [C II], and such substituents are preferably a halogen atom such as a chlorine or fluorine atom.

In the Formulas [C III], [C IV] and [C V], Z and $R_1$ each are synonymous with the same denoted in the Formulas [C I] and [C II]. The preferable examples of the ballast groups each represented by $R_1$ include the groups represented by the following Formula [C VII]:

Formula [C VII]

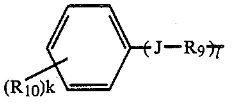

wherein J represents a oxygen or sulfur atom or a sulfonyl group; k is an integer of from 0 to 4; l is 0 or 1; and, provided that k is not less than 2, not less than two $R_{10}$s present therein may be the same with or the different from each other; $R_9$ represents a substituted or unsubstituted alkylene group having 1 to 20 carbon atoms or an alkylene group substituted by an aryl group or the like; and $R_{10}$ represents a monovalent group and more preferably hydrogen, a halogen such as chlorine or bromine, an alkyl group and more preferably a substituted or unsubstituted alkyl group having 1 to 20 carbon atoms, such as a methyl, t-butyl, t-pentyl, t-octyl, dodecyl, pentadecyl, benzyl or phenethyl group, an aryl group such as a phenyl group, a heterocyclic group and more preferably a nitrogen-containing heterocyclic group, an alkoxy group and more preferably a substituted or unsubstituted alkoxy group having 1 to 20 carbon atoms, such as a methoxy, ethoxy, t-butyloxy, otyloxy, decyloxy or dodecyloxy group, an aryloxy group such as a phenoxy group, a hydroxy group, an acyloxy group and more preferably an alkylcarbonyloxy or arylcarbonyloxy group such as an acetoxy or benzoyloxy group, a carboxy group, an alkyloxycarbonyl group and more preferably a substituted or unsubstituted alkyloxycarbonyl group having 1 to 20 carbon atoms, an aryloxycarbonyl group and more preferably a phenoxycarbonyl group, an alkylthio group and more preferably those having 1 to 20 carbon atoms, an acyl group and more preferably a substituted or unsubstituted alkylcarbonyl group having 1 to 20 carbon atoms, an acylamino group and more preferably a substituted or unsubstituted alkylcarbamido group having 1 to 20 carbon atoms, a benzenecarbamido group, a sulfonamido group and more preferably a substituted or unsubstituted alkylsulfonamido group or a benzenesulfonamido group each having 1 to 20 carbon atoms, a carbamoyl group and more preferably a substituted or unsubstituted alkylaminocarbonyl or phenylaminocarbonyl group each having 1 to 20 carbon atoms, and a sulfamoyl group and more preferably a substituted or unsubstituted alkylaminosulfonyl or phenylaminosulfonyl group each having 1 to 20 carbon atoms, and the like.

Next, the typical examples of the cyan coupler compounds represented by the Formula [C I] or [C II] will be given below, and it is, however, to be understood that the invention shall not be limited thereto.

C-23
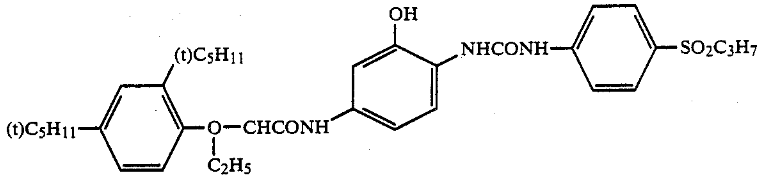
C-24
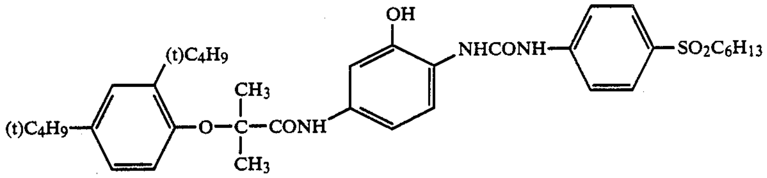
C-25
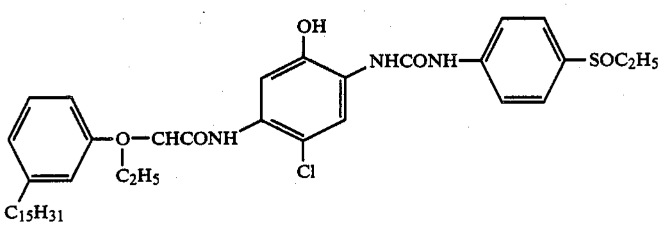
C-26
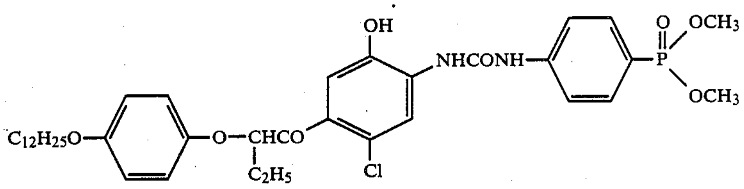
C-27
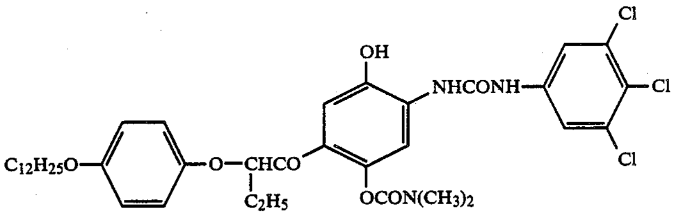
C-28
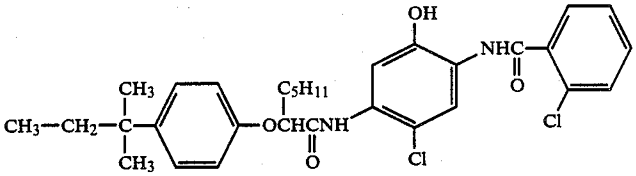
C-29
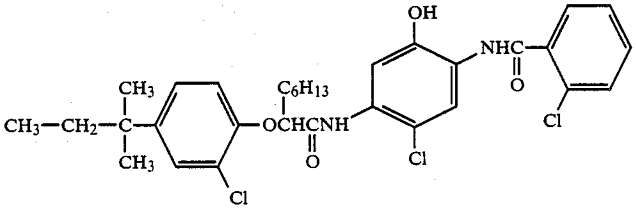

-continued
C-30
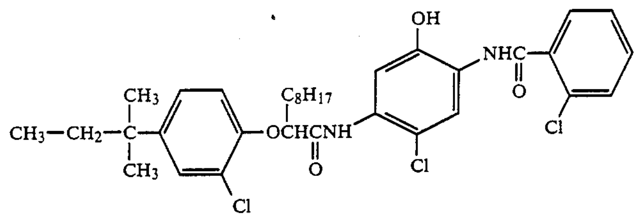
C-31
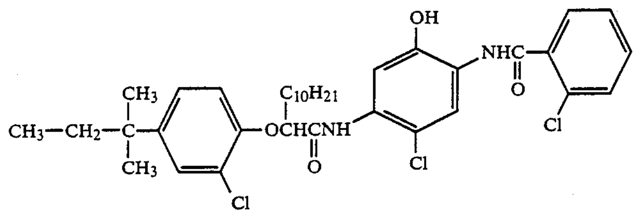
C-32
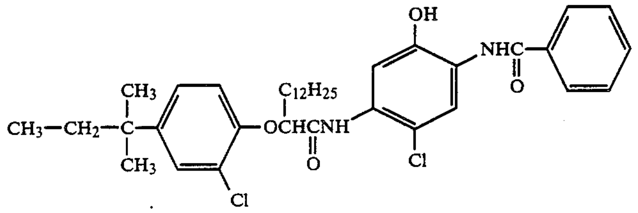
C-33
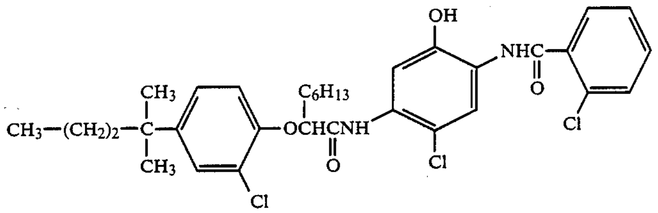
C-34
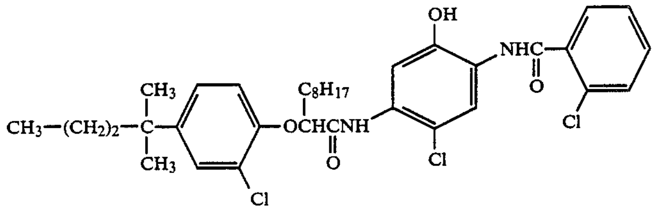
C-35
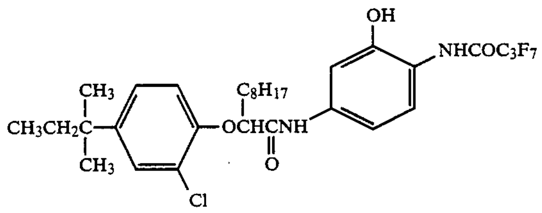
C-36
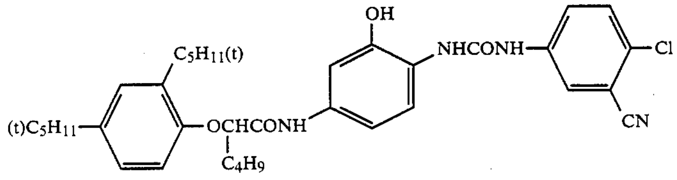

-continued
C-37
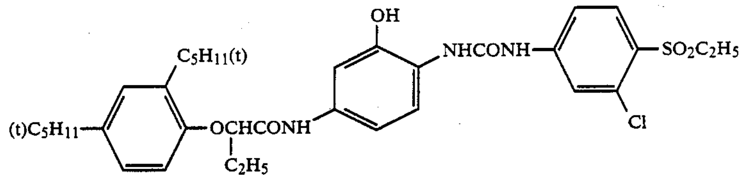
C-38
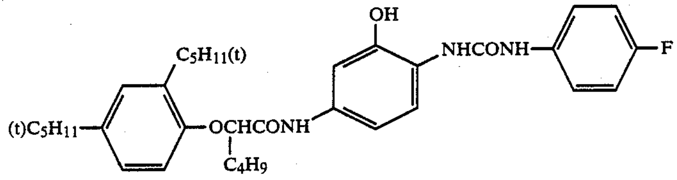
C-39
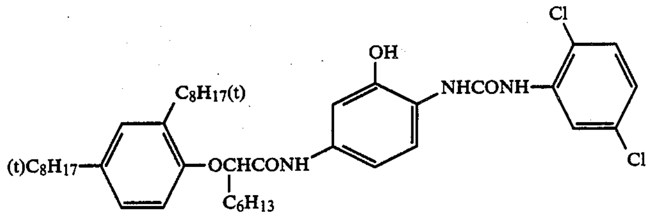
C-40
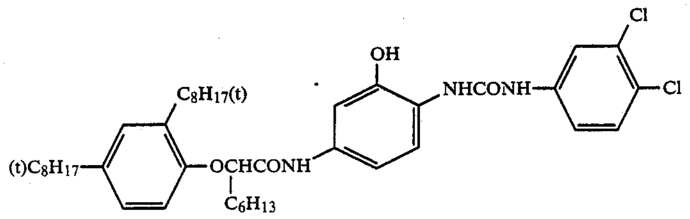
C-41
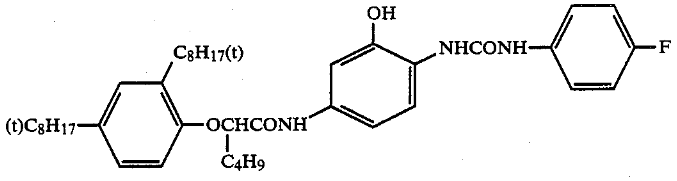
C-42
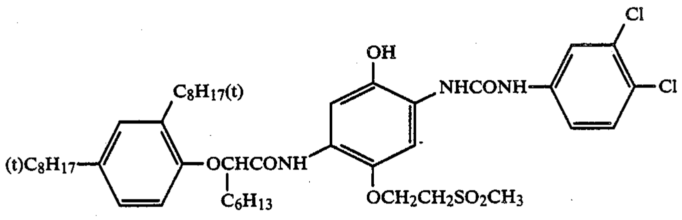
C-43
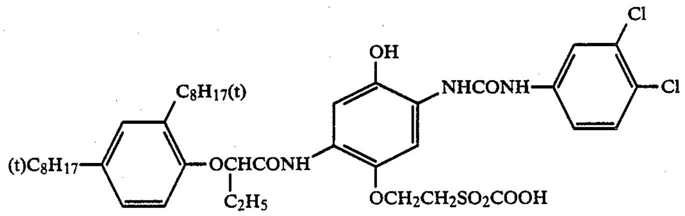
C-44
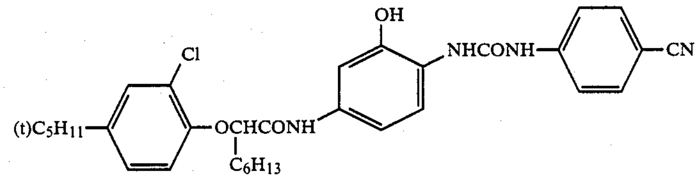

-continued

The above-mentioned cyan couplers may be synthesized in any well-known processes such as those described in, for example, U.S. Pat. Nos. 2,772,162, 3,758,308, 3,880,661, 4,124,396 and 3,222,176; British Patent Nos. 975,773, 8,011,693 and 8,011,694; Japanese Patent O.P.I. Publication Nos. 21139/1972, 112038/1975, 163537/1980, 29235/1981, 99341/1980, 116030/1981, 69329/1977, 55945/1981, 80045/1981 and 134644/1975; British Patent No. 1,011,940; U.S. Pat. Nos. 3,446,622 and 3,996,253; Japanese Patent O.P.I. Publication Nos. 65134/1981, 04543/1982, 204544/1982 and 204545/1982; Japanese Patent Application Nos. 131312/1981, 131313/1981, 131314/1981, 131309/1981, 131311/1981, 149791/1982 and 130459/1981; Japanese Patent O.P.I. Publication Nos. 146050/1984, 166956/1984, 24547/1985, 37531/1985 and 27557/1985; and the like.

In this invention, the cyan couplers represented by the Formula [C I] or [C II] may be used in combination with the conventionally known cyan couplers, provided that it shall not be contradictory to the objects of the invention. It is also allowed to use the cyan couplers represented by the Formulas [C I] and [C II], in combination.

When the cyan couplers relating to the invention represented by the Formula [C I] or [C II] are to be added into a silver halide emulsion layer, the cyan couplers are to be added in an amount of, ordinarily, from about 0.005 to 2 mol and, more preferably, from 0.01 to 1 mol per mol of a silver halide to be used.

Next, the cyan couplers represented by the Formula [C VI] which are to be used in the invention will now be described below.

In the Formula [C VI], the normal-chained a branch-chained alkyl groups each having 2 to 12 carbon atoms, which are represented by $R_{10}$ and $R_{11}$, include, for example, an ethyl, propyl or butyl group; and the ballast groups represented by $R_{12}$ are the organic groups each having a size and a configuration capable of endowing the molecules of couplers with a sufficient volume so as not to substantially diffuse the couplers from the layer applied with the couplers into the other layers. The typical ballast groups include, for example, an alkyl or aryl group having 8 to 32 carbon atoms in total and, more preferably, those each having 13 to 28 carbon atoms in total. The substituents to the above-mentioned alkyl or aryl group include, for example, an alkyl, aryl, alkoxy, allyloxy, carboxy, acyl, ester, hydroxy, cyano, nitro, carbamoyl, carbonamido, alkylthio, arylthio, sulfonyl, sulfonamido or sulfamoyl group or a halogen; and the substituents to the alkyl groups include, for example, those given to the above-mentioned aryl groups, except the alkyl groups.

The preferable ballast groups include, for example, those each represented by the following formula:

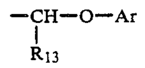

wherein $R_{13}$ represents an alkyl group having 1 to 12 carbon atoms; and Ar represents an aryl group such as a phenyl group, and such aryl groups are allowed to have a substituent including, for example, an alkyl group, a hydroxy group, a halogen atom, an alkylsulfonamido group and the like and, most preferably, such a branch-chained alkyl group as a t-butyl group.

The groups, which are defined by X in the aforementioned Formula [C VI] and are capable of splitting off upon coupling to the oxidation products of a color developing aghent, are able to determine the equivalent of a coupler and govern the coupling reactivity. The typical examples thereof include a halogen such as chlorine and fluorine, an aryloxy group, a substituted or unsubstituted alkoxy group, an acyloxy group, a sulfonamido group, an arylthio group, a heteroylthio group, a heteroyloxy group, a sulfonyloxy group, a carbamoyloxy group and the like and, further concretely, those described in, for example, Japanese Patent O.P.I. Publication Nos. 10135/1975, 120334/1975, 130414/1975, 48237/1979, 146828/1976, 13736/1979, 37425/1982, 123341/1975 and 95346/1983; Japanese Patent Examined Publication No. 36894/1973; and U.S. Pat. Nos. 3,476,563, 3,737,316 and 3,227,551.

Next, the exemplified compound of the cyan couplers represented by the Formula [C VI] will now be given below and it is, however, to be understood that the invention shall not be limited thereto.

(Exemplified Compounds)

| Coupler No. | $R_{11}$ | X | $R_{12}$ | $R_{10}$ |
|---|---|---|---|---|
| C-100 | $-C_2H_5$ | $-H$ | 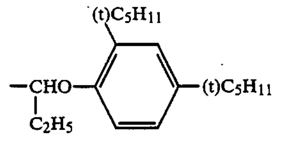 | $-H$ |
| C-101 | $-C_2H_5$ | $-Cl$ | 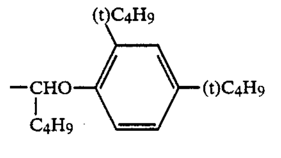 | $-H$ |

-continued
(Exemplified Compounds)
| Coupler No. | $R_{11}$ | X | $R_{12}$ | $R_{10}$ |
|---|---|---|---|---|
| C-102 | $-C_2H_5$ | $-H$ | 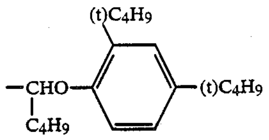 | $-H$ |
| C-103 | $-C_2H_5$ | $-Cl$ | 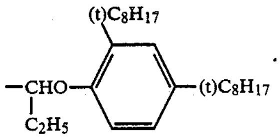 | $-H$ |
| C-104 | $-C_2H_5$ | $-Cl$ | 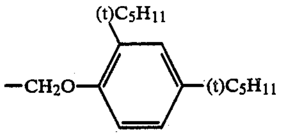 | $-H$ |
| C-105 | $-C_2H_5$ | 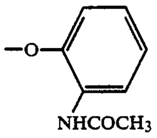 | 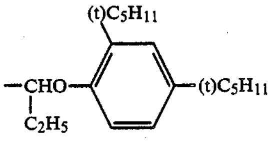 | $-H$ |
| C-105 | 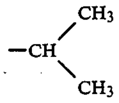 | $-Cl$ | 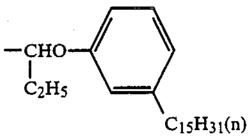 | $-H$ |
| C-106 | $-C_2H_5$ | $-Cl$ | 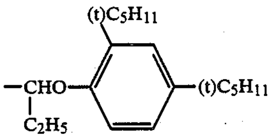 | $-H$ |
| C-107 | $-C_2H_5$ | $-Cl$ | 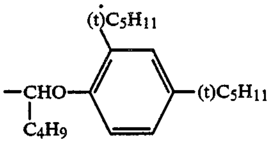 | $-H$ |
| C-108 | $-C_4H_9$ | $-F$ | 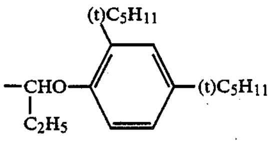 | $-H$ |
| C-110 | $-C_2H_5$ | $-F$ | 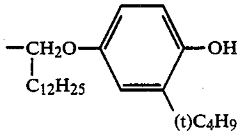 | $-H$ |
| C-111 | $-C_2H_5$ | $-Cl$ | 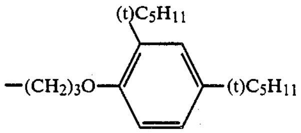 | $-H$ |

-continued
(Exemplified Compounds)
| Coupler No. | $R_{11}$ | X | $R_{12}$ | $R_{10}$ |
|---|---|---|---|---|
| C-112 | $-C_2H_5$ | $-F$ | 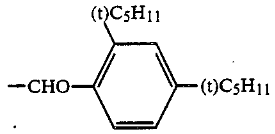 | $-H$ |
| C-113 | $-C_4H_9$ | $-Cl$ | 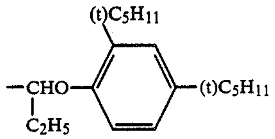 | $-H$ |
| C-114 | $-C_2H_5$ | $-Cl$ | 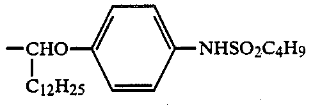 | $-H$ |
| C-115 | $-C_2H_5$ | $-Cl$ | 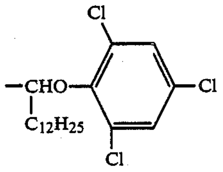 | $-H$ |
| C-116 | 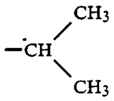 | $-Cl$ | $-C_{18}H_{37}$ | $-H$ |
| C-117 | $-C_2H_5$ | 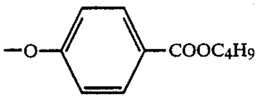 | 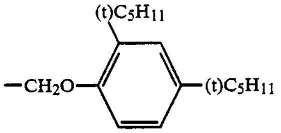 | $-H$ |
| C-118 | $-C_2H_5$ | $-F$ | 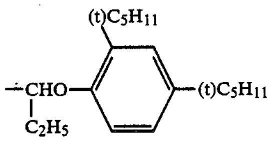 | $-H$ |
| C-119 | $-C_2H_5$ | $-Cl$ | 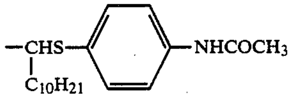 | $-H$ |
| C-120 | $-C_3H_7$ | $-Cl$ | 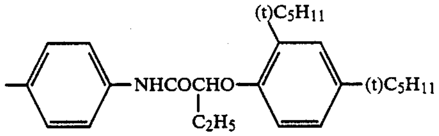 | $-H$ |
| C-121 | $-C_3H_7$ | $-Cl$ | 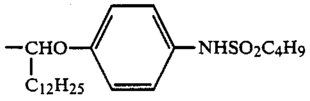 | $-H$ |
| C-122 | $-C_2H_4NHCOCH_3$ | $-Cl$ | 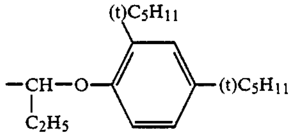 | $-H$ |

-continued (Exemplified Compounds)

| Coupler No. | $R_{11}$ | X | $R_{12}$ | $R_{10}$ |
|---|---|---|---|---|
| C-123 | $-C_3H_6OCOH_3$ | $-Cl$ | 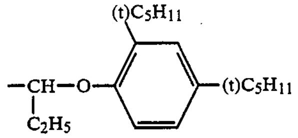 | $-H$ |
| C-124 | $-H$ | $-Cl$ | 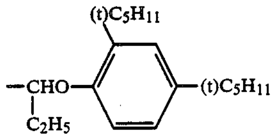 | $-C_2H_5$ |
| C-125 | $-H$ | $-Cl$ | 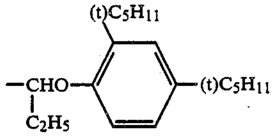 | $-C_3H_7$ |
| C-126 | $-H$ | $-Cl$ | 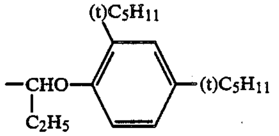 | $-C_5H_{11}$ |
| C-127 | $-C_2H_5$ | $-Cl$ | 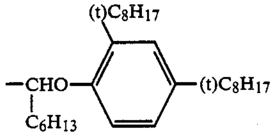 | $-H$ |

The above-mentioned cyan couplers may be synthesized in any well-known processes including, for example, those described in U.S. Pat. Nos. 2,772,162, 3,758,306, 3,880,661, 4,124,396 and 3,222,176; British Patent Nos. 975,773, 8,011,693 and 8,011,694; Japanese Patent O.P.I. Publication Nos. 21139/1972, 112038/1975, 163537/1980, 29235/1981, 99341/1980, 116030/1981, 69329/1977, 55945/1981, 80045/1981 and 134644/1975; British Patent No. 1,011,940; U.S. Pat. Nos. 3,446,622 and 3,996,253; Japanese Patent O.P.I. Publication Nos. 65134/1981, 204543/1982, 204544/1982 and 204545; Japanese Patent Application Nos. 131312/1981, 131313/1981, 131314/1981, 131309/1981, 131311/1981, 149791/1982 and 130459/1981; Japanese Patent O.P.I. Publication Nos. 146050/1984, 166956/1984, 14547/1985, 35731/1985 and 37557/1985; and the like.

The cyan couplers represented by the Formula [C VI] may be used together with the conventionally known cyan couplers in combination, provided that such a combination use may not be against the objects of the invention.

When the cyan couplers relating to the invention represented by the Formula [C VI] is to be contained in a silver halide emulsion layer, they may normally be used in an amount within the range of from about 0.005 to 2 mol and more preferably from 0.01 to 1 mol, per mol of a silver halide to be used therein.

The black-and-white developer solution usable in the processing of this invention is one that is called the 'black-and-white first developer solution' for use in the processing of silver halide color photographic materials or one that is used in the processing of black-and-white photographic materials, and is allowed to contain those various additives usually used in ordinary black-and-white developer solutions.

Typical additives include developing agents such as 1-phenyl-3-pyrazolidone, metul and hydroquinone, preservatives such as sulfites, development accelerators comprised of alkali agents such as sodium hydroxide, sodium carbonate, potassium carbonate, etc., inorganic or organic development restrainers such as potassium bromide, 2-methylbenzimidazole, methylbenzothiazole, etc., water softeners such as polyphosphates, and surface overdevelopment prevention agents comprised of a slight amount of iodides or mercapto compounds, and the like.

The aromatic primary amine color developing agent to be used in the color developer solution used prior to the processing in the bleach-fix bath of this invention includes those various ones extensively used in various color photographic processes. These developing agents include aminophenol-type and p-phenylenediamine-type derivatives. These compounds are used normally in the form of, e.g., hydrochlorides or sulfates because such salt forms are more stable than in the free state.

Also, these compounds are desirable to be used generally in a concentration of from about 0.1 g to about 30 g per litter of a color developer solution, and more preferably from about 1 g to 15 g per liter.

Examples of the aminophenol-type developing agent include, e.g., o-aminophenol, p-aminophenol, 5-amino-2-hydroxytoluene, 2-amino-3-hydroxytoluene, 2-hydroxy-3-amino-1,4-dimethylbenzene, and the like.

Particularly useful aromatic primary amine color developing agents are N,N-dialkyl-p-phenylenediamine-type compounds, whose alkyl and phenyl groups may or may not be substituted. Among them the especially useful compounds are N,N-diethyl-p-phenylenediamine hydrochloride, N-methyl-p-phenylenediamine hydrochloride, 2-amino-5-(N-ethyl-N-dodecylamino)-toluene, N-ethyl-N-β-methanesulfonamidoethyl-3-methyl-4-aminoaniline sulfate, N-ethyl-N-β-hydroxyethylaminoaniline sulfate, 4-amino-3-methyl-N,N-diethylaniline sulfate, 4-amino-N-(methoxyethyl)-N-ethyl-3-methylaniline-p-toluene sulfonate, and the like.

In the present invention, the particularly useful color developing agents are paraphenylenediamine-type color developing agents having at least one water-soluble group (hydrophilic group) to the amino group thereof, and those representative of these color developing agents include the following compounds, but the present invention is not limited thereto.

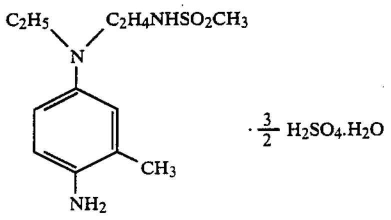
(1)

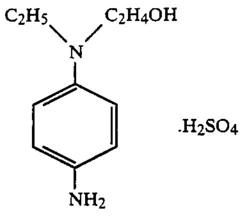
(2)

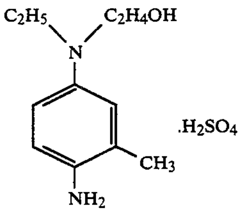
(3)

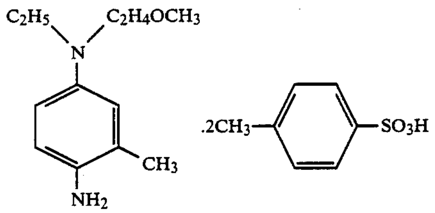
(4)

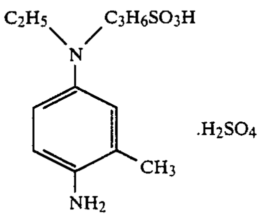
(5)

-continued

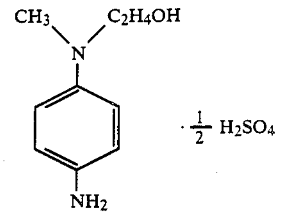
(6)

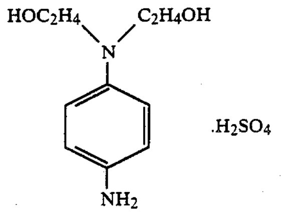
(7)

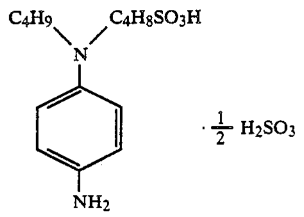
(8)

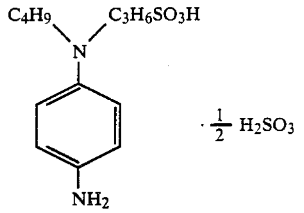
(9)

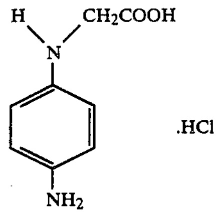
(10)

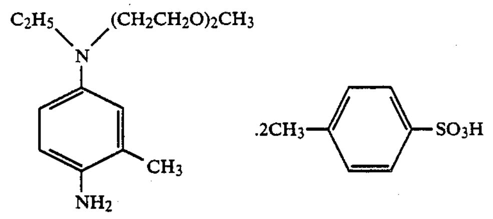
(11)

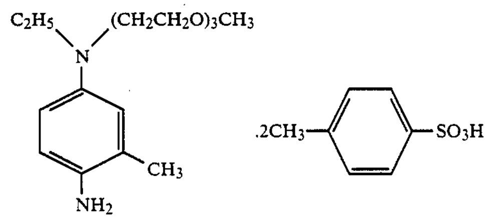
(12)

-continued

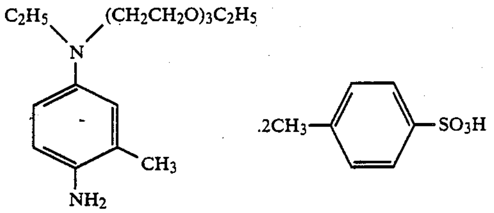
(13)

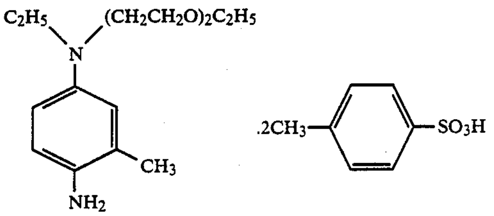
(14)

These particularly useful color developing agents in this invention are compounds having $-(CH_2)nCH_2OH$, $-(CH_2)mNHSO_2(CH_2)nCH_3$, or $-(CH_2)mO(CH_2)nCH_3$ as the substituent to the amino group thereof, and the concrete compounds having such substituents are the above exemplified compounds (1), (2), (3), (4), (6) and (7), provided that the m and n each is an integer of from 0 to 6, and preferably from 0 to 5.

The foregoing paraphenylenediamine-type color developing agent is desirable to be mixed in the bleach-fix bath of this invention.

The alkaline color develor solution to be used prior to the processing in the bleach-fix bath of this invention, in addition to the foregoing aromatic primary amine color developing agent, may arbitrarily contain various additional components including, e.g., alkali agents such as sodium hydroxide, sodium carbonate, potassium carbonate, etc., alkali metal sulfites, alkali metal hydrogen sulfites, alkali metal thiocyanates, alkali metal halides, water softners and thickeners such as benzyl alcohol, diethylenetriaminepentaacetic acid, 1-hydroxyethylidene-1,1-diphosphonic acid, and the like. The pH value of the color developer solution is normally not less than 7, and most generally from about 10 to about 13.

The bleach-fix bath of this invention may be applied to those silver halide color photographic materials which use the emulsion of this invention, such as color photographic paper, color negative film, color positive film, color reversal film for slide use, color reversal film for movie use, color reversal film for TV use, reversal color paper, and the like, and most suitable for use in the processing of those silver iodide-containing high-speed color photographic materials whose total coating amount of silver is from 20 mg/dm$^2$ to 80 mg/dm$^2$.

EXAMPLES

The present invention will be further illustrated in detail by the following examples, but the embodiments of this invention are not limited thereto.

EXAMPLE 1

[Preparation of Emulsions]

The following five different monodisperse emulsions each containing 6.0 mole% silver iodide were prepared. After completion of the ripening of each of the emulsions, 4-hydroxy-6-methyl-1,3,3a,7-tetrazaindene was added thereto.

Emulsion (A): Core/shell-type silver iodobromide emulsion whose average grain size is 1.2μ (shell is silver iodide with a thickness of 0.01 μm), Emulsion (B): Core/shell-type silver iodobromide emulsion whose average grain size is 1.2μ (shell is silver iodide with a thickness of 0.05 μm), Emulsion (C): Core/shell-type silver iodobromide emulsion whose average grain size is 1.2μ (shell is silver iodide with a thickness of 0.5 μm), Emulsion (D): Core/shell-type silver iodobromide emulsion whose average grain size is 2.6μ (grain's diameter is ten times the thickness of the grain), and Emulsion (E): Spherical grains-containing silver iodobromide emulsion whose average grain size is 1.2μ.

Provided that Emulsions (A)-(C) each was prepared with its pAg and pH controlled, making reference to those methods described in Japanese Patent O.P.I. Publication Nos. 48521/1979 and 49938/1983; Emulsion (D) was prepared, making reference to those methods described in Japanese Patent O.P.I. Publication Nos. 113934/1983 and 99433/1984; and Emulsion (E) was prepared, making reference to those methods described in Japanese Patent O.P.I. Publication No. 49938/1983.

[Preparation of Photographic Material Samples]

The following compounds were added to each of the above emulsions to thereby prepare silver halide color photographic material samples.

Each emulsion was optically sensitized by the addition of red-sensitizing dyes: 285 mg per mole of AgX of anhydro-3,3'-di-(3-sulfopropyl)-5,5'-dichloro-9-ethylthiacarbocyanine hydroxide (Dye p-1), 38.5 mg per mole of AgX of anhydro-3,3'-di-(3-sulfo propyl)-4,5,4',5'-dibenzothiacarbocyanine hydroxide (Dye p-2), and 116 mg per mole of AgX of anhydro-1,3'-diethyl-3-(3-sulfopropyl)-5-trichloromethyl-4',5'-benzobenzimidazolothiacarbocyanone hydroxide (Dye p-3). To this emulsion was added a dispersion liquid prepared by protect-dispersing in usual manner a solution of a cyan coupler 2-(α, α,β,β, γ, γ,δ,δ-octa fluorohexanamido)-5-[2-(2,4-di-t-amylphenoxy)hexaneamido]phenol dissolved into tricresyl phosphate so that its coupler content is 0.3 mole per mole of AgX. Further a stabilizer 4-hydroxy-6-methyl-1,3,3a,7-tetrazaindene, a physical development restrainer poly-N-vinylpyrrolidone and an antifoggant 1-phenyl-5-mercaptotetrazole were added to the emulsion. The resulting emulsion was coated several times to be superposed on a black colloidal silver-coated polyethylene terephthalate film support so that each layer's average thickness is 4.2 μm with interlayers' thickness being 2 μm; two photographic samples were prepared one of which is of six emulsion layers superposed whose total layer thickness is 37.2 μm and the other of which is of three emulsion layers superposed whose total layer thickness is 18.6 μm. The amounts of silver were 96 mg/dm$^2$ and 46 mg/dm$^2$, respectively. In addition, the binder's swelling rate T ½ was in the range of from 9 seconds to 14 seconds.

[Processing]

The above-prepared silver halide color photographic material samples each was exposed in usual manner, and then processed in the following procedure: color developed for 3 minutes and 15 seconds, bleach-fixed for 1 minute and 30 seconds, washed for 2 minutes, stabilized for 7 minutes, and then dried.

Each processing took place at a temperature of 37.8° C. The respective processing solutions are of the following compositions:

| | |
|---|---|
| [Color developer solution] | |
| Potassium carbonate | 30.0 g |
| Sodium sulfite | 2.0 g |
| Hydroxylamine sulfate | 2.0 g |
| Potassium bromide | 1.2 g |
| Sodium hydroxide | 3.4 g |
| N—ethyl-N—$\beta$-hydroxyethyl-3-methyl-4-aminoaniline sulfate | 4.6 g |
| Water to make 1 liter. | |
| Use sodium hydroxide to adjust the pH to 10.1. | |
| [Bleach-fix bath] | |
| Diammonium ethylenediaminetetraacetate | 7.5 g |
| Iron(III)-ammonium ethylenediaminetetra-acetate | 150.0 g |
| Ammonium sulfite (50% solution) | 10.0 g |
| Ammonium thiosulfate (70% solution) | 200.0 g |
| Water to make 1 liter. | |
| Use ammonium hydroxide to adjust the pH to 7.5. | |

This bleach-fix bath was regarded as (1), and another prepared by adding 0.7 g/liter of the foregoing exemplified compound (a) as a bleaching accelerator to this bleach-fix bath was regarded as (2) to be used for the processing.

| [Stabilizer bath] | |
|---|---|
| Formalin (37% solution) | 7.0 ml |
| 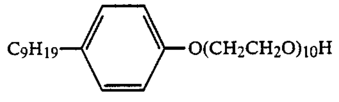 | 1.0 ml |
| Water to make 1 liter | |

The obtained results are shown in Table 1, wherein the speed of each emulsion is given in a relative speed to that of Sample (5) regarded as 100. In the table, the S stands for the speed.

TABLE 1

| Sample No. | Em | Thickness of shell ($\mu$m) | S (Relative speed) | Desilvering completion time (bleach-fix rate) (min) — Layer thickness 37.2 $\mu$m, Amt of silver 96 mg/dm$^2$: (1) No accelerator | (2) Accelerator present | Layer thickness 18.6 $\mu$m, Amt of silver 46 mg/dm$^2$: (1) No accelerator | (2) Accelerator present |
|---|---|---|---|---|---|---|---|
| (1) | A | 0.01 | 142 | 22 | 18 | 12 | 4 |
| (2) | B | 0.05 | 220 | 23 | 16 | 12 | 3 |
| (3) | C | 0.5 | 140 | 21 | 17 | 13 | 4 |
| (4) | D | — | 190 | 22 | 16 | 12 | 4 |
| (5) | E | — | 100 | 18 | 12 | 10 | 6 |

As is apparent from the above results, the photographic materials samples (1), (2) and (3) which satisfy the advantageous conditions of this invention, even when the conventional bleach-fix bath is used, are more excellent in the developability than the other samples (4) and (5) which do not satisfy the conditions of this invention, and also excellent in the sensitizing effect. The results in Table 1 suggest that the samples for this invention have their shells with the optimum thickness. It is understood, however, that, even such excellent photographic materials, if their layer thickness is larger and if their coating amount of silver is larger, their bleachability in the conventional bleach-fix bath becomes significantly worsened.

It is also understood that, even in the case where the thickness is 18.6 $\mu$m and the coating amount of silver is 47 mg/dm$^2$, when the bleach-fix bath contains no bleaching accelerator, the desilvering completion time is not so shortened, whereas when the bath contains the bleaching accelerator, surprisingly the invention's advantageous emulsion, the core/shell emulsion, is processed in a remarkably short desilvering completion time.

EXAMPLE 2

In accordance with the layer construction employed by those in the art to high-speed silver halide color photographic materials, with various auxiliary layers interposed, from the support side a antihalation layer, red-sensitive silver halide emulsion layer, a green-sensitive silver halide emulsion layer and a blue-sensitive silver halide emulsion layer in the described order were coated, and on the outmost side of the blue-sensitive emulsion layer was provided a monodisperse high-speed silver halide emulsion layer. Namely, in accordance with the following procedure, samples were prepared by varying the amount of gelatin so as to make the coating amount of silver constant to adjust the layer thickness to thereby vary the dry layer thickness. The coating amount of silver was varied into two: 100 mg/dm$^2$ and 50 mg/dm$^2$.

The following are basic coating conditions, and for varying the layer thickness the coating amount of gelatin was varied to thereby adjust the respective prescriptions.

Layer 1:

Silver nitrate was reduced by a reducing agent hydroquinone to prepare black colloidal silver showing a high absorbability of a light in a wavelength region of from 400 to 700 nm, and 0.8 g of the black colloidal silver was dispersed along with 3 g of gelatin to prepare a colloidal silver-dispersed liquid, which was coated to make an antihalation layer.

Layer 2:

Interlayer consisting of gelatin (dry thickness 0.8 $\mu$m).

Layer 3:

Low-speed red-sensitive silver halide emulsion layer comprising 1.5 g of a low-speed red-sensitive silver iodobromide emulsion (AgI 6 mole%), 1.9 g of gelatin, and a solution of 0.96 g of 1-hydroxy-4-($\beta$-methoxyethylaminocarbonylmethoxy)-N-[δ-(2,4-di-t-amylphenoxy)butyl]-2-naphthoamido (herein after called Cyan Coupler (C-1)) and 0.028 g of disodium 1-hydroxy-4-[4-(1-hydroxy-8-acetamido-3,6-disulfo-2-naphtylazo)phenoxy]-N-[δ-(2,4-di-amylphenoxy)butyl]-2-naphthoamide (hereinafter called Colored Cyan Coupler (CC-1))dissolved into 0.4 g of tricresyl phosphate (hereinafter called TCP).

Layer 4:

High-speed red-sensitive silver halide emulsion layer comprising 1.1 g of a high-speed red-sensitive silver iodobromide emulsion (AgI 8 mole%), 1.2 g of gelatin, and a solution of 0.41 g of Cyan Coupler (C-1) and 0.026 g of Colored Cyan Coupler (CC-1) dissolved into 0.15 g of TCP.

Layer 5:

Interlayer containing a solution of 0.08 g of 2,5-di-t-octylhydroquinone (hereinafter called antistain agent (HQ-1)) dissolved into 0.04 g of dibutyl phthalate (hereinafter called DBP) and 1.2 g of gelatin.

Layer 6:

Low-speed green-sensitive silver halide emulsion layer comprising 1.6 g of a low-speed green-sensitive silver iodobromide emulsion (AgI 15 mole%), 1.7 g of gelatin, and a solution of 0.30 g of 1-(2,4,6-trichlorophenyl)-3-[3-(2,4-di-t-amylphenoxyacetamido)benzeneamido]-5-pyrazolone (hereinafter called Magenta Coupler (M-1)), 0.20 g of 4,4-methylenebis-11-(2,4,6-trichlorophenyl)-3-[3-(2,4-di-t-amylphenoxyacetamido)-benzeneamido]-5-pyrazolone (hereinafter called Magenta Coupler (M-2) and 0.066 g of 1-(2,4,6-trichlorophenyl)-4-(1-naphthylazo)-3-(2-chloro-5-octadecenylsuccinimidoanilino)-5-pyrazolone (hereinafter called Colored Magenta Coupler (CM-1)) dissolved into 0.3 g of TCP.

Layer 7:

High-speed green-sensitive silver halide emulsion layer comprising 1.5 g of a high-speed green-sensitive silver iodobromide emulsion (AgI 11 mole%), 1.9 g of gelatin, and a solution of 0.093 g of Magenta Coupler (M-1), 0.094 g of Magenta Coupler (M-2) and 0.049 g of Colored Magent Coupler (CM-1) dissolved into 0.12 g of TCP.

Layer 8:

Yellow filter layer containing 0.2 g of yellow colloidal silver, 0.2 g of antistain agent (HQ-1) dissolved into 0.11 g of DBP, and 2.1 g of gelatin.

Layer 9:

Low-speed blue-sensitive silver halide emulsion layer comprising 0.95 g of a low-speed blue-sensitive silver iodobromide emulsion (AgI 6 mole%), 1.9 g of gelatin, and a solution of 1.84 g of α-[4-(1-benzyl-2-phenyl-3,5-dioxo-1,2,4-triazolidinyl)]-α-pivaloyl-2-chloro-5-[γ-(2,4-di-t-amylphenoxy)butaneamido]acetanilide (hereinafter called Yellow Coupler (Y-1)) dissolved into 0.93 g of DBP.

Layer 10:

High-speed blue-sensitive silver halide emulsion layer comprising 1.2 g of a high-speed monodisperse blue-sensitive silver iodobromide emulsion (AgI 7 mole%), 2.0 g of gelatin, and a solution of 0.46 g of Yellow Coupler (Y-1) dissolved into 0.23 g of DBP.

Layer 11:

Second protective layer consisting of gelatin.

Layer 12:

First protective layer containing 2.3 g of gelatin.

The resulting photographic materials were of nine different dry thicknesses: 35 μm, 30 μm, 27 μm, 25 μm, 22 μm, 20 μm, 18 μm, 12 μm and 8 μm. Preparation of the sample with the layer thinner than 8 μm was tried, but the sample usable to the test could not be obtained, due to the layer was too thin. These photographic material samples were regarded as Samples No. 1 through No. 10, provided that the thickness of the antihalation layer, the black colloidal silver content and the thicknesses of the gelatin interlayer and yellow filter layer were not varied at all.

Further other samples were prepared which have quite the same emulsion layers formed on a transparent polyethylene terephthalate film base without the colloidal silver antihalation layer as the bottom layer. These samples were regarded as Samples No. 11 to No. 20 in the order of their thickness from larger down to smaller. Further, 20 other samples were prepared by using emulsions having the same compositions as those used in Samples No. 1 to No. 20, wherein the amount of the hardener was reduced so as to accelerate the swelling rate T ½ as shown in Table 2-2, and these samples were regarded as Samples No. 21 to No. 40.

These samples each was subjected to color developing for 3 minutes and 15 seconds, bleach-fix for 1 minute and 30 seconds, first stabilizing for 2 minutes and second stabilizing for 30 seconds. Each processing took place at 37.8° C.

The respective solutions used in the processing are of the following compositions:

| | |
|---|---|
| [Color developer solution] | |
| Potassium carbonate | 30.0 g |
| Sodium sulfite | 2.0 g |
| Hydroxylamine sulfate | 2.0 g |
| 1-hydroxyethylidene-1,1-disulfonic acid (aqueous 60% solution) | 1.0 g |
| Potassium bromide | 1.2 g |
| Magnesium chloride | 0.6 g |
| Sodium hydroxide | 3.4 g |
| N—ethyl-N—β-hydroxyethyl-3-methyl-4-amino-aniline sulfate | 4.6 g |
| Water to make 1 liter | |
| Use sodium hydroxide to adjust the pH to 10.1. | |
| [Bleach-fix bath] | |
| Diammonium ethylenediaminetetraacetate | 7.5 g |
| Aminopolycarboxylic acid ferric complex salt (added in accordance with Table 2) | |
| Ammonium sulfite (50% solution) | 10.0 g |
| Ammonium thiosulfate (70% solution) | 200.0 g |
| Water to make 1 liter | |
| Use ammonium hydroxide to adjust the pH to 7.5. | |
| [First stabilizer bath] | |
| 1-hydroxyethylidene-1,1-disulfonic acid | 3.0 g |
| 5-chloro-2-methyl-4-isothiazoline-3-one | 1.0 g |
| Ethylene glycol | 1.0 g |
| Water to make 1 liter | |
| Use potassium hydroxide to adjust the pH to 7.1. | |
| [Second stabilizer bath] | |
| Formalin (37% solution) | 7.0 ml |
| 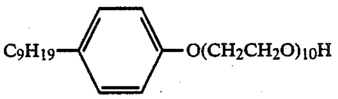 | 1.0 ml |
| Water to make 1 liter | |

Ethylenediaminetetraacetic acid ferric complex salt was used as the aminopolycarboxylic acid in the bleach-fix bath. As for the bleaching accelerator, Exemplified Compound (a) was added in a quantity of 0.7 g per liter. And the bleach-fix completion time due to the addition of the compound was measured. The results are as given in Table 2.

TABLE 2-1

| Sample No. | Thickness (μm) | Colloidal Ag antihalation layer | Swelling rate(T ½) = 35 sec; Bleach-fix bath (ferric-ammonium ethylenediaminetetraacetate 0.3 mole); Amt of silver 100 mg/dm$^2$: No accelerator | Amt of silver 100 mg/dm$^2$: Containing Exemplified Compound (1) accelerator | Amt of silver 50 mg/dm$^2$: No accelerator | Amt of silver 50 mg/dm$^2$: Containing Exemplified Compound (1) accelerator |
|---|---|---|---|---|---|---|
| 1 | 35 | present | over 30 min | 28 min | over 30 min | 24 min |
| 2 | 30 | " | over 30 min | 28 min | over 30 min | 21 min |
| 3 | 27 | " | over 30 min | 24 min | 28 min | 21 min |
| 4 | 25 | " | over 30 min | 21 min | 22 min | 6 min |
| 5 | 22 | " | over 30 min | 21 min | 21 min | 6 min |
| 6 | 20 | " | 28 min | 18 min | 20 min | 5 min |
| 7 | 18 | " | 26 min | 17 min | 20 min | 5 min |
| 8 | 12 | " | 25 min | 16 min | 20 min | 4 min |
| 9 | 8 | " | 24 min | 16 min | 19 min | 4 min |
| 10 | <8 | " | — | — | — | — |
| 11 | 35 | none | 19 min | 12 min | 7 min | 6 min |
| 12 | 30 | " | 18 min | 12 min | 7 min | 6 min |
| 13 | 27 | " | 15 min | 11 min | 7 min | 6 min |
| 14 | 25 | " | 15 min | 10 min | 5 min | 5 min |
| 15 | 22 | " | 14 min | 10 min | 5 min | 5 min |
| 16 | 20 | " | 13 min | 9 min | 5 min | 5 min |
| 17 | 18 | " | 13 min | 9 min | 5 min | 5 min |
| 18 | 12 | " | 12 min | 9 min | 5 min | 5 min |
| 19 | 8 | " | 11 min | 8 min | 5 min | 5 min |
| 20 | <8 | " | — | — | — | — |

TABLE 2-2

| Sample No. | Thickness (μm) | Colloidal Ag antihalation layer | Swelling rate(T ½) = 10 sec; Bleach-fix bath(ferric-ammonium ethylenediaminetetraacetate 0.3 mole); Amt of silver 100 mg/dm$^2$: No accelerator | Amt of silver 100 mg/dm$^2$: Containing Exemplified Compound (1) accelerator | Amt of silver 50 mg/dm$^2$: No accelerator | Amt of silver 50 mg/dm$^2$: Containing Exemplified Compound (1) accelerator |
|---|---|---|---|---|---|---|
| 21 | 35 | present | over 30 min | 22 min | 22 min | 18 min |
| 22 | 30 | " | over 30 min | 20 min | 18 min | 16 min |
| 23 | 27 | " | 26 min | 18 min | 14 min | 14 min |
| 24 | 25 | " | 22 min | 16 min | 8 min | 5 min |
| 25 | 22 | " | 18 min | 15 min | 6 min | 4 min |
| 26 | 20 | " | 16 min | 14 min | 4 min | 4 min |
| 27 | 18 | " | 14 min | 12 min | 4 min | 4 min |
| 28 | 12 | " | 13 min | 11 min | 4 min | 4 min |
| 29 | 8 | " | 12 min | 10 min | 4 min | 4 min |
| 30 | <8 | " | — | — | — | — |
| 31 | 35 | none | 20 min | 14 min | 7 min | 6 min |
| 32 | 30 | " | 18 min | 12 min | 6 min | 6 min |
| 33 | 27 | " | 16 min | 12 min | 6 min | 5 min |
| 34 | 25 | " | 12 min | 10 min | 5 min | 4 min |
| 35 | 22 | " | 12 min | 8 min | 4 min | 4 min |
| 36 | 20 | " | 11 min | 8 min | 4 min | 4 min |
| 37 | 18 | " | 10 min | 8 min | 4 min | 4 min |
| 38 | 12 | " | 10 min | 8 min | 4 min | 4 min |
| 39 | 8 | " | 9 min | 8 min | 4 min | 4 min |
| 40 | <8 | " | — | — | — | — |

As is apparent from the results given in Table 2, it is understood that, in the black colloidal silver antihalation layer-having multilayer silver halide color photographic material, in the case where the thickness of the photographic component layers (thickness of gelatin layers) is large, the bleach-fix completion time is significantly long, but becomes abruptly shortened with the decrease in the thickness of the photographic component layers (thickness of gelatin layers), and the decreasing change is most conspicuous around 25 μm, and also that the bleaching accelerator, although ineffective where the thickness of the photographic component layers (thickness of gelatin layers) is large, becomes showing a remarkably large effect with the decrease in the thickness of the photographic component layers (thickness of gelatin layers). In addition, it is also understood that, in the non-invention photographic material which uses a large amount of silver, no significant effect of the bleaching accelerator can be obtained regardless of the thickness of the layers.

On the other hand, in the silver halide color photographic material having no black colloidal silver antihalation layer, almost no influence of the thickness of the photographic component layers (thickness of gelatin layers) can be found and the bleach-fix completion time is very short, but such photographic materials having no antihalation layer cannot be practically used as high-speed silver halide color photographic materials for photographing use because the image sharpness obtained therefrom is deteriorated.

In addition, Bleaching Accelerators (9) and (12) also were examined, and similar effects to the above results were obtained.

Particularly, where the swelling rate T ½ is 10 seconds, the bleach-fix completion time is adequately short even when no bleaching accelerator is present, as compared to 35 seconds. It is understood that this can be attained only by the combination of the optimum amount of silver, thickness and swelling rate of this invention.

EXAMPLE 3

In the same manner as in Example 2, samples having the thicknesses of 36 μm and 19 μm with their coating amounts of silver being varied as 120 mg/dm$^2$, 100 mg/dm$^2$, 70 mg/dm$^2$, 50 mg/dm$^2$, 40 mg/dm$^2$ and 30 mg/dm$^2$ were prepared, and these prepared samples each was processed by using the bleach-fix bath of Example-2 (containing the aminopolycarboxylic acid salt in Table 3). The bleach-fix completion time in the processing was measured, and the results are shown in Table 3. In addition, in these samples, the amount of the hardener was varied as in Example 2 to thereby vary the swelling rate T ½.

TABLE 3

| | | Bleach-fix bath(diethylenetriamine ferric complex salt 0.26 mole) | | | |
|---|---|---|---|---|---|
| Thick- | Amt of | T ½ 35 sec | | T ½ 8 sec | |
| ness (μm) | silver (mg/dm$^2$) | No accelerator | Accelerator present | No accelerator | Accelerator present |
| 36 | 120 | over 30 min | 28 min | over 30 min | 24 min |
| " | 100 | over 30 min | 26 min | over 30 min | 20 min |
| " | 70 | over 30 min | 24 min | 26 min | 18 min |
| " | 50 | over 30 min | 24 min | 20 min | 16 min |
| " | 40 | over 30 min | 21 min | 18 min | 14 min |
| " | 30 | over 30 min | 21 min | 16 min | 10 min |
| 19 | 120 | over 30 min | 21 min | 18 min | 12 min |
| " | 100 | 28 min | 18 min | 14 min | 10 min |
| " | 70 | 28 min | 8 min | 8 min | 6 min |
| " | 50 | 20 min | 5 min | 6 min | 4 min |
| " | 40 | 14 min | 5 min | 6 min | 4 min |
| " | 30 | 12 min | 4 min | 5 min | 4 min |

As is apparent from Table 3, it is understood that, where the thickness, amount of silver and swelling rate T ½ are outside the ranges specified in this invention, no adequate bleaching accelation effect can be obtained, whereas when the thickness, amount of silver and swelling rate T ½ are within the range specified in this invention, significant bleaching aceleration effects can be obtained.

EXAMPLE 4

In accordance with the method of Example 3, samples (layer thickness 19 μm) having the coating amount of silver and swelling rate T ½ varied as given in Table 4, and these samples were processed in like manner. As for the bleach-fix bath, the 0.20 mole organic acid ferric complex salts shown in Table 4 were used, and to these were added the bleaching accelerators given in Table 4 were added in a quantity of 0.7 g per litter. The bleach-fix completion time in this processing was measured with respect to each of these samples. The results are as shown in Table 4.

TABLE 4

| Aminopolycarboxylic acid ferric complex | Coating amt of Ag | Swelling rate (T ½) = 35 sec Accelerator ex. compound | | | | Swelling rate (T ½) = 8 sec Accelerator ex. compound | | | |
|---|---|---|---|---|---|---|---|---|---|
| salt | mg/dm$^2$ | (3) | (1) | (9) | (8) | (3) | (1) | (9) | (8) |
| Triethylenetetraminehexaacetic acid (494.45) ferric complex salt 0.3 mole | 120 | 22 min | 22 min | 21 min | 22 min | 14 min | 13 min | 14 min | 16 min |
| | 100 | 20 min | 21 min | 22 min | 20 min | 13 min | 12 min | 13 min | 14 min |
| | 90 | 19 min | 19 min | 20 min | 20 min | 11 min | 10 min | 12 min | 13 min |
| | 75 | 16 min | 15 min | 14 min | 12 min | 8 min | 8 min | 7 min | 8 min |
| | 50 | 13 min | 14 min | 12 min | 11 min | 6 min | 6 min | 6 min | 6 min |
| | 40 | 12 min | 12 min | 10 min | 10 min | 5 min | 4 min | 5 min | 6 min |
| | 30 | 10 min | 11 min | 10 min | 10 min | 4 min | 4 min | 5 min | 5 min |
| Diethylenetriaminpentaacetic acid (393.27) ferric complex salt 0.3 mole | 120 | 18 min | 18 min | 21 min | 21 min | 13 min | 12 min | 16 min | 17 min |
| | 100 | 16 min | 16 min | 20 min | 20 min | 11 min | 10 min | 14 min | 14 min |
| | 90 | 14 min | 14 min | 20 min | 19 min | 10 min | 10 min | 12 min | 12 min |
| | 75 | 10 min | 11 min | 12 min | 12 min | 7 min | 6 min | 6 min | 7 min |
| | 50 | 9 min | 9 min | 11 min | 11 min | 5 min | 4 min | 6 min | 6 min |
| | 40 | 9 min | 8 min | 10 min | 10 min | 4 min | 4 min | 5 min | 5 min |
| | 30 | 8 min | 8 min | 8 min | 8 min | 4 min | 4 min | 5 min | 5 min |
| 1,2-diaminopropanetetraacetic acid (306.27) ferric complex salt 0.31 mole | 120 | 26 min | 24 min | 26 min | 26 min | 17 min | 16 min | 16 min | 15 min |
| | 100 | 25 min | 22 min | 22 min | 22 min | 15 min | 14 min | 15 min | 14 min |
| | 90 | 22 min | 19 min | 20 min | 18 min | 13 min | 12 min | 13 min | 13 min |
| | 75 | 10 min | 11 min | 14 min | 12 min | 8 min | 8 min | 9 min | 8 min |
| | 50 | 7 min | 7 min | 8 min | 8 min | 6 min | 6 min | 7 min | 7 min |
| | 40 | 7 min | 7 min | 6 min | 8 min | 5 min | 5 min | 5 min | 6 min |
| | 30 | 6 min | 6 min | 6 min | 6 min | 5 min | 4 min | 5 min | 6 min |
| Ethylenediaminetetraacetic acid (292.25) ferric complex salt 0.3 mole | 120 | 24 min | 22 min | 27 min | 27 min | 16 min | 14 min | 15 min | 14 min |
| | 100 | 22 min | 20 min | 23 min | 24 min | 14 min | 12 min | 14 min | 12 min |
| | 90 | 18 min | 16 min | 17 min | 18 min | 12 min | 10 min | 10 min | 11 min |
| | 75 | 11 min | 11 min | 10 min | 14 min | 10 min | 6 min | 7 min | 7 min |
| | 50 | 5 min | 4 min | 5 min | 5 min | 6 min | 4 min | 5 min | 4 min |
| | 40 | 5 min | 3 min | 4 min | 5 min | 4 min | 4 min | 5 min | 4 min |
| | 30 | 4 min | 3 min | 4 min | 4 min | 4 min | 4 min | 4 min | 4 min |
| Hydroxyethyliminodiacetic acid(177.16) ferric complex salt 0.32 mole | 120 | over 30 min | over 30 min | over 30 min | over 30 min | 16 min | 15 min | 17 min | 16 min |
| | 100 | 27 min | 27 min | over 30 min | over 30 min | 13 min | 14 min | 15 min | 15 min |
| | 90 | 22 min | 23 min | 23 min | 24 min | 11 min | 12 min | 12 min | 13 min |
| | 75 | 18 min | 18 min | 12 min | 12 min | 8 min | 10 min | 8 min | 9 min |
| | 50 | 8 min | 7 min | 6 min | 6 min | 5 min | 6 min | 5 min | 6 min |

TABLE 4-continued

| Aminopolycarboxylic acid ferric complex salt | Coating amt of Ag mg/dm$^2$ | Swelling rate (T ½) = 35 sec Accelerator ex. compound (3) | (1) | (9) | (8) | Swelling rate (T ½) = 8 sec Accelerator ex. compound (3) | (1) | (9) | (8) |
|---|---|---|---|---|---|---|---|---|---|
| | 40 | 6 min | 6 min | 5 min | 5 min | 5 min | 4 min | 5 min | 6 min |
| | 30 | 5 min | 5 min | 4 min | 4 min | 5 min | 4 min | 5 min | 5 min |
| Methyliminodiacetic acid (147.13) ferric complex salt 0.3 mole | 120 | over 30 min | over 30 min | over 30 min | over 30 min | 18 min | 16 min | 15 min | 16 min |
| | 100 | 28 min | 26 min | over 30 min | over 30 min | 16 min | 15 min | 14 min | 13 min |
| | 90 | 22 min | 22 min | 24 min | 26 min | 11 min | 10 min | 10 min | 12 min |
| | 75 | 19 min | 17 min | 13 min | 12 min | 10 min | 8 min | 8 min | 7 min |
| | 50 | 6 min | 6 min | 5 min | 5 min | 4 min | 6 min | 6 min | 5 min |
| | 40 | 5 min | 5 min | 4 min | 4 min | 5 min | 4 min | 5 min | 4 min |
| | 30 | 5 min | 5 min | 4 min | 4 min | 5 min | 4 min | 5 min | 4 min |

As is apparent from Table 4, if the thickness if 19 μm, when the coating amount of silver and swelling rate T ½ are not more than the limit values of this invention, a favorable bleaching acceleration effect can be obtained. Particularly when the swelling rate T ½ is large, the bleaching acceleration effect by the decrease in the coating amount of silver is significantly large in the case of the low-molecular organic ferric salt rather than in the case of the high-molecular organic ferric salt, while when the swelling rate T ½ is small, there occurs no such a phenomenon and a satisfactory desilvering rate can be obtained in either of the high-molecular acid ferric complex salt and low-molecular organic acid ferric complex salt if the using quantity thereof is optimum.

EXAMPLE 5

Photographic material samples were prepared in the same manner as in Example 2, coating in order from the support side an antihalation layer, low-speed red-sensitive silver halide emulsion layer an high-speed red-sensitive silver halide emulsion layer with various auxiliary layers interposed therebetween, provided that the red-sensitive silver halide emulsion layers were repeatedly coated for layer thickness adjustment, and regarding the swelling rate T ½, samples were adjusted so as to obtain 35 seconds and 7 seconds.

Layer 1:

Black colloidal silver antihalation layer quite the same as the Layer 1 of Example 1.

Layer 2:

Interlayer quite the same as the Layer 2 of Example 2.

Layer 3:

Low-speed red-sensitive silver halide emulsion layer quite similar to the Layer 3 of Example 2 except that the silver iodide content is varied as shown in Table 5.

Layer 4:

High-speed red-sensitive silver halide emulsion layer quite similar to the Layer 4 of Example 2 except that the silver iodide content is varied as shown in Table 5.

Layer 5:

Interlayer quite the same as the Layer 5 of Example 2.

Layer 6:

The Layer 3 was coated again.

Layer 7:

The Layer 4 was coated again.

Layer 8:

The Layer 5 was coated again.

Layer 9:

The Layer 3 was coated again.

Layer 10:

The Layer 4 was coated again.

Layer 11:

The Layer 5 was coated again.

Layer 12:

Second protective layer quite the same as the Layer 11 of Example 2.

Layer 13:

First protective layer quite the same as the Layer 12 of Example 2.

The dry thickness of the photographic component layers of the obtained sample was about 20 μm. The sample was exposed and then processed in the same manner as in Example 2. The results are shown in Table 5.

TABLE 5

| Swelling rate T ½ | AgI content mean mole % | EDTA-Fe *1 Bleach-fix bath No accelerator | Accelerator present | DTPA-Fe *2 Bleach-fix bath No accelerator | Accelerator present | HIDA-Fe *3 Bleach-fix bath No accelerator | Accelerator present |
|---|---|---|---|---|---|---|---|
| | 0.1 | 11 min | 8 min | 8 min | 4 min | 12 min | 6 min |
| | 0.3 | 13 min | 12 min | 11 min | 4 min | 18 min | 6 min |
| | 0.5 | 21 min | 16 min | 18 min | 8 min | 22 min | 10 min |
| | 1.0 | over 30 min | 21 min | 26 min | 12 min | over 30 min | 14 min |
| 35 sec | 3.0 | over 30 min | 24 min | over 30 min | 12 min | over 30 min | 14 min |
| | 5.0 | over 30 min | 26 min | over 30 min | 14 min | over 30 min | 16 min |
| | 8.0 | over 30 min | 28 min | over 30 min | 12 min | over 30 min | 18 min |
| | 12.0 | over 30 min | over 30 min | over 30 min | 22 min | over 30 min | over 30 min |
| | 20.0 | over 30 min | over 30 min | over 30 min | over 30 min | over 30 min | over 30 min |
| | 0.1 | 9 min | 5 min | 7 min | 4 min | 8 min | 4 min |
| | 0.3 | 8 min | 6 min | 8 min | 4 min | 8 min | 4 min |
| | 0.5 | 10 min | 5 min | 8 min | 5 min | 9 min | 4 min |
| | 1.0 | 12 min | 4 min | 9 min | 5 min | 9 min | 5 min |
| 7 sec | 3.0 | 12 min | 4 min | 9 min | 6 min | 9 min | 7 min |
| | 5.0 | 14 min | 6 min | 10 min | 6 min | 10 min | 7 min |
| | 8.0 | 14 min | 5 min | 10 min | 5 min | 11 min | 6 min |
| | 12.0 | 14 min | 5 min | 11 min | 6 min | 12 min | 8 min |

TABLE 5-continued

| Swelling rate T ½ | AgI content mean mole % | EDTA-Fe *1 Bleach-fix bath | | DTPA-Fe *2 Bleach-fix bath | | HIDA-Fe *3 Bleach-fix bath | |
|---|---|---|---|---|---|---|---|
| | | No accelerator | Accelerator present | No accelerator | Accelerator present | No accelerator | Accelerator present |
| | 20.0 | 14 min | 5 min | 12 min | 6 min | 14 min | 6 min |

Note:
*1 EDTA-Fe: Ethylenediaminetetraacetic acid ferric complex salt
*2 DTPA-Fe: Diethylenetriaminepentaacetic acid ferric complex salt
*3 HIDA-Fe: Hydroxyethyliminodiacetic acid ferric complex salt As is apparent from Table 5, where the silver iodide content is small, the desilvering rate is high regardless of both the swelling rate T ½ and the presence of the bleaching accelerator. However, as the silver iodide content inreases, if the swelling rate T ½ is large, the bleaching rate becomes significantly reduced, but if the swelling rate T ½ is not more than the limit value specified in this invention, the bleaching rate is hardly reduced even if the silver iodide content exceeds 1 mole% which is considered advantageous from the standpoint of the sensitivity or sharpness, particularly even if exceeding 1 mole%.

EXAMPLE 6

In the same manner as in Example 5 a sample having a silver iodide content of 8 mole%, a swelling rate T ½ of 8 seconds and an emulsion layer thickness of 19 μm was prepared.

Provided that the ferric-ammonium diethylenetriaminepentaacetate of *2 in Example 5 was prepared in accordance with Example 2 to be used in a quantity of 150 g per liter as the bleach-fix bath, and the sample was exposed and processed in the same manner as in Example 5. To the bleach-fix bath was added one each of the following bleaching accelerators of this invention. The desilvering completion time was measured with respect to each of the following bleaching accelerators. The results are shown in Table 6.

[Bleaching accelerators used]

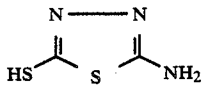
(1)

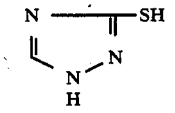
(2)

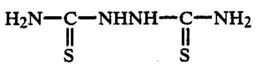
(3)

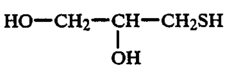
(4)

$HS—CH_2CH_2—COOH$ (5)

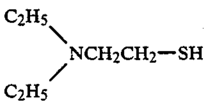
(6)

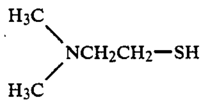
(7)

-continued

[Bleaching accelerators used]

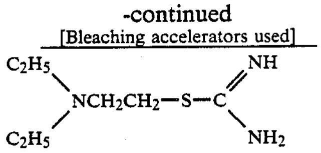
(8)

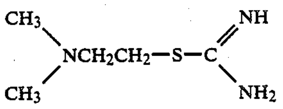
(9)

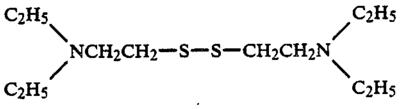
(10)

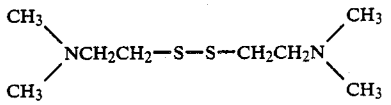
(11)

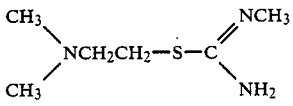
(12)

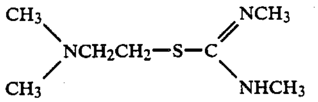
(13)

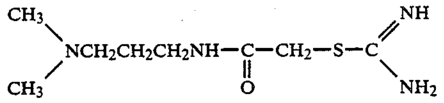
(14)

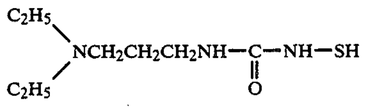
(15)

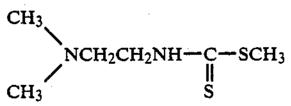
(16)

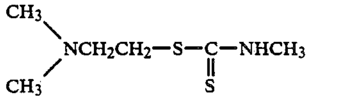
(17)

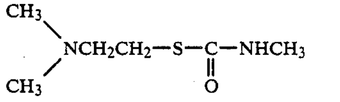
(18)

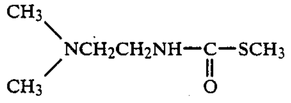
(19)

-continued

[Bleaching accelerators used]

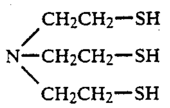

(20)

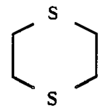

(21)

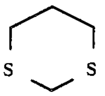

(22)

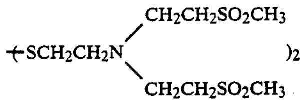

(23)

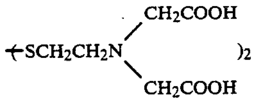

(24)

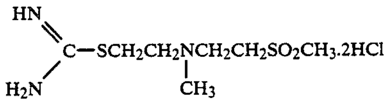

(25)

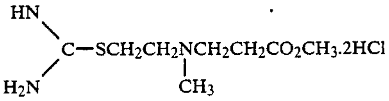

(26)

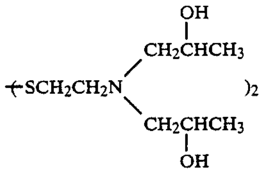

(27)

$HSCH_2CH_2NHCH_2CH_2OH$ (28)

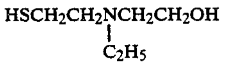

(29)

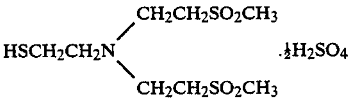

(30)

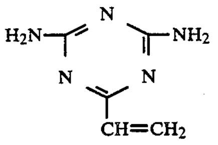

(31)

TABLE 6

| Added accelerator | Desilvering completion time (min) Added quantity of accelerator (g/liter) | | | | |
|---|---|---|---|---|---|
| (Ex. No.) | 0 | 1 | 3 | 5 | 10 |
| 1 | 12 | 5 | 6 | 6 | 7 |
| 2 | " | 5 | 6 | 6 | 8 |
| 3 | " | 5 | 5 | 7 | 8 |
| 4 | " | 7 | 7 | 6 | 8 |
| 5 | " | 6 | 5 | 7 | 7 |
| 6 | " | 7 | 6 | 7 | 8 |
| 7 | " | 7 | 6 | 7 | 8 |
| 8 | " | 8 | 7 | 6 | 7 |
| 9 | " | 8 | 7 | 6 | 7 |
| 10 | " | 7 | 7 | 5 | 7 |
| 11 | " | 7 | 7 | 5 | 7 |
| 12 | " | 6 | 6 | 5 | 7 |
| 13 | " | 8 | 7 | 6 | 8 |
| 14 | " | 8 | 6 | 7 | 8 |
| 15 | " | 7 | 6 | 7 | 8 |
| 16 | " | 5 | 5 | 6 | 7 |
| 17 | " | 6 | 7 | 7 | 8 |
| 18 | " | 7 | 6 | 6 | 7 |
| 19 | " | 5 | 5 | 6 | 7 |
| 20 | " | 5 | 5 | 5 | 6 |
| 21 | " | 5 | 6 | 6 | 7 |
| 22 | " | 7 | 6 | 6 | 7 |
| 23 | " | 6 | 6 | 7 | 7 |
| 24 | " | 6 | 5 | 7 | 7 |
| 25 | " | 5 | 6 | 6 | 7 |
| 26 | " | 6 | 6 | 5 | 7 |
| 27 | " | 6 | 5 | 7 | 7 |
| 28 | " | 5 | 6 | 7 | 7 |
| 29 | " | 6 | 6 | 8 | 8 |
| 30 | " | 7 | 6 | 6 | 7 |
| 31 | " | 5 | 5 | 5 | 6 |

As is apparent from Table 6, in the sample whose swelling rate T ½, layer thickness and coating amount of silver are in the respective ranges of this invention, any exemplified accelerators of this invention show satisfactory bleaching acceleration effects.

Further, other experiments similar to the above were made with respect to the cases of two different bleach-fix baths: where 160 g/liter of ferric-ammonium ethylenediaminetetraacetate were used as the bleaching accelerator in a bleach-fix bath and where 200 g/liter of ferric-ammonium hydroxyethyliminodiacetate were used as the same, and the desilvering completion time in each case was measured. Consequently, the substantially same satisfactory results as in the case of the ferric-ammonium diethylenetriaminepentaacetate were obtained.

EXAMPLE 7

Following the layer arrangements being adopted by the skilled in the art to high-speed silver halide color photosensitive materials, an antihalation layer, a red-sensitive silver halide emulsion layer, a green-sensitive silver halide emulsion layer and a blue-sensitive silver halide emulsion layer are arranged in order from a support with the inter-position of various types of auxilaiary layers and further a monodisperse high-speed silver halide emulsion layer is arranged to the outermost side of the blue-sensitive silver halide emulsion layer.

The samples were prepared according to the following layer coating requirements, in such a manner that each of the layer thicknesses was so adjusted by changing an amount of gelatin as to keep an amount of silver coated constant and the dried layer thicknesses were varied, respectively. Every amount of silver coated was so adjusted as to be about 100 $mg/dm^2$ and 50 $mg/dm^2$ and also to be 18 seconds at the layer-swelling rate T ½.

The following are the standard layer coating requirements in which each of the recipes was adjusted by an amount of gelatin so as to vary the layer thicknesses.

Layer 1:

An antihalation layer which was prepared in such a manner that silver nitrate was so reduced by a reducing agent, i.e., hydroquinone, as to be a balck colloidal silver capable of displaying a high absorptivity with respect to the rays of light having a wavelength region of from 400 to 700 nm, and a dispersed liquid was prepared by using 0.8 g of the black colloidal silver and 3 g of gelatin and coated on.

Layer 2:

An interlayer comprising gelatin. (The dried layer thickness was 0.8 μm)

Layer 3:

A low-speed red-sensitive silver halide emulsion layer which contains 1.5 g of low-speed red-sensitive silver iodobromide emulsion containing AgI of 6 mol% of the silver iodobromide used therein, 1.9 g of gelatin and 0.4 g of tricresyl phosphate (hereinafter called TCP) in which 0.96 g of the Exemplified Coupler C-2 of the invention and 0.028 g of 1-hydroxy-4-[4-(1-hydroxy-8-acetamido-3,6-disulfo-2-naphthylazo)phenoxy]-N-[δ-(2,4-diamylphenoxy)butyl]-2-naphthamido.disodium (hereinafter called Colored Cyan Coupler CC-1) were dissolved.

Layer 4:

A high-speed red-sensitive silver iodobrmide emulsion layer which contains 1.1 g of a high-speed red-sensitive silver iodobromide emulsion containing AgI of 8 mol% of the silver iodobromide used therein, 1.2 g of gelatin and 0.15 g of TCP in which 0.41 g of Cyan Coupler C-2 and 0.026 g of Colored Cyan Coupler CC-1.

Layer 5:

An interlayer containing 0.04 g of dibutyl phthalate (hereinafter called DBP) into which 0.08 g of 2,5-di-t-octyl hydroquinone (hereinafter called an anti-staining agent, HQ-1) were dissolved, and 1.2 g of gelatin.

Layer 6:

A low-speed green-sensitive silver halide emulsion layer which contains 1.6 g of a low-speed green-sensitive silver iodobrimide emulsion containing AgI of 15 mol% of the AgIBr content, 1.7 g of gelatin and 0.3 g of TCP dissolved therein with the three kinds of couplers, i.e., 0.30 g of 1-(2,4,6-trichlorophenyl)-3-[3-(2,4-di-t-amylphenoxyacetamido)benzeneamido]-5-pyrazolone (hereinafter called a magenta coupler, M-1), 0.20 g of 4,4-methylenebis-11-(2,4,6-trichlorophenyl)-3-[3-(2,4-di-t-amylphenoxyacetamido)benzeneamido]-5-pyrazolone (hereinafter called a magena coupler, M-2) and 0.066 g of 1-(2,4,6-trichlorophenyl)-4-(1-naphthylazo)-3-(2-chloro-5-octadecenyl succinimidanilino)-5-pyrazolone (hereinafter called a colored magenta coupler, CM-1).

Layer 7:

A high-speed green-sensitive silver halide emulsion layer which contains 1.5 g of a high-speed green-sensitive silver iodobromide emulsion containing AgI of 11 mol% of the AgIBr content, 1.9 g of gelatin and 0.12 g of TCP dissolved therein with 0.093 g of magenta coupler M-1, 0.094 g of magenta coupler M-2 and 0.049 g of colored magenta coupler CM-1.

Layer 8:

A yellow filter layer which contains 0.2 g of yellow colloidal silver, 0.11 g of DBP dissolved therein with 0.2 g of an antistaining agent HQ-1, and 2.1 g of gelatin.

Layer 9:

A low-speed blue-sensitive silver halide emulsion layer which contains 0.95 g of a low-speed blue-sensitive silver iodobromide emulsion containing AgI of 6 mol% of the AgIBr content, 1.9 g of gelatin, and 0.93 g of DBP dissolved therein with 1.84 g of α-[4-(1-benzyl-2-phenyl-3,5-dioxo-1,2,4-triazolidinyl)]-α-pivaloyl-2-chloro-5-[γ-(2,4-di-t-amyl-phenoxy)-butanamido]acetanilide (hereinafter called a yellow coupler, Y-1).

Layer 10:

A high-speed blue-sensitive silver halide emulsion layer which contains 1.2 g of a high-speed monodispersed blue-sensitive silver iodobromide emulsion containing AgI of 7 mol% of the AgIBr content, 2.0 g of gelatin, and 0.23 g of DBP dissolved therein with 0.46 g of yellow coupler Y-1.

Layer 11:

The second protective layer comprising gelatin.

Layer 12:

The first protective layer containing 2.3 g of gelatin.

The dried layer thicknesses of the photographic component layers of the completed samples were 35 μm, 27 μm, 25 μm, 20 μm and 18 μm, respectively. They are denoted by Samples Nos. 1 to 5, respectively. In the samples, no change was made at all with respect to the layer thcknesses of the respective antihalation layers, gelatin interlayers and yellow filter layers and the respective black colloidal silver contents thereof.

Separate from the above-mentioned samples, there were prepared the samples, i.e., the samples replaced the Coupler C-2 relating to the invention by C-70 in the 3rd and 4th layers thereof. (Denoted by Samples Nos. 6 to 10 in the layer thickness order); the samples replaced by C-31. (Denoted by Samples Nos. 11 to 15); the samples replaced by the Comparatice Cyan Coupler (1). (Denoted by Samples Nos. 16 to 20); and the samples replaced by the Comparatie Cyan Coupler (2). (Denoted by Samples Nos. 21 to 25). There were further prepared the samples in such a manner that the emulsions each having the same compositions as those of Samples Nos. 1 to 25 and the amount of the hardener was increased so as to slow the layer swelling rate T ½ down to 35 seconds.

The processing steps thereof were 3 min. 15 sec. for color development, 1 min. to 30 min. for bleach-fixing, 2 min. for the first stabilizing and 30 sec. for the second stabilizing step.

Each of the processing steps was carried out at 37.8° C. and the processing liquids were prepared by the following formulas:

| | | |
|---|---|---|
| [Color developer] | | |
| The same one as that used in Example 1. | | |
| [Bleach-fixer] | | |
| Diammonium ethylenediamine tetraacetate | 7.5 | g |
| Aminopolycarboxylic acid ferric complex salt (added as shown in Table 2) | | |
| Ammonium sulfite (a 50% solution) | 10.0 | g |
| Ammonium Thiosulfate (a 70% solution) | 200.0 | g |
| Add water to make | 1000.0 | cc |
| Adjust the pH value with ammonium hydroxide to | pH 7.5 | |
| [First stabilizer] | | |
| 1-hydroxyethilidene-1,1-diphosphoric acid | 3.0 | g |
| 5-chloro-2-methyl-4-isothiazoline-3-one | 1.0 | g |
| ethylene glycol | 1.0 | g |
| Add water to make | 1000.0 | cc |
| Adjust the pH value with potassium hydroxide to | pH 7.1 | |
| [Second stabilizer] | | |
| Formalin (a 37% solution) | 7.0 | ml |

-continued

| | |
|---|---|
| 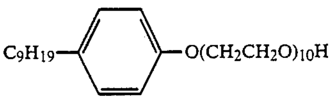 | 1.0 ml |
| Add water to make | 1000.0 cc |

The process was made by using a ferric coupler salt of ethylenediamine tetraacetate for the aminopolycarboxylic acid of the bleach-fixer. As for the bleach accelerator, the exemplified compound (1) was added in an amount of 0.7 g per liter of the bleach-fixer. The time necessary for completing the bleach-fix process was measured. the samples after processed were applied with both of the torture test at a high temperature and hunidity of 70° C. and 50%RH and that made by a xenon arc lamp ($1.5\times10^7$ Lux hour) alternately for 4 weeks. With respect to each of the samples, the cyan dye densities around the density 1.5 thereof were measured by making use of an optical densitometer, Model PDA-65 (manufactured by Konishiroku Photo Industry Co., Ltd., Japan) so as to obtain the discoloration ratios.

$$\frac{\text{density before preservation} - \text{density after preservation}}{\text{density before preservation}} \times 100$$

The results thereof are shown in Table 7, provided that the bleach-fixing time was for 3 minutes.

Comparative cyan coupler (1)

-continued

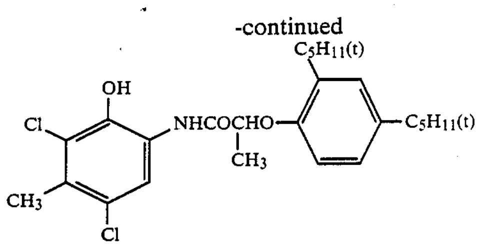

Comparative cyan coupler (2)

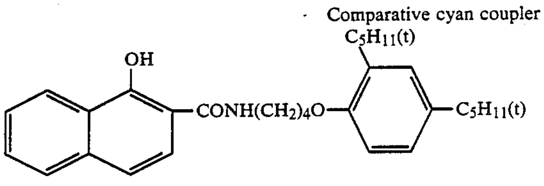

TABLE 7

| | | | Bleach-fixer (EDTA-Fe* 0.3 mol) | | | |
|---|---|---|---|---|---|---|
| | | Layer | T ½ = 18 sec. | | T ½ = 35 sec. | |
| Sample No. | Cyan coupler | thickness (μm) | Dye discoloration ratio (%) | Desalting completion time | Dye discoloration ratio (%) | Desalting completion time |
| 1 | C-2 | 35 | 36 | 18 min. | 38 | 24 min. |
| 2 | " | 27 | 30 | 16 min. | 32 | 21 min. |
| 3 | " | 25 | 9 | 5 min. | 19 | 6 min. |
| 4 | " | 20 | 8 | 4 min. | 15 | 5 min. |
| 5 | " | 18 | 8 | 4 min. | 15 | 5 min. |
| 6 | C-70 | 35 | 34 | 19 min. | 36 | 23 min. |
| 7 | " | 27 | 28 | 16 min. | 30 | 21 min. |
| 8 | " | 25 | 10 | 5 min. | 20 | 6 min. |
| 9 | " | 20 | 9 | 4 min. | 16 | 5 min. |
| 10 | " | 18 | 9 | 4 min. | 16 | 5 min. |
| 11 | C-31 | 35 | 34 | 19 min. | 37 | 22 min. |
| 12 | " | 27 | 31 | 17 min. | 34 | 20 min. |
| 13 | " | 25 | 10 | 5 min. | 20 | 6 min. |
| 14 | " | 20 | 9 | 4 min. | 19 | 5 min. |
| 15 | " | 18 | 9 | 4 min. | 18 | 5 min. |
| 16 | Comparative-1 | 35 | 42 | 18 min. | 15 | 23 min. |
| 17 | " | 27 | 34 | 16 min. | 38 | 20 min. |
| 18 | " | 25 | 27 | 5 min. | 30 | 6 min. |
| 19 | " | 20 | 24 | 4 min. | 28 | 5 min. |
| 20 | " | 18 | 24 | 4 min. | 28 | 5 min. |
| 21 | Comparative-2 | 35 | 48 | 18 min. | 46 | 24 min. |
| 22 | " | 27 | 42 | 14 min. | 39 | 21 min. |
| 23 | " | 25 | 25 | 5 min. | 30 | 6 min. |
| 24 | " | 20 | 23 | 4 min. | 29 | 5 min. |
| 25 | " | 18 | 23 | 4 min. | 28 | 5 min. |

*EDTA-Fe = Ethylenediamine tetraacetic acid ferric complex salt.

It is obvious from the results shown in the Table 7 that, as have been known so far, even when using the cyan couplers represented by the Formula [C I] or [C II], the discoloration of cyan dyes may be inhibited to some extent and, in addition to the above, when adding them further into the emulsion layers having a layer thickness of not more than 25 μm and a layer swelling rate T½ of not longer than 25 sec, which are the constitutional requirements of the invention, the optimum effects of inhibiting the discoloration may be displayed on cyan dyes. It is also understood that the use of the above-mentioned cyan couplers does never affect the desalting characteristics at all in a bealch-fixing process.

EXAMPLE 8

With respect to the samples prepared by changing the layer swelling rates T½ of the Samples Nos. 4, 9, 14, 19 and 24 (each of the layer thicknesses thereof was 20 μm) to the rate T½ for 20 seconds and by carrying out the same treatments as in Example 1, and the other samples prepared by changing the rate T½ as same as above and by treating them in the bleaching and fixing processes prescribed by the GNK-4N (a process for color negative films manufactured by Konishiroku Photo Ind. Co., Ltd., Japan), instead of the bleach-fix process applied to Example 1, the discoloration ratios thereof were obtained in the same manner as in Example 1. The results thereof are shown in Table 8.

TABLE 8

| Sample No. | Cyan coupler in red-sensitive layers | Discoloration ratio of cyan dye (%) EDTA-Fe 0.3 mol | CNK-4N |
|---|---|---|---|
| 4 | C-2 | 9 | 25 |
| 9 | C-70 | 8 | 26 |
| 14 | C-31 | 8 | 24 |
| 19 | Comparative-1 | 29 | 30 |
| 24 | Comparative-2 | 33 | 32 |

It is obvious from the results shown in Table 8 that, as compared with the samples applied with the conventional bleach-fix process, the samples applied with the bleach-fix process relating to the invention are able to display the more remarkable discoloration inhibiting effects on cyan dyes when the cyan couplers relating to the invention are used therein.

EXAMPLE 9

The samples were prepared by changing the layer swelling rates T½ to 10 seconds from the rates T½ of the Samples Nos. 4, 9, 14, 19 and 24 of Example 1 and were then processed in the same manner as in Example 7, except that the organic acid ferric complex salts of the bleach-fixer of Example 1 were changed to those shown in Table 9, and the the cyan dye discoloration inhibition effects thereof were observed. The results thereof are shown in Table 9.

TABLE 9

| Organic acid ferric complex salt | Sample No. | Cyan coupler | Cyan dye discoloration rate (%) | Time for competing a desalting |
|---|---|---|---|---|
| | 4 | C-2 | 8 | 5 min. |
| Triethylene tetrammine | 9 | C-70 | 9 | 5 min. |
| hexaacetic acid (499.45) | 14 | C-31 | 8 | 4 min. |
| ferric complex salt | 19 | Comparative-1 | 25 | 5 min. |
| 0.3 mol | 24 | Comparative-2 | 27 | 4 min. |
| | 4 | C-2 | 9 | 4 min. |
| Diethylene triammine | 9 | C-70 | 8 | 5 min. |
| pentaacetic acid (393.27) | 14 | C-31 | 9 | 5 min. |
| ferric complex salt | 19 | Comparative-1 | 25 | 5 min. |
| 0.3 mol | 24 | Comparative-2 | 24 | 4 min. |
| | 4 | C-2 | 10 | 4 min. |
| Hydroxyethylimino | 9 | C-70 | 9 | 4 min. |
| diacetic acid (177.16) | 14 | C-31 | 11 | 4 min. |
| ferric complex salt | 19 | Comparative-1 | 23 | 5 min. |
| 0.32 mol | 24 | Comparative-2 | 24 | 4 min. |
| | 4 | C-2 | 10 | 5 min. |
| Methylimino diacetic | 9 | C-70 | 9 | 5 min. |
| acid (147.13) ferric | 14 | C-31 | 9 | 4 min. |
| complex salt 0.3 mol | 19 | Comparative-1 | 25 | 5 min. |
| | 24 | Comparative-2 | 22 | 4 min. |

It is well understood from the results shown in Table 9 that the remarkable cyan dye discoloration prevention effects may excellently be displayed and the desalting characteristics may not also be deteriorated, by making use of the cyan couplers represented by the Formula [C I] or [C II], even if the molecular weight of the organic acid ferric complex salts are variously changed.

EXAMPLE 10

In this example, the first stabilizing step in the course of the process in Example 1 was changed to a washing step for 3 minutes 15 seconds and the same procedures as in Example 1 were repeated, and the same and excellent results at all were still obtained with respect to the cyan dye discoloration inhibition effects.

EXAMPLE 11

Following the layer arrangements having been adopted in the art to a high-speed silver halide color photosensitive material, there arranged, in the order from a support (a cellulose triacetae film support), an antihalation layer, a red-sensitive silver halide emulsion layer, a green-sensitive silver halide emulsion layer and a blue-sensitive silver halide emulsion layer, with the interposition of various types of auxiliary layers, and also arranged a monodisperse high-speed silver halide emulsion layer to the outermost side of the above-mentioned blue-sensitive silver halide emulsion layer.

The amount of silver coated was so adjusted as to be about 50 mg/dm$^2$.

Layer 1:

An antihalation layer. This layer was prepared in such a manner that silver nitrate was so reduced by a reducing agent, i.e., hydroquinone, as to be a balck colloidal silver capable of displying a high absorptivity with respect to the rays of light having a wavelength region of from 400 to 700 nm, and a dispersed liquid was prepared by using 0.8 g of the black colloidal silver and 3 g of gelatin and coated on.

Layer 2:

An interlayer comprising gelatin. (The dried layer thickness was 0.8 μm)

Layer 3:

A low-speed red-sensitive silver halide emulsion layer which contains 1.5 g of a low-speed red-sensitive silver iodobromide emulsion containing AgI of 6 mol% of the silver iodobromide used therein, 1.9 g of gelatin and 0.4 g of tricresyl phosphate (hereinafter called TCP) in which 0.96 g of the aforementioned Comparative Coupler (1) and 0.028 g of 1-hydroxy-4-[4-(1-hydroxy-8-acetamido-3,6-disulfo-2-naphthylazo)-phenoxy]-N-[δ-(2,4-di-amylphenoxy)butyl]-2-naphthamido.disodium (hereinafter called Colored Cyan Coupler CC-1) were dissolved.

Layer 4:

A high-speed red-sensitive silver halide emulsion layer which contains 1.1 g of a high-speed red-sensitive silver iodobromide emulsion containing AgI of 8 mol% of the silver iodobromide used therein, 1.2 g of gelatin and 0.15 g of TCP in which 0.41 g of Comparative Cyan Coupler (1) and 0.026 g of Colored Cyan Coupler CC-1.

Layer 5:

An interlayer containing 0.04 g of dibutyl phthalate (hereinafter called DBP) into which 0.08 g of 2,5-di-t-octyl hydroquinone (hereinafter called an anti-staining agent, HQ-1) were dissolved, and 1.2 g of gelatin.

Layer 6:

A low-speed green-sensitive silver halide emulsion layer which contains 1.6 g of a low-speed green-sensitive silver iodobrimide emulsion containing AgI of 15 mol% of the AgIBr content, 1.7 g of gelatin and 0.3 g of TCP dissolved therein with the three kinds of couplers, i.e., 0.30 g of 1-(2,4,6-trichlorophenyl)-3-[3-(2,4-di-t-amylphenoxyacetamido)benzeneamido]-5-pyrazolone (hereinafter called a magenta coupler, M-1), 0.20 g of 4,4-methylenebis-11-(2,4,6-trichlorophenyl)-3-[3-(2,4-di-t-amylphenoxyacetamido)benzenamido]-5-pyrazolone (hereinafter called a magena coupler, M-2) and 0.066 g of 1-(2,4,6-trichlorophenyl)-4-(1-naphthylazo)-3-(2-chloro-5-octadecenylsuccinimidanilino)-5-pyrazolone (hereinafter called a colored magenta coupler, CM-1).

Layer 7:

A high-speed green-sensitive silver halide emulsion layer which contains 1.5 g of a high-speed green-sensitive silver iodobromide emulsion containing AgI of 11 mol% of the AgIBr content, 1.9 g of gelatin and 0.12 g of TCP dissolved therein with 0.093 g of magenta coupler M-1, 0.094 g of magenta coupler M-2 and 0.049 g of colored magenta coupler CM-1.

Layer 8:

A yellow filter layer which contains 0.2 g of yellow colloidal silver, 0.11 g of DBP dissolved therein with 0.2 g of an antistaining agent HQ-1, and 2.1 g of gelatin.

Layer 9:

A low-speed blue-sensitive silver halide emulsion layer which contains 0.95 g of a low-speed blue-sensitive silver iodobromide emulsion containing AgI of 6 mol% of the AgIBr content, 1.9 g of gelatin, and 0.93 g of DBP dissolved therein with 1.84 g of α-[4-(1-benzyl-2-phenyl-3,5-dioxo-1,2,4-triazolidinyl)]-α-pivaloyl-2-chloro-5-[γ-(2,4-di-t-amylphenoxy)butanamido]acetanilide (hereinafter called a yellow coupler, Y-1).

Layer 10:

A high-speed blue-sensitive silver halide emulsion layer which contains 1.2 g of a high-speed monodispersed blue-sensitive silver iodobromide emulsion containing AgI of 7 mol% of the AgIBr content, 2.0 g of gelatin, and 0.23 g of DBP dissolved therein with 0.46 g of yellow coupler Y-1.

Layer 11:

The second protective layer comprising gelatin.

Layer 12:

The first protective layer containing 2.3 g of gelatin.

The dried layer thickness of the photographic component layer of the completed sample was 20 μm. The layer swelling rate $T\frac{1}{2}$ thereof was 10 seconds. This sample was denoted by Sample No. 31.

Separate from the above-mentioned samples, there were prepared the Samples Nos. 32 through 35 by changing the Comparative Cyan Coupler (1) being contained in the 3rd and 4th layers to the Comparative Cyan Coupler (2), the Exemplified Couplers C-107, C-101 and C-121 each represented by the Formula [C VI].

The above-mentioned silver halide photographic sensitive materials were exposed to light as mentioned later and were then treaded in accordance with the following Process (I). The processing steps were carried out in the color development for 3 minutes 15 seconds, bleach-fixing for 5 minutes, washing for 3 minutes 15 seconds and stabilizing for 3 minutes 15 seconds, at a temperature of 37.8° C., respectively. The processing liquids used therein were prepared in the following formulas:

| | |
|---|---|
| [Color developer] | |
| Potassium carbonate | 30.0 g |
| Sodium hydrogencarbonate | 2.5 g |
| Potassium sulfite | 5.0 g |
| sodium bromide | 1.3 g |
| potassium iodide | 2.0 mg |
| Hydroxylamine sulfate | 2.5 g |
| Sodium chloride | 0.6 g |
| Sodium diethylenetriamine pentaacetate | 2.5 g |
| 4-amino-3-methyl-N—ethyl-N—(β-hydroxyethyl) aniline sulfate | 4.8 g |
| Potassium hydroxide | 1.2 g |
| Add water to make | 1000.0 cc |
| Adjust the pH value with potassium hydroxide or a 20% sulfuric acid solution to pH | 10.06 |
| [Color developer replenisher] | |
| Potassium carbonate | 35.0 g |
| Sodium hydrogencarbonate | 3.0 g |
| Potassium sulfite | 7.0 g |
| Sodium bromide | 0.9 g |
| Hydroxylamine sulfate | 3.1 g |
| Sodium diethylenetriamine pentaacetate | 3.2 g |
| 4-amino-3-methyl-N—ethyl-N—(β-hydroxyethyl) aniline sulfate | 5.4 g |
| Potassium hydroxide | 2.0 g |
| Add water to make | 1000.0 cc |
| Adjust the pH value with potassium hydroxide or a 20% sulfuric acid solution to pH | 10.12 |
| [Bleach-fixer] | |
| Ferric ethylenediamine tetraacetate | 0.3 mol |
| Ammonium sulfite | 5.0 g |
| Ammonium thiosulfate | 150.0 g |
| Aqueous ammonia (a 28% solution) | 10.0 ml |
| Add water to make | 1000.0 cc |
| Adjust the pH value with acetic acid or aqueous ammonia to pH | 7.5 |
| [Bleach-fixer replenisher] | |
| Ferric ethylenediamine tetraacetate | 0.4 mol |
| Ammonium sulfite | 10.0 g |
| Ammonium thiosulfate | 180.0 g |
| Aqueous ammonia (a 28% solution) | 10.0 ml |
| Add water to make | 1000.0 cc |
| Adjust the pH value with acetic acid or aqueous ammonia to pH | 7.0 |
| [Stabilizer] | |
| Formalin (a 37% aqueous solution) | 2.0 ml |
| Konidax (mfd. by Konishiroku Photo Ind. Co., Ltd.) | 5.0 ml |
| Add water to make | 1000.0 cc |
| [Stabilizer replenisher] | |
| Formalin (a 37% aqueous solution) | 3.0 ml |
| Konidax (mfd. by Konishiroku Photo Ind. Co., Ltd.) | 7.0 ml |
| Add water to make | 1000.0 cc |

The color developer replenisher was replenished in an amount of 15 ml per 100 $cm^2$ of a color netive film, into a color developer; the bleach-fixer replenisher was replenished in an amount of 8 ml per 100 $cm^2$ of a color negative film, into a bleach-fixer; the stabilizer replenisher was replenished in an amount of 10 ml per 100 $cm^2$ of a color negative film, into a stabilizer; and the washing water was flowed in an amount of 150 ml per 100 $cm^2$ of a color negative film, respectively.

The color turbidity was checked up in the following manner. When the samples were exposed to light, the wave-lengths thereof were regulated by making use of a Wratten gelating filter No. 26 (manufactured by Eastman Kodak Company). The cyan dye density of each processed sample was measured through red-light by making use of an optical densitometer, Model PDA-65, (manufactured by Konishiroku Photo Ind. Co., Ltd.) and, similarly, the measurements were made, through a green- and yellow-lights, respectively, with respect to the magenta and yellow dye densities in the exposure range where the cyan dye density became 1.0 after deducting the cyan dye density in the unexposed areas from the above-mentioned cyan dye density.

In addition to the above, the residual silver amounts in the processed emulsion layers were quantitatively determined through the spectral absorptivity obtained in 1000 nm. The results thereof are shown in Table 10.

TABLE 10

| Sample | Bleach-fixing | Cyan coupler | Magenta density Fresh liquid | Magenta density Exhausted liquid | Yellow density Fresh liquid | Yellow density Exhausted liquid | Silver content(mg/dm$^2$) Fresh liquid | Silver content(mg/dm$^2$) Exhaust liquid |
|---|---|---|---|---|---|---|---|---|
| 1 | Process (I) (Invention) | Comparative-1 | 0.06 | 0.16 | 0.04 | 0.12 | 0 | 0 |
| 2 | | Comparative-2 | 0.06 | 0.14 | 0.04 | 0.11 | 0 | 0 |
| 3 | | C-107 | 0.06 | 0.08 | 0.04 | 0.04 | 0 | 0 |
| 4 | | C-101 | 0.06 | 0.07 | 0.04 | 0.05 | 0 | 0 |
| 5 | | C-121 | 0.06 | 0.08 | 0.04 | 0.05 | 0 | 0 |

The following facts are obvious from Table 10. Namely, in the case that the Samples 1 and 2 each containing the comparative cyan couplers are processed when the processing liquids are exhausted, the magenta and yellow densities are increased, that is to say, the so-called color turbidity is produced, even if the exposures should be so made as to develop only a cyan color and, on the other hand, when using the cyan couplers represented by the Formula [C VI], such magenta and yellow densities may be inhibited from increasing, that is to say, no color turbidity is produced, even if the bleach-fixer should be exhausted. It is further obvious from the results of the silver contents measured after processing that such color turbidity is not caused simply by an improper desilvering treatment.

EXAMPLE 12

Taking the Samples Nos. 1, 3 and 4 prepared in Example 11, the organic acid ferric complex salts of the invention contained in the bleach-fixer were changed to those indicated in Table 11. The resulted samples were exposed to light and processed in the same manner as in Example 11, and they were measured with respect to the color turbidities of the cyan dyes thereof when fresh and exhausted processing liquids, respectively. The results thereof are shown in Table 11.

TABLE 11

| Organic acid ferric complex salt | Sample No. | Cyan coupler | Magenta density Fresh liquid | Magenta density Exhausted liquid | Yellow density Fresh liquid | Yellow density Exhausted liquid |
|---|---|---|---|---|---|---|
| Triethylene tetrammine hexaacetic acid (494.45) ferric complex salt 0.3 mol | 1 | Comparative-1 | 0.06 | 0.16 | 0.04 | 0.14 |
| | 3 | C-107 | 0.06 | 0.08 | 0.04 | 0.05 |
| | 4 | C-101 | 0.06 | 0.07 | 0.04 | 0.06 |
| Diethylene triammine pentaacetic acid (393.27) ferric complex salt 0.3 mol | 1 | Comparative-1 | 0.06 | 0.18 | 0.04 | 0.13 |
| | 3 | C-107 | 0.06 | 0.08 | 0.04 | 0.04 |
| | 4 | C-101 | 0.06 | 0.08 | 0.04 | 0.06 |
| 1,2-diaminopropane tetraacetic acid (306.27) ferric complex salt 0.31 mol | 1 | Comparative-1 | 0.06 | 0.15 | 0.04 | 0.14 |
| | 3 | C-107 | 0.06 | 0.08 | 0.04 | 0.05 |
| | 4 | C-101 | 0.06 | 0.07 | 0.04 | 0.07 |
| Hydroxyethylimino diacetic acid (177.16) ferric complex salt 0.32 mol | 1 | Comparative-1 | 0.06 | 0.12 | 0.04 | 0.13 |
| | 3 | C-107 | 0.06 | 0.07 | 0.04 | 0.04 |
| | 4 | C-101 | 0.06 | 0.09 | 0.04 | 0.06 |
| Methylimino diacetic acid (147.13) ferric complex salt 0.3 mol | 1 | Comparative-1 | 0.06 | 0.13 | 0.04 | 0.12 |
| | 3 | C-107 | 0.06 | 0.09 | 0.04 | 0.05 |
| | 4 | C-101 | 0.06 | 0.08 | 0.04 | 0.06 |

It is proved from the results shown in Table 11 that the amaging effects that the cyan dye turbidity can be prevented by making use of the cyan couplers represented by the Formula [C VI] and such effects can also be displayed even if the organic acid ferric complex salts are varied. On the contrary, in the case of the Sample 1 in which the comparative cyan couplers are used, it is observed that such cyan dye turbidity tends to increase as the molecular weight of the organic acid ferric complex salts are being increased.

EXAMPLE 13

The bleach-fixer (i.e., the bleach-fixer of the invention) which is the same as that used in the Process (I) having been applied to Example 11, was added with an exhausted color developer in the amounts corresponding to 2.5%, 5%, 10% and 20% of the volume of the bleach-fixer, respectively. By making use of the resulted solutions, the Samples No. 2, 4 and 5 were processed, and the influence on the cyan dye turbidity prevention effect was checked up. The results thereof are shown in Table 12, below:

TABLE 12

| Exhausted color developer content (%) | Sample No. | Cyan coupler | Magenta density | Yellow density |
|---|---|---|---|---|
| | 2 | Comparative-2 | 0.16 | 0.12 |
| 2.5 | 4 | C-101 | 0.08 | 0.03 |
| | 5 | C-102 | 0.07 | 0.05 |
| | 2 | Comparative-2 | 0.18 | 0.14 |
| 5 | 4 | C-101 | 0.08 | 0.04 |
| | 5 | C-102 | 0.06 | 0.03 |
| | 2 | Comparative-2 | 0.22 | 0.17 |
| 10 | 4 | C-101 | 0.09 | 0.05 |
| | 5 | C-102 | 0.08 | 0.05 |
| | 2 | Comparative-2 | 0.24 | 0.20 |
| 20 | 4 | C-101 | 0.10 | 0.05 |
| | 5 | C-102 | 0.09 | 0.04 |

It is apparent from the results shown in Table 12 that the cyan dye turbidity is increased in the Sample No. 2 in which the comparative cyan couplers were used, when the exhausted color developer contents of the bleach-fixer are increased, and it is, however, understood that the Samples No. 34 and 5 each using the cyan couplers represented by the Formula [C VI] can be durable enough against the increase in any exhausted color developer contents. It may also be able to say positively that this technique will be effective for the future upon the durability against the mixing up of a bleach-fixer with a color developer and the processing stabilization, in the case that an amount of replenishment may be saved by concentrating a replenisher.

What is claimed is:

1. A method of processing a silver halide color photographic material comprising the steps of:

(a) developing an imagewise exposed silver halide color photographic material comprising (i) a support and (ii) photographic component layers including an anti-halation layer containing black colloid silver, a blue-sensitive, a green-sensitive and a red-sensitive silver halide photographic emulsion layer provided on one side of said support, at least one of said emulsion layers comprising a silver halide containing from 0.5 to 25 mol% of silver iodide, (b) maintaining the total dry-thickness of said photographic component layers from 8 to 25 μm, and the swelling rate T½ of said photographic component layers at not more than 25 sec, and (c) bleach-fixing said developed photographic material with a bleach-fixing solution containing an organic acid ferric complex.

2. The method of claim 1, wherein said red-sensitive emulsion layer contains a cyan forming coupler selected from the couplers represented by the general formula [C-I]:

General Formula [C-I]

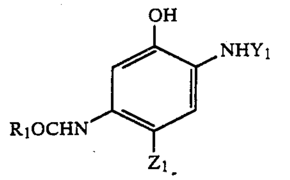

wherein Y is a group selected from the group consisting of

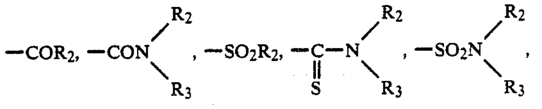

—$CONHCOR_2$ and —$CONHSO_2R_2$, in which $R_2$ is selected from the group consisting of an alkyl, an alkenyl, a cycloalkyl, an aryl and a heterocyclic group, $R_3$ is selected from the group consisting of a hydrogen atom, an alkyl, an alkenyl, a cycloalkyl, an aryl and a heterocyclic group, and $R_2$ and $R_3$ allowed to complete a five- or six-membered ring by joining each other, $R_1$ is a group being a ballast, $Z_1$ is a hydrogen atom or a group being capable of releasing upon the coupling reaction with an oxidation product of a color developing agent of an aromatic primary amine.

3. The method of claim 1, wherein said red-sensitive emulsion layer contains a cyan forming coupler selected from the couplers represented by the general formula [C-II]:

General Formula [C-II]

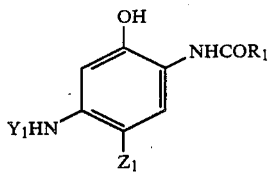

wherein $Y_1$,$R_1$ and $Z_1$ are synonymous with $Y_1$,$R_1$ and $Z_1$ of Formula [I].

4. The method of claim 1, wherein said red-sensitive emulsion layer contains a cyan forming coupler selected from the couplers represented by the general formula [C-VI]:

General Formula [C-VI]

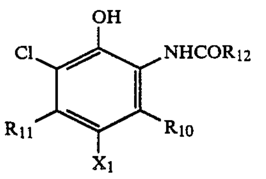

wherein one of $R_{10}$ and $R_{11}$ is a hydrogen atom and the other one is a normal or branched chained alkyl group containing from 2 to 12 of carbon atoms, $R_{12}$ is a group being a ballast and $X_1$ is a hydrogen atom or a group capable of releasing upon coupling reaction with a oxidation product of a color developing agent of an aromatic primaryl amine.

5. The method of claim 1, wherein the total amount of silver contained in said silver halide emulsion layers is from 20 to 50 mg/$dm^2$.

6. The method of claim 1, wherein said swelling rate $T\frac{1}{2}$ of the photographic component layers is not more than 20 sec.

7. The method of claim 1, wherein said method further comprises a step of prefixing, just before the step of the bleach-fixing, with a prefixing solution capable of fixing the silver halide color photographic material.

8. The method of claim 1, wherein said bleach-fixing solution contains a bleaching-accelerator selected from the compounds represented by general formula [I] to [VII]:

General Formula [I]

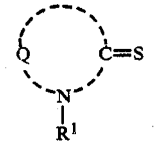

General Formula [II]

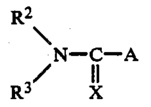

General Formula [III]

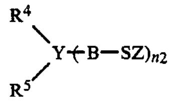

General Formula [IV]

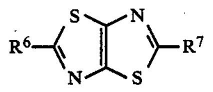

General Formula [V]

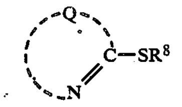

General Formula [VI]

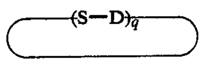

General Formula [VII]

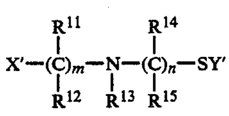

wherein Q represents a group of atoms necessary to complete a heterocyclic ring containing a nitrogen atom which may be condensed with at least one of five- to six-membered unsaturated rings, A is selected from the group consisting of

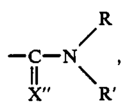 , 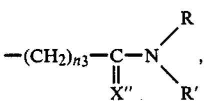 , 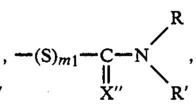 ,

-continued

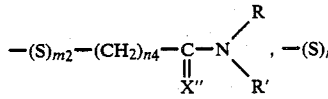 , 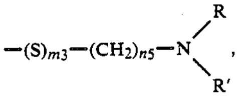 ,

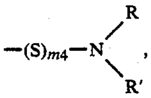 , 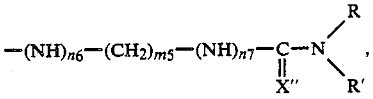 ,

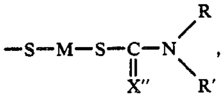 , $-SZ'$ anda n-valent heterocyclic ring residue which may be condensed with at least one of five- or six-membered unsaturated rings, B is selected from the an alkylene group having from one to six carbon atoms, M is a divalent metal atom, X and X'' are independently selected from =S, =O and =NR'', R'' is selected from the group consisting of a hydrogen atom, an alkyl group having one to six carbon atoms, a cycloalkyl group, a heterocyclic ring residue which may be condensed with at least one of five- or six-membered unsaturated rings and amino group, Y is selected from >N— and >CH—, Z is selected from the group consisting of a hydrogen atom, an alkali metal atom, ammonium group, amino group, a nitrogen-containing heterocyclic ring residue and

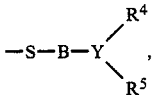 ,

Z' is selected from the groups represented by Z and an alkyl group, $R^1$ is selected from the group consisting of a hydrogen atom, an alkyl group having one to six carbon atoms, a cycloalkyl group, an aryl group, a heterocyclic ring residue which may be condensed with at least one of five- or six-membered unsaturated rings and amino group, $R^2$, $R^3$, R and R' are independently selected from the group consisting of a hydrogen atom, an alkyl group having one to six carbon atoms, a hydroxy group, a carboxy group, an amino group, an acyl group having one to three carbon atoms, an aryl group and an alkenyl group, $R^4$ and $R^5$ are independently selected from the group consisting of a hydrogen atom, an alkyl group having one to six carbon atoms, a hydroxy group, a carboxy group, an amino group, an acyl group having one to three carbon atoms, an aryl group, an alkenyl group and —B—SZ, provided that R and R', $R^2$ and $R^3$ and $R^4$ and $R^5$ may respectively form a heterocyclic ring residue which may be condensed with at least one of five- or six-membered rings, $R^6$ and $R^7$ are independently selected from

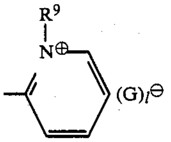 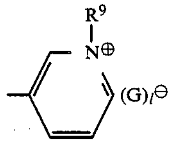 and

-continued

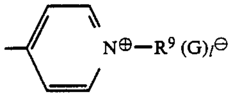

$R^8$ is selected from analkyl and $-(CH_2)n_8SO_3^-$, l is 0 or 1 provided that $R^8$ is $-(CH_2)n_8SO_3^-$, $G^-$ is an anion, $m_1$, $m_2$, $m_3$, $n_1$, $n_2$, $n_3$, $n_4$, $n_5$, $n_6$, $n_7$ and $n_8$ are an integer 1 to 6, respectively, $m_5$ is an integer 0 to 6, $R^8$ is selected from a hydrogen atom, an alkali metal atom,

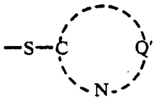

and an alkyl group, Q' is synonymous with Q, D is selected from an alkylene and a vinylene group having one to eight carbon atoms, q is an integer 1 to 10, the purality of D may be the same or different each other and a ring formed by D with S may be condensed with a five- or six-membered unsaturated ring, X' is selected from the group consisting of $-COOM'$, $-OH$, $-SO_3M'$, $-CONH_2$, $-SO_2HN_2$, $-NH_2$, $-SH$, $-CN$, $-CO_2R^{16}$, $-SO_2R^{16}$, $-OR^{16}$, $-NR^{16}R^{17}$, $-SR^{16}$, $-SO_3R^{16}$, $-NHCOR^{16}$, $-NHSO_2R^{16}$, $-OCOR^{16}$, and $-SO_2R^{16}$, Y' selected from

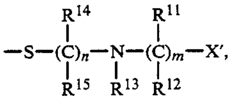,
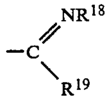

and a hydrogen atom, m and n are an integer 1 to 10, respectively, $R^{11}$, $R^{12}$, $R^{14}$, $R^{15}$, $R^{17}$ and $R^{18}$ are independently selected from the group consisting of a hydrogen atom, a lower alkyl group, an acyl group, and

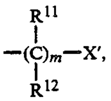, $R^{16}$ is a lowwer alkyl group, $R^{19}$ is selected from $-NR^{20}R^{21}$, $-OR^{22}$ and $SR^{22}$, $R^{20}$ and $R^{21}$ are selected from a hydrogen atom and a lower alkyl group, $R^{22}$ is a group of atoms necessary to complete a ring by conbining with $R^{18}$, $R^{20}$ or $R^{21}$ may conbine with $R^{18}$ to form a ring and M' is selected from a hydrogen atom and a cation, provided that said compounds represented by the general formula [I] to [V] may be enolated or salt thereof.

9. The method of clsim 7, wherein said bleach-fixing solution and/or said prefixing solution contain the bleach-accelerator selected from the compounds described in claim 8.

10. The method of claim 1, wherein at least one of said silver halide photographic emulsion layers comprises a core/shell-type silver halide photographic emulsion.

11. The method of claim 8 or 9, wherein said bleaching-accelerator is selected from the group consisting of the following compounds:

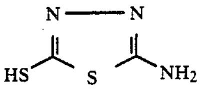 (1)

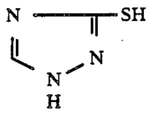 (2)

 (3)

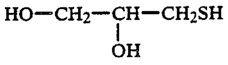 (4)

$HS-CH_2CH_2-COOH$ (5)

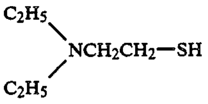 (6)

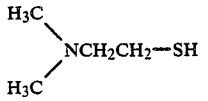 (7)

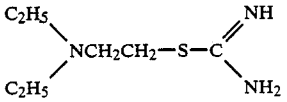 (8)

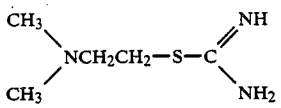 (9)

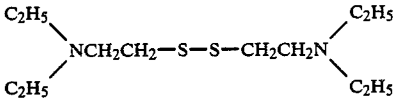 (10)

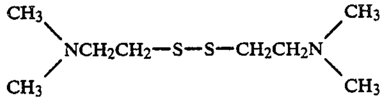 (11)

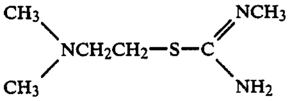 (12)

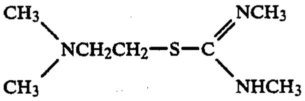 (13)

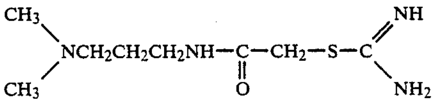 (14)

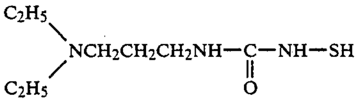 (15)

-continued

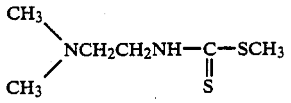

(16)

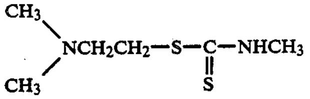

(17)

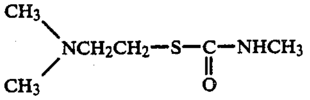

(18)

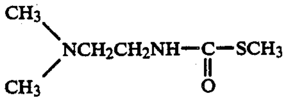

(19)

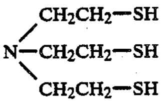

(20)

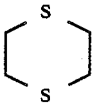

(21)

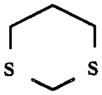

(22)

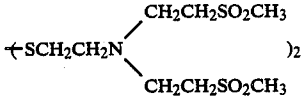

(23)

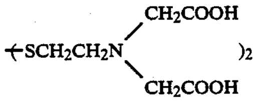

(24)

-continued

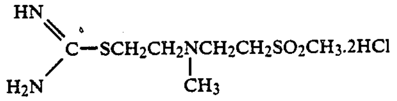

(25)

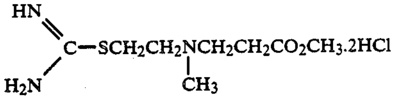

(26)

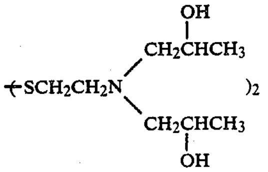

(27)

$HSCH_2CH_2NHCH_2CH_2OH$ (28)

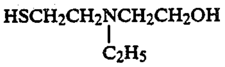

(29)

or

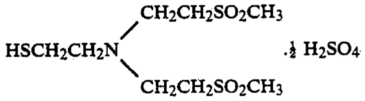

(30)

12. The method of claim 1, wherein said organic acid ferric complex is selected from the group consisting of the following complexes:

(a) Diethylenetriaminepentaacetic acid
(b) Cyclohexanediaminetetraacetic acid
(c) Triethylenetetraminehexaacetic acid
(d) Glycoletherdiaminetetraccetic acid
(e) 1,2-diaminopropanetetraacetic acid
(f) 1,3-diaminopropane-2-ol-tetraacetic acid
(g) Ethylenediamine-di-o-hydroxy-phenylacetic acid
(h) Ethylenediaminetetraacetic acid
(i) Nitrilotriacetic acid
(j) Iminodiacetic acid
(k) Methyliminodiacetic acid
(l) Hydroxyethyliminoacetic acid
(m) Ethylenediaminetetrapropionic acid
(n) Dihydroxyethylglycine
(o) Nitrilotripropoinic acid
(p) Ethylenediaminediacetic acid
(q) Ethylenediaminedipropionic acid.

* * * * *

UNITED STATES PATENT AND TRADEMARK OFFICE

CERTIFICATE OF CORRECTION

PATENT NO. : 4,908,300

DATED : March 13, 1990

INVENTOR(S) : Shigeharu Koboshi et al.

It is certified that error appears in the above-identified patent and that said Letters Patent is hereby corrected as shown below:

Claim 8, Column 126, Line 17, "anda" should be --and a--;

Claim 8, Column 126, Line 19, delete [the] before "an";

Claim 8, Column 127, Line 22, "purality" should be --plurality--;

Claim 8, Column 127, Line 22, "same or different" should be --same as or different from--;

Claim 8, Column 127, Line 48, "lowwer" should be --lower--;

Claim 8, Column 127, Lines 51-52, "conbining" should be --combining--;

UNITED STATES PATENT AND TRADEMARK OFFICE
CERTIFICATE OF CORRECTION

PATENT NO. : 4,908,300
DATED : March 13, 1990
INVENTOR(S) : Shigeharu Koboshi et al.

It is certified that error appears in the above-identified patent and that said Letters Patent is hereby corrected as shown below:

Claim 8, Column 127, Line 52, "conbine" should be --combine--;

Claim 8, Column 127, Line 55, "salt" should be --salts--;

Claim 12, Column 130, Line 39, "hydroxy-phenylacetic" should be --hydroxyphenenylacetic--.

Signed and Sealed this

Twenty-seventh Day of October, 1992

*Attest:*

DOUGLAS B. COMER

*Attesting Officer*

*Acting Commissioner of Patents and Trademarks*